US012425362B2

(12) United States Patent
Cohen

(10) Patent No.: US 12,425,362 B2
(45) Date of Patent: Sep. 23, 2025

(54) APPARATUS AND METHOD FOR FLOW-THROUGH EDITING IN A QUOTE-REPLY MESSAGING SYSTEM

(71) Applicant: Wrinkl, Inc., Blue Bell, PA (US)

(72) Inventor: Marc A. Cohen, Blue Bell, PA (US)

(73) Assignee: Wrinkl, Inc., Blue Bell, PA (US)

( * ) Notice: Subject to any disclaimer, the term of this patent is extended or adjusted under 35 U.S.C. 154(b) by 0 days.

(21) Appl. No.: 18/640,465

(22) Filed: Apr. 19, 2024

(65) Prior Publication Data

US 2024/0267347 A1    Aug. 8, 2024

Related U.S. Application Data

(63) Continuation-in-part of application No. 18/535,572, filed on Dec. 11, 2023, now Pat. No. 11,973,731, (Continued)

(51) Int. Cl.
| | | |
|---|---|---|
| G06F 15/16 | (2006.01) | |
| H04L 51/046 | (2022.01) | |
| H04L 51/18 | (2022.01) | |
| H04L 51/212 | (2022.01) | |
| H04L 51/216 | (2022.01) | |
| H04L 51/56 | (2022.01) | |
| H04L 65/1069 | (2022.01) | |
| H04L 65/1093 | (2022.01) | |
| H04L 65/401 | (2022.01) | |

(52) U.S. Cl.
CPC ............ *H04L 51/046* (2013.01); *H04L 51/18* (2013.01); *H04L 51/212* (2022.05); *H04L 51/216* (2022.05); *H04L 51/56* (2022.05); *H04L 65/1069* (2013.01); *H04L 65/1093* (2013.01); *H04L 65/4015* (2013.01)

(58) Field of Classification Search
CPC ....... H04L 51/18; H04L 51/56; H04L 51/046; H04L 51/212; H04L 51/216; H04L 51/1069; H04L 51/1093; H04L 51/4015
See application file for complete search history.

(56) References Cited

U.S. PATENT DOCUMENTS 5,960,411 A    9/1999   Hartman
7,164,781 B2   1/2007   Kim
(Continued)

FOREIGN PATENT DOCUMENTS

CN    105553834      5/2016
WO    2011141624    11/2011

OTHER PUBLICATIONS

"Die, Email, Diel A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Yves Dalencourt

(57) ABSTRACT

A method or apparatus creates a further message based on a first message and inserts the further message in a message stream. The further message comprises a digital connection for maintaining correspondence between the further message and the first message; and a reply message that is a reply to the first message, wherein the reply message is added into the further message via a text entry box. The first message is allowed to be edited to cause the redisplayed message to include the editing, wherein the editing of the first message modifies the redisplayed message to include the editing based on the digital connection.

30 Claims, 65 Drawing Sheets

Example Edited Message Type Flow

Related U.S. Application Data which is a continuation of application No. 18/073,652, filed on Dec. 2, 2022, which is a continuation of application No. 17/065,494, filed on Oct. 7, 2020, now Pat. No. 11,522,821, which is a continuation-in-part of application No. 16/931,283, filed on Jul. 16, 2020, now Pat. No. 10,805,247, which is a continuation-in-part of application No. 16/746,412, filed on Jan. 17, 2020, now Pat. No. 10,999,226, and a continuation-in-part of application No. 16/712,952, filed on Dec. 12, 2019, now Pat. No. 10,728,192, said application No. 16/746,412 is a continuation-in-part of application No. 16/712,952, filed on Dec. 12, 2019, now Pat. No. 10,728,192, and a continuation-in-part of application No. 16/376,427, filed on Apr. 5, 2019, now Pat. No. 10,547,575, said application No. 16/712,952 is a continuation of application No. 16/376,427, filed on Apr. 5, 2019, now Pat. No. 10,547,575, which is a continuation-in-part of application No. 16/014,578, filed on Jun. 21, 2018, now Pat. No. 11,388,120, which is a continuation-in-part of application No. 15/858,696, filed on Dec. 29, 2017, now Pat. No. 10,025,475, and a continuation-in-part of application No. 15/609,663, filed on May 31, 2017, now Pat. No. 10,009,300, said application No. 15/858,696 is a continuation-in-part of application No. 15/431,077, filed on Feb. 13, 2017, now Pat. No. 9,860,198, said application No. 15/609,663 is a continuation of application No. 15/293,620, filed on Oct. 14, 2016, now Pat. No. 9,712,466.

(60) Provisional application No. 63/570,331, filed on Mar. 27, 2024, provisional application No. 63/045,513, filed on Jun. 29, 2020, provisional application No. 62/783,410, filed on Dec. 21, 2018, provisional application No. 62/666,137, filed on May 3, 2018, provisional application No. 62/518,905, filed on Jun. 13, 2017, provisional application No. 62/446,067, filed on Jan. 13, 2017, provisional application No. 62/358,719, filed on Jul. 6, 2016, provisional application No. 62/253,229, filed on Nov. 10, 2015.

(56) References Cited

U.S. PATENT DOCUMENTS

| | | | | |
|---|---|---|---|---|
| 7,809,722 | B2 | 10/2010 | Gokturk | |
| 7,945,620 | B2 | 5/2011 | Bou-Ghannam | |
| 8,819,132 | B2 | 8/2014 | Serr | |
| 8,832,569 | B2 | 9/2014 | Chen | |
| 9,218,603 | B2 | 12/2015 | Kumar | |
| 9,235,782 | B1 | 1/2016 | Zomet | |
| 9,262,455 | B2 | 2/2016 | Palay | |
| 9,426,102 | B1 | 8/2016 | Wong | |
| RE46,309 | E | 2/2017 | Go | |
| 9,645,127 | B2 | 5/2017 | Amin | |
| 9,712,466 | B2 | 7/2017 | Cohen | |
| 9,722,891 | B2 | 8/2017 | Hanlon | |
| 9,860,198 | B1 * | 1/2018 | Cohen | H04L 51/18 |
| 9,971,500 | B2 | 5/2018 | Yang | |
| 9,996,248 | B2 | 6/2018 | Park | |
| 10,009,300 | B2 | 6/2018 | Cohen | |
| 10,025,475 | B1 | 7/2018 | Cohen | |
| 10,298,529 | B2 | 5/2019 | Lee | |
| 10,659,243 | B1 | 5/2020 | Soroker | |
| 10,728,192 | B2 * | 7/2020 | Cohen | H04L 51/18 |
| 10,805,247 | B1 | 10/2020 | Cohen | |
| 10,866,929 | B2 | 12/2020 | Watanabe | |
| 11,194,447 | B2 | 12/2021 | Delanghe | |
| 11,341,093 | B2 | 5/2022 | Johnston | |
| 11,539,649 | B2 | 12/2022 | Rosania | |
| 11,586,584 | B2 | 2/2023 | Johnston | |
| 11,750,539 | B2 | 9/2023 | Treat | |
| 2002/0095465 | A1 | 7/2002 | Banks | |
| 2005/0131924 | A1 | 6/2005 | Jones | |
| 2005/0198584 | A1 | 9/2005 | Matthews | |
| 2006/0031361 | A1 | 2/2006 | Bailey | |
| 2006/0128404 | A1 | 6/2006 | Klassen | |
| 2007/0185961 | A1 | 8/2007 | Perlow | |
| 2008/0080748 | A1 | 4/2008 | Sukegawa | |
| 2009/0094288 | A1 | 4/2009 | Berry | |
| 2009/0119371 | A1 | 5/2009 | Chang | |
| 2009/0254843 | A1 | 10/2009 | Van Wie | |
| 2009/0282369 | A1 | 11/2009 | Jones | |
| 2010/0124322 | A1 | 5/2010 | Bill | |
| 2010/0142542 | A1 | 6/2010 | Van Wie | |
| 2010/0205541 | A1 | 8/2010 | Rapaport | |
| 2010/0257450 | A1 | 10/2010 | Go | |
| 2010/0299599 | A1 | 11/2010 | Shin | |
| 2011/0047227 | A1 | 2/2011 | Arthurs | |
| 2011/0289406 | A1 | 11/2011 | Wessingbo | |
| 2012/0017149 | A1 | 1/2012 | Lai | |
| 2012/0158857 | A1 | 6/2012 | Loofbourrow | |
| 2012/0192287 | A1 * | 7/2012 | Cai | H04M 1/72436 726/28 |
| 2012/0198360 | A1 | 8/2012 | Wanderski | |
| 2012/0240062 | A1 | 9/2012 | Passmore | |
| 2013/0097260 | A1 | 4/2013 | Lee | |
| 2013/0247175 | A1 | 9/2013 | Nechyba | |
| 2014/0040784 | A1 | 2/2014 | Reza | |
| 2014/0059040 | A1 | 2/2014 | Cha | |
| 2014/0067977 | A1 | 3/2014 | Rasmussen | |
| 2014/0096033 | A1 | 4/2014 | Blair | |
| 2014/0143684 | A1 | 5/2014 | Oh | |
| 2014/0195621 | A1 | 7/2014 | Rao | |
| 2014/0208402 | A1 | 7/2014 | White | |
| 2014/0219433 | A1 | 8/2014 | Pai | |
| 2014/0229855 | A1 | 8/2014 | Anderson | |
| 2014/0298210 | A1 | 10/2014 | Park | |
| 2014/0304505 | A1 | 10/2014 | Dawson | |
| 2015/0088998 | A1 | 3/2015 | Isensee | |
| 2015/0188928 | A1 | 7/2015 | Shapiro | |
| 2016/0028660 | A1 | 1/2016 | Weishaupl | |
| 2016/0179773 | A1 | 6/2016 | Shen | |
| 2016/0294742 | A1 | 10/2016 | Weaver | |
| 2016/0330147 | A1 | 11/2016 | Antebi | |
| 2016/0344679 | A1 | 11/2016 | Lane | |
| 2016/0380940 | A1 | 12/2016 | Lan | |
| 2017/0054664 | A1 | 2/2017 | Lee | |
| 2017/0131884 | A1 | 5/2017 | Jeon | |
| 2017/0142036 | A1 | 5/2017 | Li | |
| 2017/0163594 | A1 | 6/2017 | Anderson | |
| 2017/0272388 | A1 | 9/2017 | Bern | |
| 2017/0357422 | A1 | 12/2017 | Jon | |
| 2017/0366493 | A1 | 12/2017 | Wilde | |
| 2018/0159812 | A1 | 6/2018 | Sarafa | |
| 2018/0287982 | A1 | 10/2018 | Draeger | |
| 2018/0293996 | A1 | 10/2018 | Mortis | |
| 2018/0300341 | A1 | 10/2018 | Hadar | |
| 2018/0351903 | A1 | 12/2018 | Allen | |
| 2018/0359292 | A1 | 12/2018 | Chen | |
| 2019/0258808 | A1 | 8/2019 | Han | |
| 2020/0120051 | A1 | 4/2020 | Cohen | |
| 2020/0153768 | A1 | 5/2020 | Cohen | |
| 2021/0044551 | A1 | 2/2021 | Cohen | |
| 2022/0353129 | A1 | 11/2022 | Soman | |
| 2023/0094375 | A1 | 3/2023 | Cohen | |
| 2024/0106775 | A1 | 3/2024 | Cohen | |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-

(56) References Cited

OTHER PUBLICATIONS

4a73-86f7-08ab5842fde6/?context=1000516, (dated Jan. 6, 2016) 5 pages.
Alba, Davey, "Slack's New Threaded Messages Tame Your Meandering Chats," WIRED, Jan. 18, 2017, 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 8 pages.
Florin, Hubert, "slack design—Threads in Slack: A Long Design Journey (Part 1 of 2)," SLACK, undated, 9 pages.
Florin, Hubert, "slack design—Threads in Slack: A Long Design Journey (Part 2 of 2)," SLACK, undated, 12 pages.
Internet Relay Chat, Wikipedia,, [online][retrieved May 30, 2019]. Retrieved from the Internet: <URL: https://en. wikipedia.org/wiki/Internet_Relay_Chat>. (dated May 28, 2019) 17 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Lynley, Matthew, "Slack launches threaded messaging to take conversations off to the side," TechCrunch, Jan. 18, 2017, 5 pages.
Matsumoto, T. et al., "Chocoa Communicator—A New Communication System Based on Awareness and Text Communications", Fujitsu Sci. Tech. J., 36, 2, (Dec. 2000) pp. 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Newton, Casey, "Slack adds threaded messages to take the clutter out of public channels," The Verge, Jan. 17, 2018, 6 pages.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
Rosania, Paul, "slack engineering—Weaving Threads," SLACK, undated, 8 pages.
Slack, "Using Slack—Use threads to organize discussions," undated, 9 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Yeung, Ken, "Slack introduces threaded replies," VentureBeat, Jan. 18, 2017, 9 pages.
Ken Yeung, "Telegram now lets you edit messages after you've sent them." VentureBeat, [online][retrieved Apr. 19, 2024]. Retrieved from the Internet <URL:https://venturebeat.com/ai/telegram-now-lets-you-edit-messages-after-youve-sent-them/> (dated May 15, 2016) 3 pages.
Sucharita Ganguly "Telegram Update Brings Advanced Reply Options, Link Preview Customisations, Account Colours, More." Gadgets360, [online][retrieved Apr. 19, 2024]. Retrieved from the Internet <URL:https://www.gadgets360.com/apps/news/telegram-update-reply-quote-formatting-link-previews-account-colour-story-4530619> (dated Oct. 31, 2023) 3 pages.
"Telegram unveils feature-packed update, allows partial quotes in replies, adjust link previews, and more," News9 Technology Desk, [online][retrieved Apr. 19. 2024]. Retrieved from the Internet <URL:https://www.news9live.com/technology/app-news/telegram-unveils-feature-packed-update-allows-partial-quotes-in-replies-adjust-link-previews-and-more-2337412> (dated Nov. 1, 2023) 4 pages.
Aisha Malik "Instagram now lets you edit DMs up to 15 mins after sending them," Techcrunch, [online][retrieved Apr. 19, 2024]. Retrieved from the internet <URL:https://techcrunch.com/2024/03/04/instagram-now-lets-you-edit-dms-up-to-15-mins-after-sending-them/> (dated Mar. 4, 2024) 2 pages.
Dan Milmo "WhatsApp to allow users to edit messages . . . but only for 15 minutes." The Guardian, [online][retrieved Apr. 19, 2024]. Retrieved from the internet <URL:https://www.theguardian.com/technology/2023/May 22/whatsapp- allow-users-to-edit-messages-15-minutes> (dated May 23, 2023) 3 pages.
S. Aadeetya, "Signal Now Introduces Edit Message Feature: Is It Better Than WhatsApp?," News18, [online] [retrieved Apr. 19, 2024]. Retrieved from the internet <URL:https://www.news18.com/iech/signal-now-introduces-edit-message-feature-is-it-better-than-whatsapp-8612355.html#> (dated Oct. 11, 2023) 3 pages.
Kristijan Lucic, "Facebook Messenger boosts security, enables message editing & more," AndroidHeadlines, [online][retrieved Apr. 19, 2024]. Retrieved from the Internet <URL:https://www.androidheadlines.com/2023/12/facebook-messenger-security-message-editing.html> (dated Dec. 7, 2023) 4 pages.
Chinese Patent Publication No. 105553834, issued on May 4, 2018, Ji et al., 63 pages (English Translation) (Exhibit No. 1006).
Fitton Laura, "How to Retweet the Right Way (With a Comment) on Twitter," HubSpot.com. [online][retrieved Apr. 21, 2024]. Retrieved from the internet <URL:https://blog.hubspot.com/blog/tabid/6307/bid/27675/how-to-retweet-the-right-way-in-4-easy-steps.aspx>, (dated Apr. 15, 2015) 21 pages.
Slack Team, "Sharing messages in Slack," Slackhq.com, [online][retrieved Jun. 3, 2019]. Retrieved from the Internet <URL:https://slackhq.com/sharing-messages-in-slack> (dated May 19, 2016) 5 pages.
"Using Slack—Share Message in Slack," Slack.com, [online][retrieved Sep. 1, 2019]. Retrieved from the Internet <https://slack.com/help/articles/203274767-Share-messages-in-Slack>; (undated) 6 pages.
Kistenev Alex, "Top 50 Features of Slack to Boost Your Productivity,"Blog.Standuply.com, [online][retrieved Apr. 21, 2024]. Retrieved from the Internet <URL:https://blog.standuply.com/50-additional-features-of-slack-to-boost-your-productivity-959ee5617893>, (dated Sep. 11, 2016) 38 pages.
Warren Christina, "Twitter Updates TweetDeck, Allows Users to Edit and Retweet," Mashable, [online][retrieved Apr. 21, 2014]. Retrieved from the Internet <URL:https://mashable.com/archive/tweetdeck-rt-updates>, (dated Mar. 22, 2012) 3 pages.
[No Author Listed], "WeChat's World," The Economist, [online][retrieved Apr. 21, 2024]. Retrieved from the Internet <https://www.economist.com/business/2016/08/06/wechats-world>, (dated Aug. 6, 2016) 5 pages.
Bell Killian. "How to send a message in invisible ink in iOS 10." cultofmac.com, [online][retrieved Apr. 21, 2024], Retrieved from the Internet <URL:https://www.cultofmac.com/?s=how%2Bto%2Bsend%2Ba%28message%2Bin%2Binvisible%2Bink>, (dated Aug. 28, 2016) 13 pages.
Brown A, "WhatsApp quietly introduced a brand-new way to reply to your messages," Express, [online][retrieved Apr. 21, 2024],

(56) References Cited

OTHER PUBLICATIONS

Retrieved from the Internet <URL:https://www.express.co.uk/lifestyle/science-technology/679325/WhatsApp-How-To-Quote-Message-In-Reply-IOS-Android-Chat#>, (dated 2016) 8 pages.
Hollander Jenny, "You Can Retweet With A Comment Now," Bustle, [online][retrieved Apr. 21, 2024], Retrieved Apr. 21, 2014], Retrieved from the Internet <URL:https://www.bustle.com/articles/74648-how-to-retweet-with-a-comment-aka-use-the-life-changing-feature-twitter-just-added>, (dated Apr. 7, 2015) 4 pages.
"Narwhal: The Best Reddit Client | Apps (App Walkthrough," Corban Tech, [online][retrieved Apr. 21, 2024]. Retrieved from the Internet <URL:https://www.youtube.com/watch?v=78wgtwPlhKE>, (dated Dec. 16, 2016) 1 page (Video Submission).
Moon Mariella, "WhatsApp can quote messages you want to respond to." engadget, [online][retrieved Apr. 21, 2024]. Retrieved from the Internet <URL:https://www.engadget.com/2016-06-12-whatsapp-quote-messages.html>, (dated Jun. 12, 2016] 4 pages.
Hix Deborah and Hartson Rex H. "Developing User Interfaces: Ensuring Usability Through Product & Process," Wiley and Sons, 1993. 2.3.9 44-45, 3 pages (Exhibit 1015).
International Search Report and Written Opinion for PCT Application No. PCT/U52018/13462 dated Apr. 4, 2018, 7 pages.
Johnson Jeff, "GUI Bloopers Don'ts and Do's for Software Developers and Web Designers," Cerra et al. (ed.). 2000. 5.3.2:288-304. 14 pages (Exhibit 1014).
Nielsen Jakob, "Usability Engineering,"Academic Press, 1993, Chapter 5:115-163, 56 pages (Exhibit 1016).
Shae Zon-Yin. "IBM Research Report: Design of Multimedia Instant Messaging System with Annotation," IBM, Nov. 4, 2003, No. RC22966 (W03 11-028), 6 pages (Exhibit 1010).
Good Robin. "Free Open-Source Distributed Alternative to Twitter: Mastodon," TS, [online][retrieved Dec. 11, 2019], Retrieved from the Internet <URL:tools.robingood.com/site/contents/content/765621/2016-10-06/free-open-source-distributed-alternative-to-twittermastodon>, (dated Oct. 10, 2016).
[No Author Listed], "How to Retweet Anything iPhone iPad iPod Mac," Tech & Design, [online][retrieved Dec. 11, 2019] Retrieved from the internet <URL:https://www.youtube.com/watch?v=6DMkQO0zjY>, (dated Jul. 18, 2015) Video Submission.
[No Author Listed], "How To Use the New Retweet Function on Twitter-Social Media Solutions," Plexus Worldwide. [online][retrieved Dec. 11, 2019], Retrieved from the Internet <URL:https://www.youtube.com/watch? v=JI9mAP8vwiQ>, (dated Apr. 7, 2015) Video Submission.
[No Author Listed], "Outlook for Android: Swipe Options, Swipe, Left for Reply. Swipe Right for Forward. Please Add These Options." Outlook.uservoice.com, [online][retrieved Dec. 11, 2019], Retrieved from the Internet <URL https://outlook.uservoice.com/forums/293346-Outlook-for-android/suggestions/99923 19-swipe-options-swipe-left-for-reply-swipe- right>. (dated Sep. 30, 2015).
[No Author Listed], Wrinkl introduces a New Type of Group Message: "Request Private Replies," Wrinkl, Inc, [online][retrieved Apr. 21, 2024], Retrieved from the Internet <URL:https://www.prweb.com/releases/wrinki-introduces-a-new-type-of-group-message-request-private-replies~676456582.html#!>, (dated Jul. 23, 2020) 2 pages.
Powell Neil et al., "US Patent Trial and Appeal Board: *Meta Platforms, Inc.* v. *Wrinkl, Inc.*" IPR2021-00882 (U.S. Pat. No. 9,860,198 B1) Judgment: Final Written Decision. (dated Nov. 23, 2022) 73 pages.
Powell Neil et al., "US Patent Trial and Appeal Board. *Meta Platforms, Inc.* v. *Wrinkl, Inc.*" IPR2021-00883 (U.S. Pat. No. 10,728,192 B2) Judgment: Final Written Decision. (dated Nov. 23, 2022) 82 pages.
PCT International Preliminary Report on Patentability in International Appin. No. PCT/US2018/13462, dated Jul. 16, 2019, 6 pages.
Souppouris Aaron, "Twitch introduces 'Cheering' emotes for tipping streamers", https://www.engadget.comn/2016-06-27-twitch-cheering-beta-bits-currency-tips.html, Updated Jun. 27, 2016, 8 pages.
Binder Matt, "YouTube announces new 'applause' feature that allows users to pay creators directly", https://mashable.com/article/youtube-applause-updates, Feb. 17, 2021. 1 page.
Binder Matt. "YouTube rolls out a new revenue stream for creators, Super Thanks", https://mashable.com/article/youtube-super-thanks-revenue-creators, Jul. 20, 2021. 7 pages.
Garun, Natt. "YouTube launches Super Chat, a tool that lets you pay to pin comments on live streams", https://www.theverge.com/2017/1/12/14249630/youtube-super-chat-pay-pin-comments-live-stream, Jan. 12, 2017, 5 pages.
Shukla Neeraj, "YouTube Super Chat: What is YouTube Super Chat and How Does it Work?". https://www.appypie.com/blog/youtube-super-chat, Updated Dec. 13, 2023, 1 page.
Fontaine Robin, "Introducing Pinned Cheers", Nov. 9, 2016. 5 pages.
Fontaine Robin, "Pinned Cheers Updates: Thanks, Twitch Community!", https://blog.twitch.tv/en/2016/11/10/pinned- cheers-updates-thanks-twitch-community-5db9d312561c/. Nov. 10, 2016. 5 pages.
Office Action dated Feb. 7, 2024 for U.S. Appl. No. 18/535,572 (pp. 1-6).

* cited by examiner

―――― Wednesday, January 18th ――――

ErikKatz 10:10AM
On my way. See you soon.

Chipotle 10:12AM — (selected) First-Message
Get and Give! Reference this message and get a free burrito

MarcCohen 10:16AM
Waiting for Ali to circulate it. If we don't have it soon, we'll skip for today.

ErikKatz 10:19AM
Oh okay, that's fine, thanks!

MarcCohen 10:22AM
Anything you want to review with me?

[ FREE  Chipotle  10:12AM EST ] ← Reference Object - (includes digital connection)
They got me 🌯 I'm going to Chipotle for lunch. Anyone want to join me? ← Reply Message

Fig. 13B

Quoted portion of First Message updated based on Correspondence

Scenario - Further Message includes static copy of First Message. Independent Message storage Cloud Server & Local device

Before Edit - Server

First Message
Database Record: [40025179]
Field: "Msg1MsgID" [28910291]
Field: "Msg1" ["Is anyone able to drive me to the airport tomorrow at 7AM?"]
Field: "Msg1Type" ["D"]

Further Message
Database Record: [40089610]
Field: "Msg1MsgID" [28911256]
Field: "Msg1" ["I'd be happy to!"]
Field: "Msg1Type" ["R"]
Field: "IsReplyToRecord" [40025179]
Field: "Quote" ["Is anyone able to drive me to the airport tomorrow at 7AM?"]

Before Edit - Local Device

First Message
Local Database Record: [21565212]
Field: "Msg1MsgID" [28910291]
Field: "Msg1" ["Is anyone able to drive me to the airport tomorrow at 7AM?"]
Field: "Msg1Type" ["D"]

Further Message
Local Database Record: [30176610]
Field: "Msg1Type": ["R"]
Field: "Msg1MsgID" [28911256]
Field: "Msg1" ["I'd be happy to!"]
Field: "IsReplyToRecord" [21565212]
Field: "Quote" ["Is anyone able to drive me to the airport tomorrow at 7AM?"]

After Edit and update routine Cloud Server

First Message
Database Record: [40025179]
Field: "Msg1MsgID" [28910291]
Field: "Msg1" ["Is anyone able to drive me to the airport tomorrow at 5AM?"]
Field: "Msg1Type" ["D"]

Further Message
Database Record: [40089610]
Field: "Msg1MsgID" [28911256]
Field: "Msg1" ["I'd be happy to!"]
Field: "Msg1Type" ["R"]
Field: "IsReplyToRecord" [40025179]
Field: "Quote" ["Is anyone able to drive me to the airport tomorrow at 5AM?"]

After Edit and update routine Local Device

First Message
Local Database record: [21565212]
Field: "Msg1MsgID" [28910291]
Field: "Msg1" ["Is anyone able to drive me to the airport tomorrow at 5AM?"]
Field: "Msg1Type" ["D"]

Further Message
Local Database Record: [30176610]
Field: "Msg1Type": ["R"]
Field: "Msg1MsgID" [28911256]
Field: "Msg1" ["I'd be happy to!"]
Field: "IsReplyToRecord" [21565212]
Field: "Quote" ["Is anyone able to drive me to the airport tomorrow at 5AM?"]

Fig. 15C

User is communicating in a channel named Three Amigos

● MarcCohen
Solaris3

At a Glance | Channels

∨ FAVORITES   +
  Dev
  Management Team
  Three Amigos
  UX Design

∨ GROUP MESSAGES   +
  Accounting
  Engineering
  HR
  Sales

∨ DIRECT MESSAGES   +
  ● ErikKatz
  DebJones
  ○ LiaGomez
  VickiMills

*Quick Navigation*

○ Three Amigos

TODAY, DEC 10TH

MarcCohen 4:27PM
My understanding is that we are switching plans on 7/1 - Which plan are we on? There are 5 listed. Thanks
📄 2017 UHC-Oxford Health Insurance Plans-Rates.pdf
     12 KB PDF

ErikKatz 5:28PM
we have:
Oxford Freedom
F Gold PPO 25/40 Non-Gated OHI CNT (PPOc)
(UCR=140mc%)

ErikKatz 5:29PM
we are switching to:
Oxford Freedom
F Platinum PPO 20/40 Non-Gated OHI CNT
(PPO) (UCR=140mc%)

At some point someone posts a message in this channel that a user (MarcCohen in this example) wants to reference in another channel

ErikKatz 5:34PM
we don't have many options and if we switch from Oxford to Empire, the deductibles will not roll-over and it's 10% more expensive Type Something

By hovering over [or clicking or selecting] the Reference Object the User is presented with the referenced message.

Special Edit Instructions

In this embodiment the editing user may elect to characterize their edit. In this example the edited message includes an enhanced indication of the edit.

In some embodiments, additional and/or other characterization options can be provided.

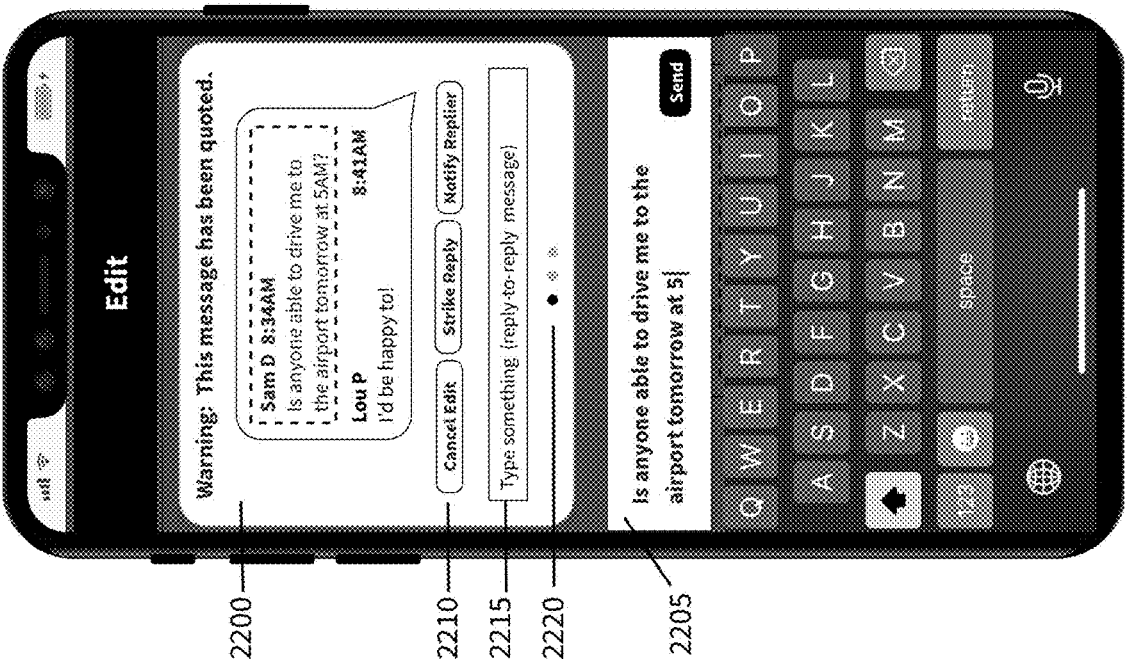

Fig. 22I

Special Edit Instructions

In this embodiment the editing user (see Fig. 22B-22C) is warned if the message she has selected for editing has been previously quoted.

In this embodiment the editing user is given the opportunity to add a further reply to the reply to their original message.

In this embodiment the editing user may choose to Cancel the Edit or Strike the reply (for example, have the reply text appear with an indication of being striken, such as having a line drawn through it.)

In this embodiment, the message editor may request that the author of the reply message be notified that the message has been edited. Notification could be in the form of, for example, an application notification, an email or telephone call.

In this embodiment the editing user may swipe left or right to view and address additional instances of message quoting.

Additional and/or other options can be provided.

Fig. 22J • Example Reply-to-reply message included in a further message where the first message has been edited In some embodiments a reply-to-reply further message is posted as a new message in the message stream. In some embodiments the further message is updated to include the further reply "in place" (as shown in Fig. 22J). In some embodiments the reply-to-reply message is posted both as a new message in the message stream and the further message is updated to include the further reply "in place."

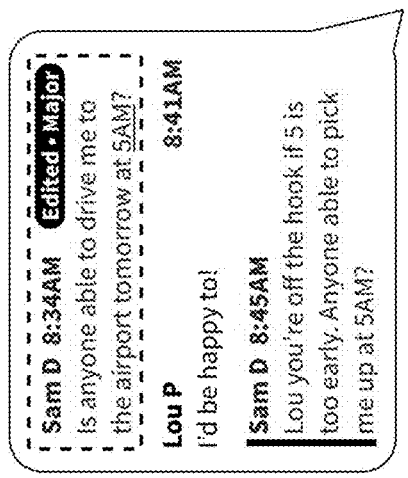

Fig. 22J

Example Displayed
"Disregard"
Characterized Edit

Example Displayed
"Edited • Typo"
Characterized Edit

Example Displayed
"Edited • Major"
Characterized Edit

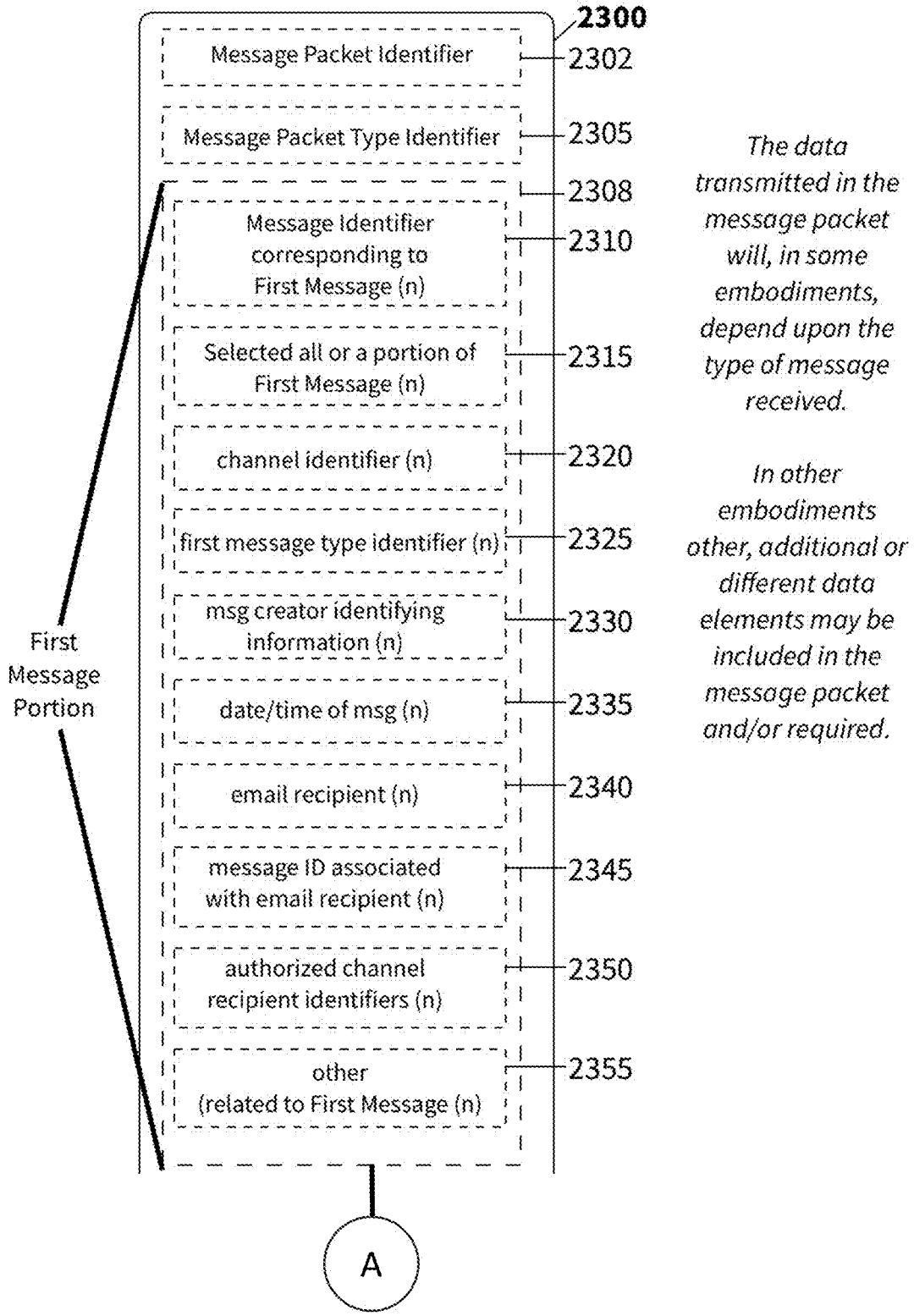

Example
Message Packet Components

Example Quote Reply Message Flow

Example Quote Reply Message Flow

Example Edited Message Type Flow

Example Edited Message Type Flow

Example Basic Message Flow

Examples of event triggers that, in some embodiments, could cause the data stored locally on a receiving device and associated with the quoted portion of a first message associated with a further message to be updated (i.e., replaced or modified) are:

After a period of time elapses (e.g., periodically), an event (e.g., application launch) or based on a manual command or automatic function, said receiving device polls at least one existing [displayed] quote reply(ies) and based on the local store updates the [displayed further messages] [all messages residing in the local store] [a specified number of messages] [messages associated with a specified channel] [messages associated with a specified group] [messages associated with a specified topic] [messages associated with a specified user] [messages associated with a specified thread] [messages associates with a specified message] [messages associated with a specified time period] [messages associated with a specified type] [messages associated with a specified location] [messages associated with a specified user level e.g., admin or user] [messages associated with subscription level e.g., paying customer or free user].

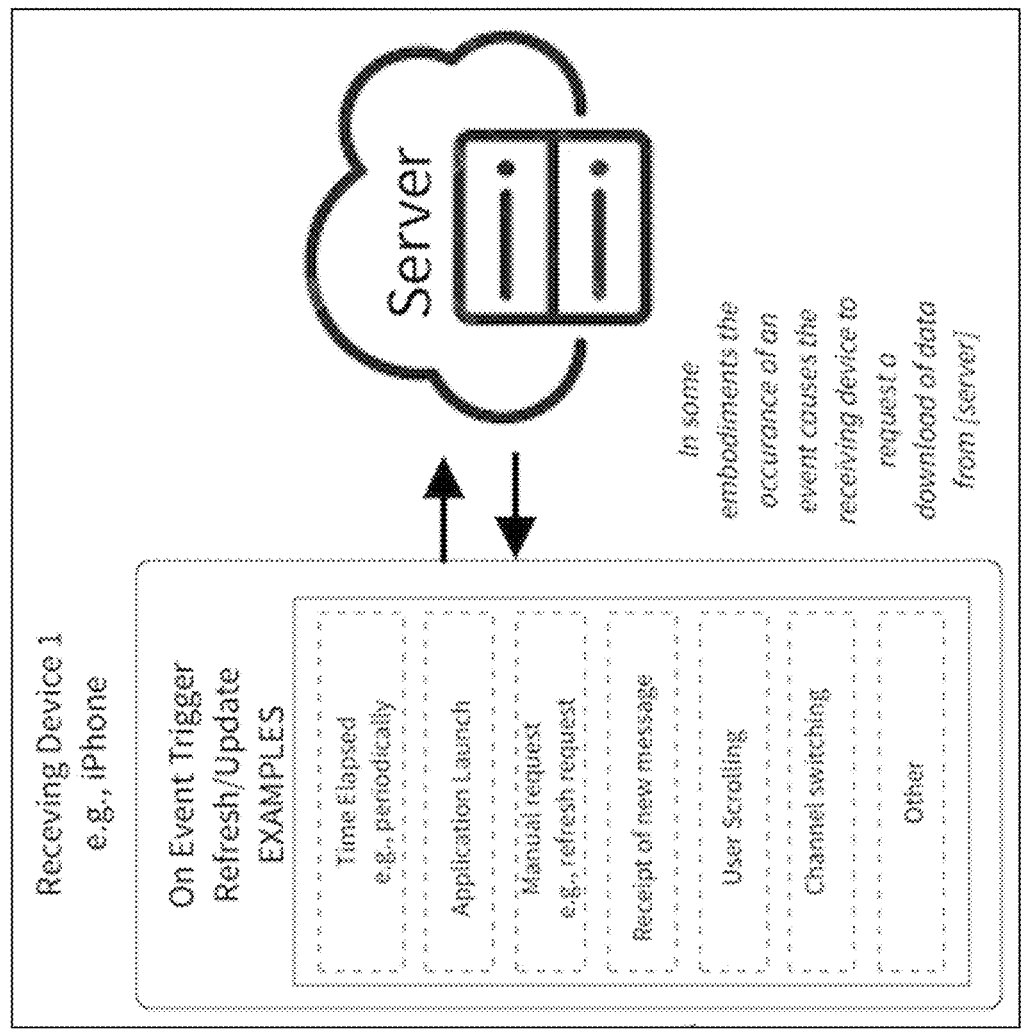

Fig. 27

APPARATUS AND METHOD FOR FLOW-THROUGH EDITING IN A QUOTE-REPLY MESSAGING SYSTEM

CROSS REFERENCE TO RELATED APPLICATIONS

This application claims priority under 35 U.S.C. 119 to U.S. Provisional Application 63/570,331 filed on Mar. 27, 2024 which is hereby incorporated by reference in its entirety.

This application is also a continuation-in-part of U.S. patent application Ser. No. 18/535,572, filed Dec. 11, 2023, which is a Continuation of U.S. patent application Ser. No. 18/073,652, filed Dec. 2, 2022, which is a Continuation of U.S. patent application Ser. No. 17/065,494, filed Oct. 7, 2020, which is a Continuation-In-Part of U.S. patent application Ser. No. 16/931,283 filed Jul. 16, 2020, which is a Continuation-In-Part of U.S. patent application Ser. No. 16/712,952 filed Dec. 12, 2019, which is a Continuation of U.S. patent application Ser. No. 16/376,427, filed Apr. 5, 2019, which is a Continuation-In-Part of U.S. patent application Ser. No. 16/014,578, filed Jun. 21, 2018, which is a Continuation-In-Part of U.S. patent application Ser. No. 15/858,696, filed Dec. 29, 2017, which is a Continuation-In-Part of Ser. No. 15/431,077, filed Feb. 13, 2017, which claims the benefit of priority under 35 U.S.C. 119(e) to U.S. Provisional Patent Application No. 62/446,067, filed Jan. 13, 2017, the disclosures of all of which are incorporated by reference herein in their entireties.

This application is also a continuation-in-part of U.S. patent application Ser. No. 18/535,572, filed Dec. 11, 2023, which is a Continuation of U.S. patent application Ser. No. 18/073,652, filed Dec. 2, 2022, which a Continuation of U.S. patent application Ser. No. 17/065,494 filed Oct. 7, 2020, which is a Continuation-In-Part of U.S. patent application Ser. No. 16/931,283 filed Jul. 16, 2020, which is a Continuation-In-Part of U.S. patent application Ser. No. 16/746,412 filed Jan. 17, 2020, which is a Continuation-In-Part of U.S. patent application Ser. No. 16/712,952 filed Dec. 12, 2019, which is a Continuation of U.S. patent application Ser. No. 16/376,427, filed Apr. 5, 2019, which is a Continuation-In-Part of U.S. patent application Ser. No. 16/014,578, filed Jun. 21, 2018, which is a Continuation-in-Part of U.S. patent application Ser. No. 15/858,696, filed Dec. 29, 2017, which is a Continuation-In-Part of Ser. No. 15/431,077, filed Feb. 13, 2017, which claims the benefit of priority under 35 U.S.C. 119(e) to U.S. Provisional Patent Application No. 62/446,067, filed Jan. 13, 2017, the disclosures of all of which are incorporated by reference herein in their entireties.

This application is also a continuation-in-part of U.S. patent application Ser. No. 18/535,572, filed Dec. 11, 2023, which is a Continuation of U.S. patent application Ser. No. 18/073,652, filed Dec. 2, 2022, which a Continuation of U.S. patent application Ser. No. 17/065,494 filed Oct. 7, 2020, which is a Continuation-In-Part of U.S. patent application Ser. No. 16/931,283 filed Jul. 16, 2020, which is a Continuation-In-Part of U.S. patent application Ser. No. 16/746,412 filed Jan. 17, 2020, which is a Continuation-In-Part of U.S. patent application Ser. No. 16/376,427 filed Apr. 5, 2019, which is a Continuation-In-Part of U.S. patent application Ser. No. 16/014,578 filed Jun. 21, 2018, which is a Continuation-In-Part of U.S. patent application Ser. No. 15/609,663, filed May 31, 2017, which is a Continuation of U.S. patent application Ser. No. 15/293,620, filed Oct. 14, 2016, which claims the benefit of priority under 35 U.S.C. § 119(e) to U.S. Provisional Patent Application No. 62/358,719, filed Jul. 6, 2016, and U.S. Provisional Patent Application No. 62/253,229, filed Nov. 10, 2015, the disclosures of all of which are incorporated by reference herein in their entireties.

This application is also a continuation-in-part of U.S. patent application Ser. No. 18/535,572, filed Dec. 11, 2023, which is a Continuation of U.S. patent application Ser. No. 18/073,652, filed Dec. 2, 2022, which a Continuation of U.S. patent application Ser. No. 17/065,494 filed Oct. 7, 2020, which is a Continuation-In-Part of U.S. patent application Ser. No. 16/931,283 filed Jul. 16, 2020, which is a Continuation-In-Part of U.S. patent application Ser. No. 16/746,412 filed Jan. 17, 2020, which is a Continuation-In-Part of U.S. patent application Ser. No. 16/376,427 filed Apr. 5, 2019, which is a Continuation-In-Part of U.S. patent application Ser. No. 16/014,578 filed Jun. 21, 2018, which is a Continuation-In-Part of U.S. patent application Ser. No. 15/858, 696 filed on Dec. 29, 2017, which a) is a Continuation-In-Part of U.S. patent application Ser. No. 15/431,077 filed Feb. 13, 2017, which claims the benefit of priority under 35 U.S.C. § 119(e) to U.S. Provisional Patent Application 62/446,067 filed Jan. 13, 2017, and b) claims the benefit of priority under 35 U.S.C. 119(e) to U.S. Provisional Patent Application 62/518,905 filed on Jun. 13, 2017, the disclosures of all of which are incorporated by reference herein in their entireties.

This application is also a continuation-in-part of U.S. patent application Ser. No. 18/535,572, filed Dec. 11, 2023, which is a Continuation of U.S. patent application Ser. No. 18/073,652, filed Dec. 2, 2022, which a Continuation of U.S. patent application Ser. No. 17/065,494 filed Oct. 7, 2020, which is a Continuation-In-Part of U.S. patent application Ser. No. 16/931,283 filed Jul. 16, 2020, which is a Continuation-In-Part of U.S. patent application Ser. No. 16/746,412 filed Jan. 17, 2020, which is a Continuation-In-Part of U.S. Ser. No. 16/376,427, filed Apr. 5, 2019, which claims the benefit of priority under 35 U.S.C. 119(e) to U.S. Provisional Patent Application 62/666,137, filed May 3, 2018, and U.S. Provisional Patent Application 62/783,410, filed Dec. 21, 2018, the disclosures of all of which are incorporated by reference herein in their entireties.

This application is also a continuation-in-part of U.S. patent application Ser. No. 18/535,572, filed Dec. 11, 2023, which is a Continuation of U.S. patent application Ser. No. 18/073,652, filed Dec. 2, 2022, which a Continuation of U.S. patent application Ser. No. 17/065,494 filed Oct. 7, 2020, which is a Continuation-In-Part of U.S. patent application Ser. No. 16/931,283 filed Jul. 16, 2020, which claims the benefit of priority under 35 U.S.C. 119(e) to U.S. Provisional Patent Application 63/045,513, filed Jun. 29, 2020, the disclosure of which is incorporated by reference herein in its entirety.

FIELD OF THE INVENTION

The present invention relates to computer messaging and more particularly to management thereof. In particular, an apparatus and method are disclosed for improving computer operational efficiency through digital message management.

BACKGROUND OF THE INVENTION

Electronic communication, including messaging, provides a very efficient manner of information exchange. In such forms of electronic communication, messages are exchanged between multiple parties to convey information.

In one known form of messaging, two users operate respective client devices and effectively engage in conversation by transmitting messages between each other. Such communication may be in the form of a single continuous stream of back-and-forth messaging. Also, in some situations, more than two users (operating, for example, more than two respective client devices) may be communicating in a single continuous stream. While a single stream of messages may be transmitted in an ongoing sequence, it is also possible to have multiple channels, each with their own respective stream of messages.

A "conversation" of messages may be short, or it may occur over an extended period of time. Such a period of time can last for hours, days, or even years. During the process of such a conversation, a large quantity of messages may be transmitted between multiple users. Typically, to reference an earlier message within a stream of messages, it may be desirable to scroll or somehow visually traverse through messages until an earlier message is located.

BRIEF DESCRIPTION OF THE DRAWINGS

FIGS. 13A-13D are exemplary screen shots that illustrate exemplary operation of an exemplary embodiment of the present invention.

FIG. 15C illustrates exemplary resources for achieving message synchronicity between a first message and a quoted portion of said first message.

FIGS. 16A-16E are exemplary screen shots that illustrate exemplary operation of a further exemplary embodiment of the present invention.

FIGS. 17A-17C are exemplary screen shots that illustrate exemplary operation of a further exemplary embodiment of the present invention.

FIGS. 22F-22M are screenshots that illustrate messaging in accordance with an exemplary embodiment of the present invention.

FIGS. 23A-23B is a block diagram that illustrates an exemplary message packet in accordance with an exemplary embodiment of the present invention.

FIG. 27 is a block diagram that illustrates exemplary event triggering in accordance with an exemplary embodiment of the present invention.

SUMMARY OF THE INVENTION

Figure 1:
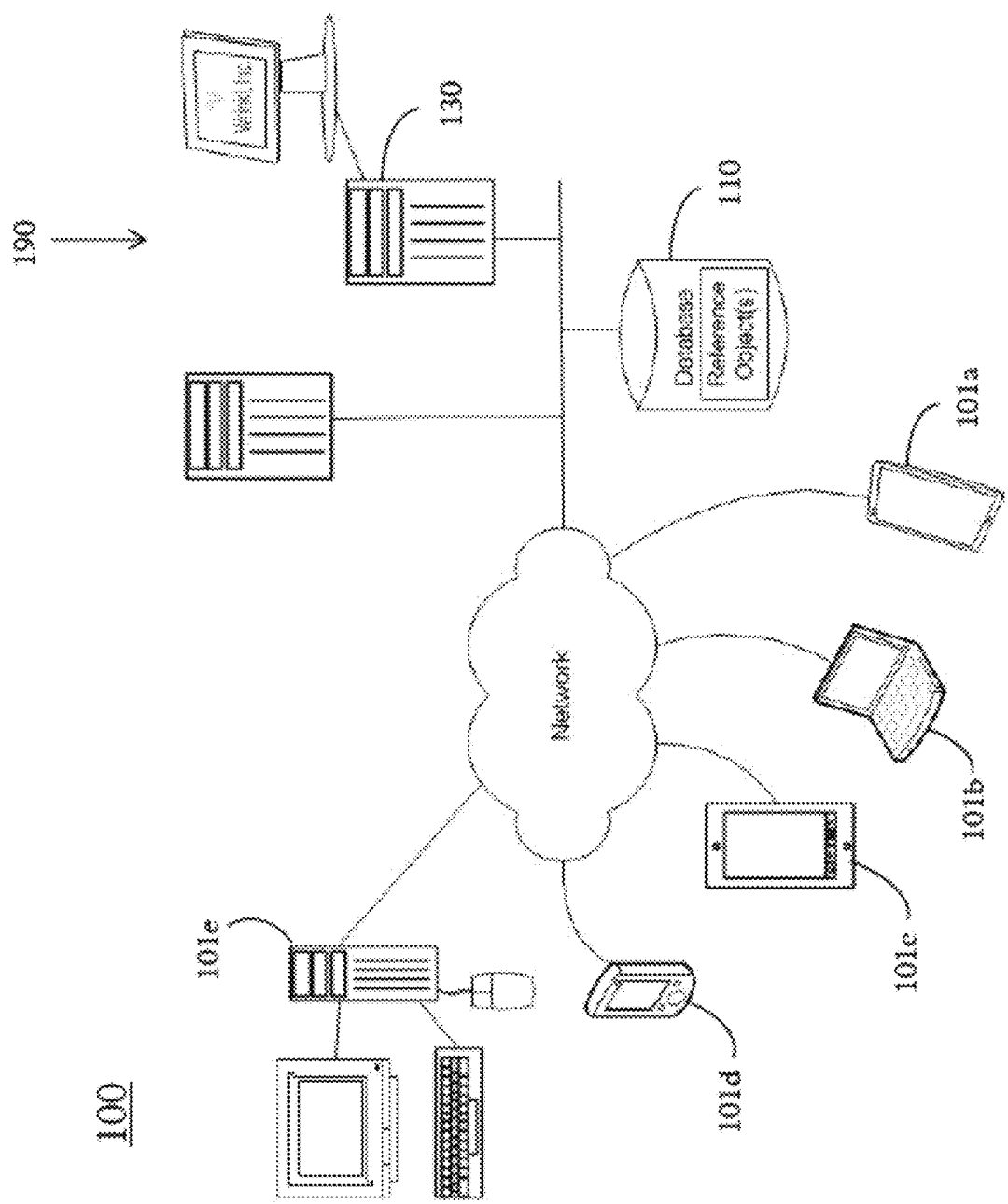
FIG. 1 is a block diagram that illustrates an exemplary network with associated computing devices in accordance with an exemplary embodiment of the present invention.

With regard to exemplary embodiments of the present invention, a method or apparatus create a further message based on a first message, and insert the further message in a message stream. The first message is received on a first device having a first display, wherein the first message originates on a second device remote from the first device, wherein display of the first message occurs in the message stream on the first device. Selection is received from the first display, of the first message, by selecting an area or object of the first message that is displayed on the first display and associated with the first message. The further message is allowed to form responsive to the selection; wherein the formation of the further message is initiated by a single step that is the selection itself. The further message comprises a digital connection for maintaining correspondence between the further message and the first message; and a reply message that is a reply to the first message, wherein the reply message is added into the further message via a text entry box.

The further message is transmitted from the first device, wherein the receiving of the first message on the first device and the transmitting of the further message from the first device occur at respectively different times, the transmitting the further message from the first device causes displaying of the further message in the message stream chronologically later than where the first message that received the selection appeared in the message stream, and wherein display of the further message in the message stream includes displaying of at least a portion of the first message via the digital connection and as a redisplayed message.

The first message is allowed to be edited to cause the redisplayed message to include the editing, wherein the editing of the first message modifies the redisplayed message to include the editing based on the digital connection.

After the further message appears in the message stream, a first edit indication that the editing of the first message has occurred on the first device responsive to the editing is provided, the first edit indication being displaying of the redisplayed message as modified to include the editing while the further message is being displayed on the first device.

After the further message is transmitted and appears in the message stream, the further message displays: the reply message, and a display object that is a displayed further area or further object displayed on the first display and associated with the further message, wherein responsive to interaction with the display object on the first device, and based on the digital connection, a visual change affecting display of the first message on the first device to occur.

DETAILED DESCRIPTION

The present invention relates to messaging and in particular to the ability of one message to reference another message. With regard to messaging, what is referred to is the ability for one or more users to provide a series of messages. Messages typically occur in a stream, wherein each message comprises data. The data included in messages is often text, but this is merely exemplary as messages can include other content, including possibly any kind of data (e.g. audio, video, animation, graphics, web links, photos, etc.).

In one or more exemplary embodiments of the present invention, a method and apparatus improves the operation of a computer device, by providing links that enable a computer device to operate with greater efficiency. In particular, in several exemplary embodiments, when one message references another message, and time has elapsed between the two messages, the invention enables a computer device to operate with advantages over the prior art. For example, in the prior art, to enable one message to reference an earlier message, a search for the earlier message can be inefficient, time consuming, can delay message response while an earlier message is located, and can request that data stored in memory be duplicated. By contrast, in accordance with exemplary embodiments of the present invention, the use of visual display of an earlier message (or portions thereof) and selection (in various manners to be described below), enables message referencing in a manner that enables faster computer processing and more efficient use of computer devices for exemplary forms of communication such as messaging.

Messaging (such as chat messaging) has become a very popular form of electronic communication due to its affordability and ease of use. On any given day, users may exchange numerous messages regarding a diverse range of topics. The users may use the messages to discuss, for example, group activities, to solicit opinions about various topics, or simply exchange short conversations with friends or co-workers. One of the drawbacks to using typical chat messaging systems is the sequential nature of the messages sent and received. For example, messages often appear in a channel or log in chronological order. If a user in a group chat session comes back from a meeting after several hours, they may be confronted with a bunch of messages. In this regard, the group chat sessions are often characterized by short bursts of dialog around a given topic. By the time a user views the messages, the topic may have changed several times. This makes it difficult for a user to post a response to a previous message that is within context of the ongoing message conversation.

Methods and systems for providing references (such as context-based references) to link messages (such as chat messages) are disclosed herein. This allows a user to generate and insert a (reference) object into a (chat) message stream that links or otherwise references (i.e. via a digital connection) a chat message (such as a prior message or later message) the user intended to send. It is contemplated that the techniques disclosed herein may be particularly beneficial in certain types of communication platforms. However, so as to illustrate the method and system functionality, and not by way of limitation, the communication platform described herein is an exemplary chat messaging platform. It is envisioned that one skilled in the art could make and use the methods and systems described herein with other types of communication platforms. Some of these communication platforms may include, for example, text messaging, short message services (SMS), e-mails and other types of similar on-line communication platforms for facilitating electronic information exchanges between client devices of a plurality of users. The use of chat messaging described herein is merely exemplary, as other forms of messaging may also be used in accordance with exemplary embodiments of the present invention.

With respect to chat messaging platforms, a message (for example in a chat message session) that a user wishes to respond to or reference occurred as a standalone comment or as part of a previous and unrelated (to a most recent discussion chain) discussion. A chat message session, as used herein, refers to a series of messages that are exchanged between one or more users, wherein for more than one user the users are in a group of users. When one of the users in the group adds a new message to a chat message session, the new message is sent to other users in the group. For example, if a first user adds a new message to the chat message session between three users in a group, then the new message may be sent to other selected users of the group, such as the second user and/or the third user. Thus, the chat message session may simulate a real-life conversation because users may communicate to the group at large, or to a specific person or a subset of the people in the group.

In some situations, a user may want to add a new message that is related to a previous message in the chat message session. When replying to the previous message at the current point in time in the session, the reply message may appear out of context and could be confusing to other users in the session. This is because the chat message sessions often include numerous messages that may have been entered over a short period of time. Some group messaging users employ various strategies to minimize the effect of their writing messages when trying to refer to or reply to a previous message in the session. In one example, a user may copy and paste the prior message into the text message entry bar and then add additional text. In another example, the user may include addition information in the new message to make it clear what is being responded to. In yet another example, the user may specify the message being referenced by identifying and referencing something unique about the message such as who sent it, the date and/or the time it was sent. One problem with using these types of techniques is that extra text entry space may not be available in a chat message system that limits the amount of data that can be entered into a given message. Moreover, the user may miss some important information if they cut and paste only a portion of the previous message or the identifying information regarding the previous message may not be complete or accurate.

To put it another way, a first message ("message") may be one of several messages. A second message ("further message") may also be one of the several messages. It may be desirable for the second message to reference the first message. By "reference" what is meant is that there is a digital connection between the second message and the first message. The digital connection may be for example a link. With such a link, while the second message is being viewed, some aspect of the first message may also be viewed. The aspect of the first message may be, for example, all of the first message, part of the first message, a modified form of all or part of the first message, and/or data associated with the first message. Exemplary associated data may include a user (or some form of identification of the user) associated with the first message, a date and/or time associated with the first message, and/or some other data associated with the first message.

In an exemplary embodiment of the present invention, the first message and the second message are part of a stream of messages. A stream of messages includes a plurality of messages sent one after another, i.e. one message appears, another message appears after the earlier message, etc. Multiple messages may exist between the first and second messages, or the first and second messages may be adjacent to each other in the stream. The stream of messages may exist, for example, in a single channel of communication (although messages across multiple channels of communication are also contemplated) (Described in more detail below. See also FIGS. 16A-16E). In at least one exemplary embodiment, a display can be (continuously) scrolled from the earlier message to the later message.

In one exemplary embodiment of the present invention, a "reference object" is inserted into a text entry box that is being used to form a second message so that (after the second message is transmitted) a "display object" can be displayed (with the second message) that references the first message. In one embodiment of the present invention the reference and display object are the same while in another embodiment of the present invention the reference and display object are different. The reference object, or the display object, or both, references the first message as more clearly described below.

Chat messages (as an example of messages) are thus beneficially enhanced to provide users with additional information related to the meaning of their electronic conversations without introducing expensive overhead or burdensome retrieval mechanisms. For example, a user may make a selection associated with a first message which then automatically inserts a reference object into a text entry bar of a chat message system. The reference object may provide a digital connection such as a link to automatically identify and access data from the first message. The user may then add additional text in the text message box before or after the reference object. When the message is sent, a display object associated with the first message is included in the newly posted second message. If multiple messages are referenced, then one or more of the display objects are displayed in the newly posted message. It is also possible for the same message to be referenced multiple times by different new messages at any time in the chat message session. In addition, in some exemplary embodiments, computer processing efficiency is improved through the use of links and without managing duplicated data that was previously inputted. Therefore, since there is no duplicated data, the link can be included in the message instead of including actual text that was inputted by a user. This feature provides numerous technical advantages, including synchronicity when messages are edited (discussed below) and more efficient data management (discussed below). Also, in some embodiments, efficiency is improved by enabling access to at least a portion of previously available data without a need to manually locate the previously available data.

Each display object can then be activated in the chat session in several ways. For example, by hovering over and/or selecting the display object, text data (or other data or portions thereof) associated with the referenced first message may be displayed (e.g., above, to the side of, below) with respect to the newly posted message. The information thus provides the reader with immediate and useful context relating to the message they are reading by allowing them to see the message that is referenced. In some implementations, other visual or audio mechanisms can be added to highlight the display object. For example, the display object may be displayed in a different text color, font size, or a change to a portion or all of the background of the referred message or include various type of animation effects.

While the above description is with regard to first and second messages, it is understood that "first" and "second" (or "message" and "further message") are merely being used to identify two messages that have been separately entered into a computer system (and then, for example, sent). In one embodiment of the present invention, the first message is sent before the second message, although this is merely exemplary (i.e. the order may be reversed).

In one implementation, a computer program product may be installed and/or a service may be selected from a cloud-computing environment in order to obtain the benefits of the techniques described herein. In an implementation, the computer program product may be downloaded onto a client device. For example, a user may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser. In one exemplary embodiment, software to achieve the above results is stored in a cloud computing environment. In another exemplary embodiment, the software is stored in local client devices. In a further exemplary embodiment of the present invention, the software is stored in a combination of a cloud computing environment and (one or more) local client device(s).

FIG. 1 is a block diagram that illustrates an exemplary network with associated computing devices in accordance with an exemplary embodiment of the present invention. In an exemplary embodiment of the present invention, two or more computing devices (e.g., client devices) may engage in an electronic communication session (e.g., chat session) with each other. In some implementations, a first participant/client device may engage in a chat session with a second participant/client device via a network. As shown, communications network 100 includes a plurality of computing devices such as client devices 101*a*-101*e* which may include for example, a base station, a personal data assistant (PDA), a laptop/netbook and a tablet as well as computing server devices and (e.g., computing devices that can be located at a number of different receiving stations). The various devices may be interconnected via a network or direct connection and/or may be coupled via a communications network (e.g., a LAN, WAN, the Internet, etc. that may be wired or wireless). In some implementations, the computing devices may communicate with each other before accessing the communication network. In some implementations, the network may include a database running on or in communication with the server device and/or the client devices or some combination thereof. In some implementations, the database may store reference objects and/or display objects related to one or more chat messages. Server 190 is also illustrated. Server 190 includes computing device 120, computing device 130, a terminal for data input and/or display, etc. Communication may occur via network 140. While client devices such a devices 101*a* and 101*b* are shown, it is understood that fewer or more client devices such as client devices 101*x* and 101*z* (not shown) may also be included. Memory for storing data that is useful in accordance with an exemplary embodiment of the present invention may be included in the form database 110.

The above description is with regard to at least two users (or more) communicating with each other with respective client devices. In a further exemplary embodiment of the present invention, the "first message" and the "second message" are both entered into the same computing device. In a further exemplary embodiment of the present invention, further messages may or may not be included from a source outside of the computing device from which the "first message" and "second message" are entered. In yet another exemplary embodiment of the invention, a single user may enter the "first message" on one computing device and the "second message" on another computing device.

Figure 2:
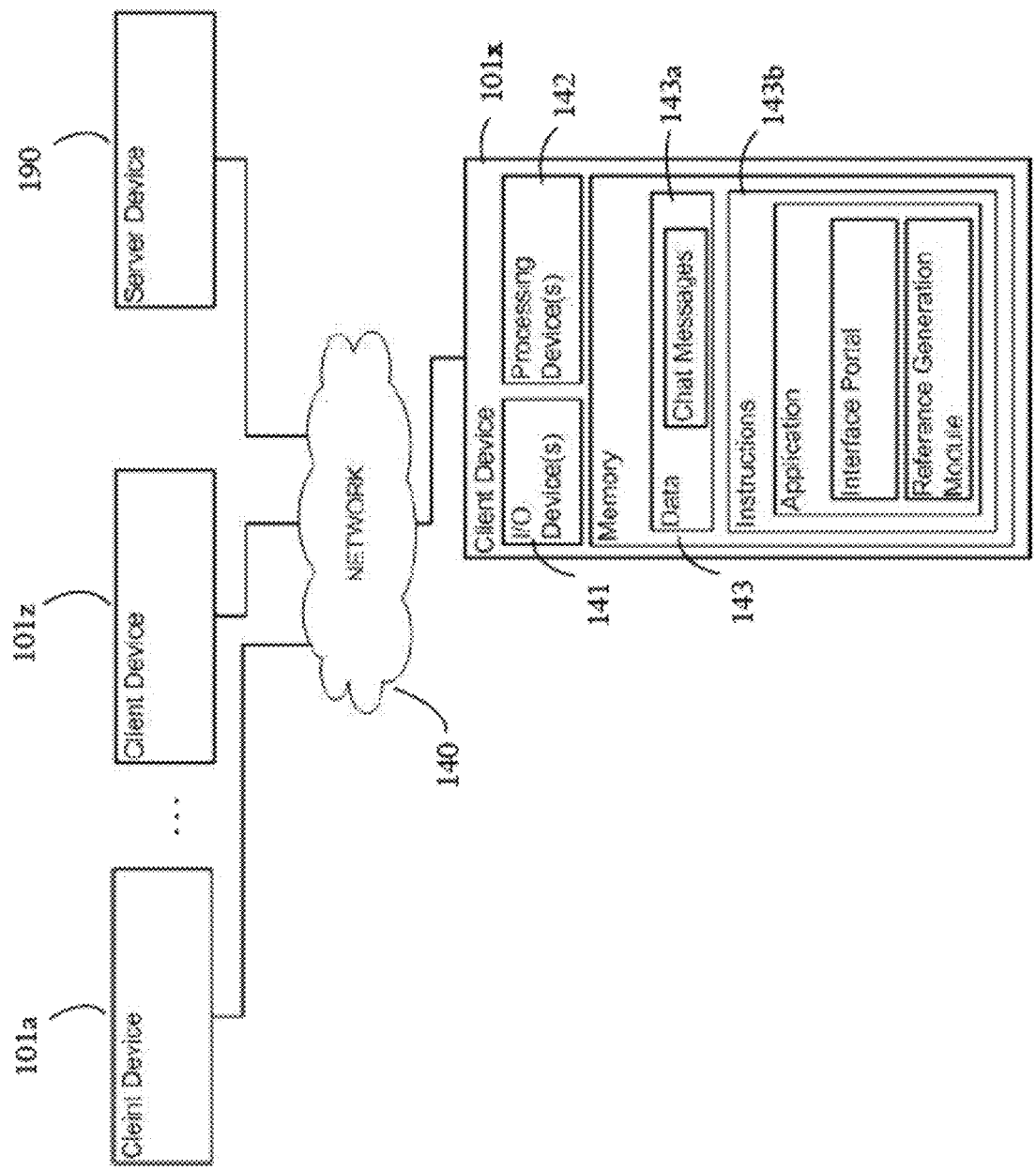
FIG. 2 is a block diagram that illustrates details of an exemplary client device in accordance with an exemplary embodiment of the present invention.

FIG. 2 is a block diagram that illustrates details of an exemplary client device in accordance with an exemplary embodiment of the present invention. In one or more exemplary embodiments of the present invention, the system may facilitate the transfer of electronic communications between computing devices of two or more users or participants over a communication network. The system can include one or more servers (e.g. a server device), which provide access or a communication link between a plurality of client devices in order to facilitate communication between two or more client devices over a network. In some implementations, the system may include an interface portal that provides for the display of network content, such as chat messages of a chat message session or any other type of network data received in response to a transmitted chat message.

FIG. 2 illustrates a plurality of client devices 101*a*-101*z*. In an exemplary embodiment of the present invention, features of the invention may be included on a server 190 (shown in FIG. 1) or on a client device 101*a*-101*z*. Exemplary client device 101*x* is illustrated. Client device 101*x* may include I/O device driver(s) 141 (and/or related database structures), processing device(s) 142 (and/or related database structures) and memory 143. Memory 143 may include data memory 143*a* and instruction memory 143*b*.

One or more drivers may include a message engine and/or a link engine as more fully described below. To facilitate integrating context-based references into a chat session, the system may include a reference generation module alone or as part of the engines described below. The reference generation module may generate and transmit the references (or links) in a chat session that can be perceived by users of the client devices of the system (i.e. visual objects). The functionality of the reference generation module can exist in a fewer or greater number of modules than what is shown, with such modules residing at one or more computing devices, which may be geographically dispersed.

Figure 3:
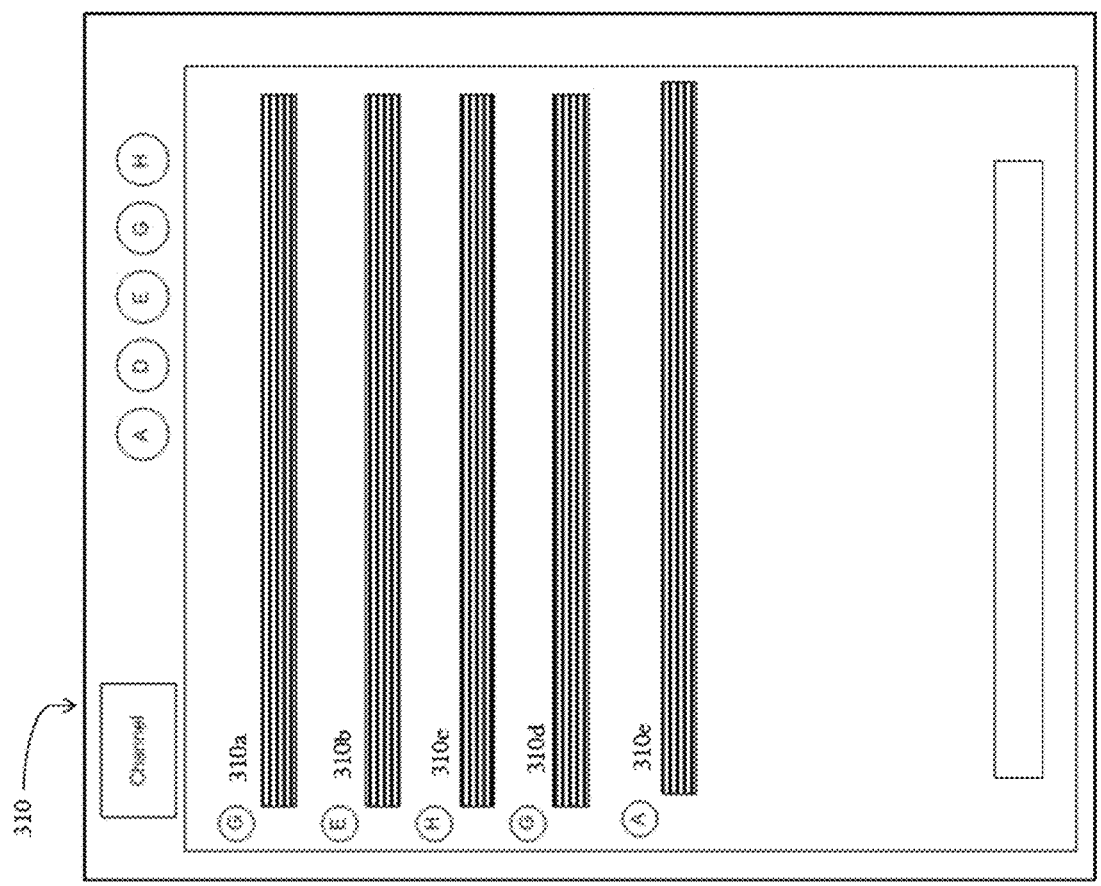
FIG. 3 illustrates an exemplary interface portal of a client device in accordance with an exemplary embodiment of the present invention.

FIG. 3 illustrates an exemplary interface portal 310 of a client device 101*x* in accordance with an exemplary embodiment of the present invention. The interface portal provides an example interface in which a chat messaging session can be engaged by a number of users that are represented by the respective participant icons 310*a*-310*e* on the portal. In some implementations, the interface portal may include several panels that include a channel/dialog panel that displays the different chat session groups that a particular user has joined. The interface portal displays a plurality of chat messages exchanged by the users. In some implementations, the interface portal includes a message window panel that may include a count of the current participants and a text entry region that allows the participants to insert and reformat the text (i.e., bold, italics, color), add a link (hypertext link) or other type of data into a chat session. Each message that is entered into the text entry region is displayed in the message window panel. In some implementations, the messages can be augmented with one or more references to a previous message in the chat session.

Figure 4:
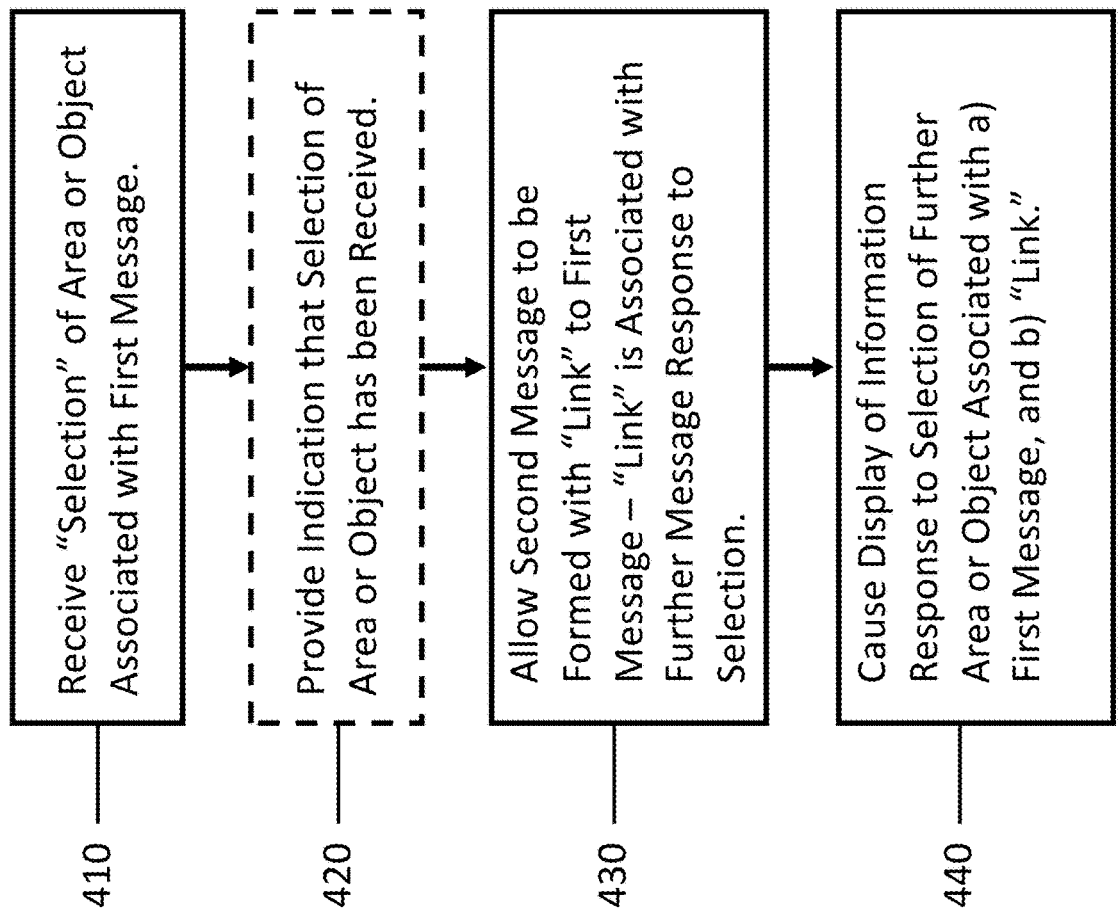
FIG. 4 is a flowchart diagram that illustrates exemplary message referencing in accordance with an exemplary embodiment of the present invention.

FIG. 4 is a flowchart diagram that illustrates exemplary message referencing in accordance with an exemplary embodiment of the present invention. At step 410, "selection" of an area or object associated with a $1^{st}$ message is received. The selection may be accomplished through different mechanisms. Selection can be accomplished with a click, a hovering, with the cursor, the finger, etc. For example, the selection may entail moving a cursor or some other indicator over to a $1^{st}$ message or an area associated with a $1^{st}$ message so that an object or area associated with the $1^{st}$ message can then be selected. In one exemplary embodiment, the object being selected is a display object, an area with defined limits. The area may have an exemplary shape, size, color, pattern, identification, etc. Alternatively, the text of the $1^{st}$ message or portion thereof may be selected. One exemplary method of selection is moving a cursor and then subsequent selection using an I/O device such as a mouse that is controlling the cursor. In another exemplary embodiment, a touch sensitive screen may be used. Selection may then be accomplished by touching the touch sensitive screen in some manner including the use of a finger, stylus, etc. A cursor, finger, or stylus are examples of a "further object" and where the "further object" is placed is a step in the process of obtaining selection by placing the further object over where the area associated with the message or the object is displayed.

Optionally, with (or thereafter) the selection of the area or object associated with the $1^{st}$ message, other action(s) may also be taken. The additional action(s) may be, for example, sending communication (i.e. a message or other data) to a location that is predefined or defined by data associated with the $1^{st}$ message. The action may occur with the selection, at optional step 420 (below), or at other times.

At optional step 420, an indication is provided that the selection of step 410 has been received. The indication may be in many exemplary forms including a visual indication. The visual indication may include for example the display of a dot on a screen. Alternatively, for example, the indication of receipt of the selection may include the insertion of a reference object in a text input box. This will be further described below.

While step 420 is included in some exemplary embodiments, it may be omitted (or temporarily omitted) in other exemplary embodiments. Thus, for example, in one exemplary embodiment, no visible indication is provided that the selection of step 410 has occurred (or has been received).

At step 430, a $2^{nd}$ message is allowed to be formed with a link to the $1^{st}$ message. The link may be a reference object, a display object, or a reference object which is the same as the display object. The link is associated with the $2^{nd}$ message and references the $1^{st}$ message. Furthermore, the link is created responsive to the receipt of the selection of step 410. This link is further described below. Since the message is formed with a link, the message need not be formed with the actual text of the first message. This feature results in efficiencies in data management, for example when a message is edited.

In a further exemplary embodiment of the present invention, a text entry box is provided. Although the text entry box is optional, the text entry box may appear on a screen as a place where the second message is formed before transmitted. Selection of the area or object (i.e. first-message-selection display object) associated with the first message may result in the visual indication described with reference to step 420, or may result in another indication. For example, the indication may be (or additionally may be) insertion (and/or display) of the reference object into the text entry box.

At step 440, display of information is caused responsive to selection of a further area or object associated with a) the $1^{st}$ message and b) the link. Thus, for example, the $2^{nd}$ message may be displayed with a display object (i.e. the area associated with the second message and associated with the link to the first message) after the second message is transmitted. Selection of the display object will cause information to be displayed. The information may be some or all of the $1^{st}$ message, or some type of identifying information or user information associated with the $1^{st}$ message, for example.

In some embodiments the illustrated order of performing the above steps may vary.

Figure 5:
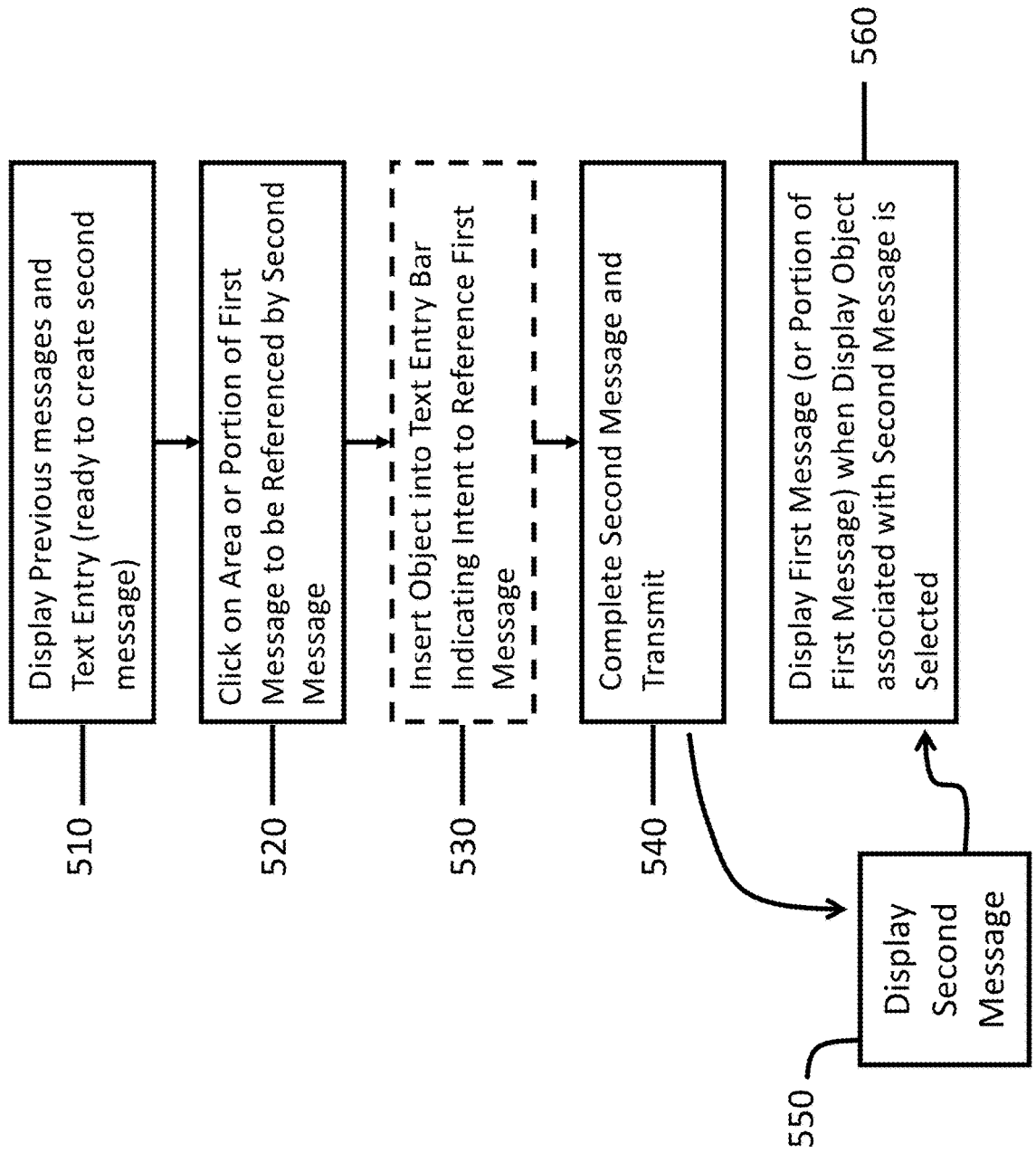
FIG. 5 is a flowchart diagram that illustrates exemplary message referencing in accordance with a further exemplary embodiment of the present invention.

FIG. 5 is a flowchart diagram that illustrates exemplary message referencing in accordance with a further exemplary embodiment of the present invention. At step 510, previous messages are displayed. In addition, a visual structure to facilitate text entry may be included. The visual structure may be a text entry bar. As characters are typed using an I/O device, for example, the characters may appear in the text entry bar. After the typing of the message has been completed, in one exemplary embodiment of the present invention, the text entry bar may be optionally hidden, the text may be sent, and the text that was inputted into the text entry bar may be displayed so that it appears with other messages that have been sent and received. In any event, by displaying the text entry bar, for example, a visual indication is provided to the user that the client device that will transmit the completed message is ready for the completed message to be created.

Next, at step 520, a user clicks on an area or portion of a $1^{st}$ message to be referenced by a $2^{nd}$ message. The area may include a first-message-selection display object as more fully described below. A "click" may refer to some sort of selection. The area being clicked may include text that is included in the $1^{st}$ message itself, an area occupied by the $1^{st}$ message as it appears on a screen, a first-message-selection display object with a defined border, a first-message-selection display object where the border is not clearly defined, etc. The process of clicking or selection will cause the $2^{nd}$ message to be able to reference the $1^{st}$ message.

At step 530, a reference object is inserted into a text entry bar. By inserting the object into the text entry bar, intent to reference the $1^{st}$ message is indicated. Display of an indication of the selection is optional.

In one exemplary embodiment of the present invention, the "selection" described in step 520 causes automatic insertion of the reference object into the text entry bar in step 530. In other words, in response to a selection (such as clicking on a first-message-selection display object in the first message), the reference object that includes the link to the first message appears in the text entry bar. This "one click" process of having the reference object be displayed (or be inserted) into the text message bar enables advantageous computer processor performance. By contrast, one could manually insert a link to the first message in the second message, but creation and insertion of such a link is time consuming and subject to errors. The inventor has determined that such a link could be created by selecting (i.e. highlighting) data (i.e. a link to the first message) associated with the first message, copying the selection (performed for example with a mouse right click), moving a cursor to the text entry bar, selecting a location in the text entry bar, and pasting the selection (of the link) into the text entry bar. This procedure assumes that a link (that references the first message) is visually displayed in some manner so that the above procedure can be performed. One advantage of exemplary embodiments of the present invention is that the process has been automated, so that selection of a first-message-selection display object (as it appears or may be selected on the display) causes the reference object to appear in the text entry bar, preferably with no other steps performed by the user (or with fewer steps performed by the user than with the select/copy/select/paste procedure outlined above).

The ability to insert the reference object into the text entry box through a single click (or with fewer operations than with other methods) enables information associated with a message to be easily available (i.e. displayable) by reference to another message.

At step 540, the $2^{nd}$ message is completed. Subsequently, an instruction is provided to transmit the $2^{nd}$ message.

At step 550, the $2^{nd}$ message is displayed. The $2^{nd}$ message may be displayed in various places including, for example, a client device from which the message was transmitted, a client device to which the message is transmitted, a device where a message is displayed without being transmitted outside of the device, etc.

At step 560, after the $2^{nd}$ message is displayed (with the display object), selection of the display object causes display of the $1^{st}$ message, a portion of the $1^{4}$ message, data associated with the $1^{st}$ message, etc.

Generation of a reference object, and subsequent generation of a display object, may be accomplished in accordance with a further exemplary embodiment of the present invention. For example, a unique identifier may be assigned to each message. There are numerous ways to generate unique identifiers, including sequential numbering, numbering based on a system clock, numbering based on a chronological clock, etc. Generation of a reference object may be initiated by an event that occurs and is detected by software (that is causing or related to the display of the messages on the client device). Put another way, for each first-message-selection display object on a plurality of messages that are displayed, interaction with the first-message-selection display objects can either be identified via polling or acted upon via an interrupt mechanism. When a particular first-message-selection display object is selected (i.e. clicked, hovered, etc.), the selection of the first-message-selection display object is routed to software that will create a reference object, and ultimately a display object. Furthermore, selection of the first-message-selection display object causes the unique identifier of the message associated with the first-message-selection display object to be stored in a database. That unique identifier will then be associated with the reference object as the reference object is created. When the reference object is indeed created, a visual icon (for example) that represents the reference object may be inserted in a place to indicate that that the first-message-selection display object has been selected. The visual icon that represents the reference object is thus inserted, for example, into the text entry bar. Furthermore, the reference object is linked to the identifier that has been stored for the message associated with the first-message-selection display object that has been selected. After the message (i.e. the "second message" described above) has been transmitted, the display object is created and, again, the display object may be associated with the identifier that has been stored in the database for the message associated with the earlier first-message-selection display object that has been selected.

The above description has been with regard to a reference object and both a first-message-selection display object and a display object. It is understood that the first-message-selection display object may be represented by a visual icon with defined borders, or it may be represented by some other visual method, such as text associated with a message or space (i.e. space that appears on a display) that overlaps or is adjacent to a message.

Figure 6:
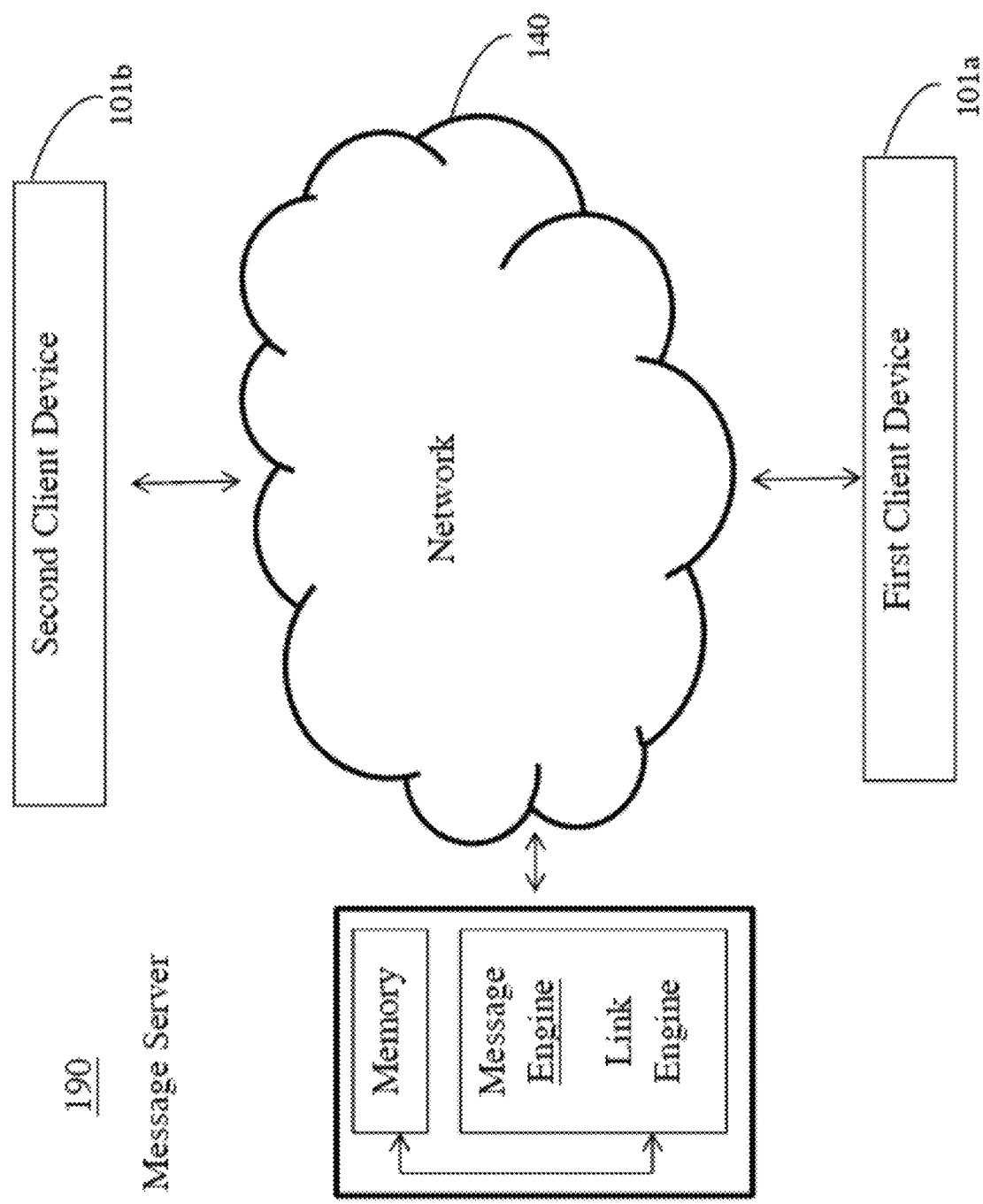
FIG. 6 is a block diagram that illustrates an exemplary network with associated computing devices in accordance with a further exemplary embodiment of the present invention.

FIG. 6 is a block diagram that illustrates an exemplary network with associated computing devices in accordance with a further exemplary embodiment of the present invention. FIG. 6 illustrates that $1^{st}$ client device 101a and $2^{nd}$ client device 101b are coupled to network 140. Network 140 may be, for example, the Internet. Message server 190 is also shown coupled to network 140. In the exemplary embodiment shown in FIG. 6, message server 190 includes a message engine and a link engine. A memory is also included. The message engine is for a) receiving selection of an area or object associated with a message on a display; and b) providing an indication that selection of an area or object associated with the message has been received. The link engine is for a) allowing a further message to be formed with a link to the message, wherein the link is associated with the further message responsive to the selection; and b) causing display of information associated with the first message responsive to selection of a further area or portion associated with i) the further message; and ii) the link.

Figure 7:
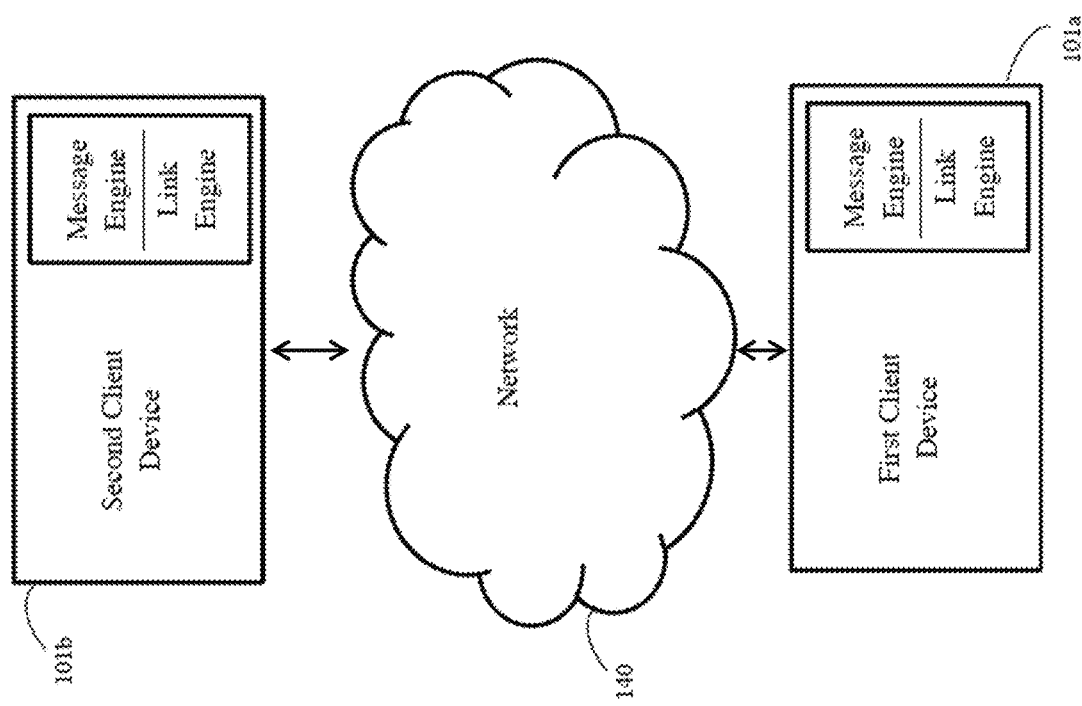
FIG. 7 is a block diagram that illustrates an exemplary network with associated computing devices in accordance with yet another exemplary embodiment of the present invention.

FIG. 7 is a block diagram that illustrates an exemplary network with associated computing devices in accordance with yet another exemplary embodiment of the present invention. FIG. 7 differs from FIG. 6 in that, in FIG. 6, the message engine and link engine are included in message server 190. By contrast, in FIG. 7, $1^{st}$ client device 101a and $2^{nd}$ client device 101b each includes a respective message engine and link engine.

Figure 8A:
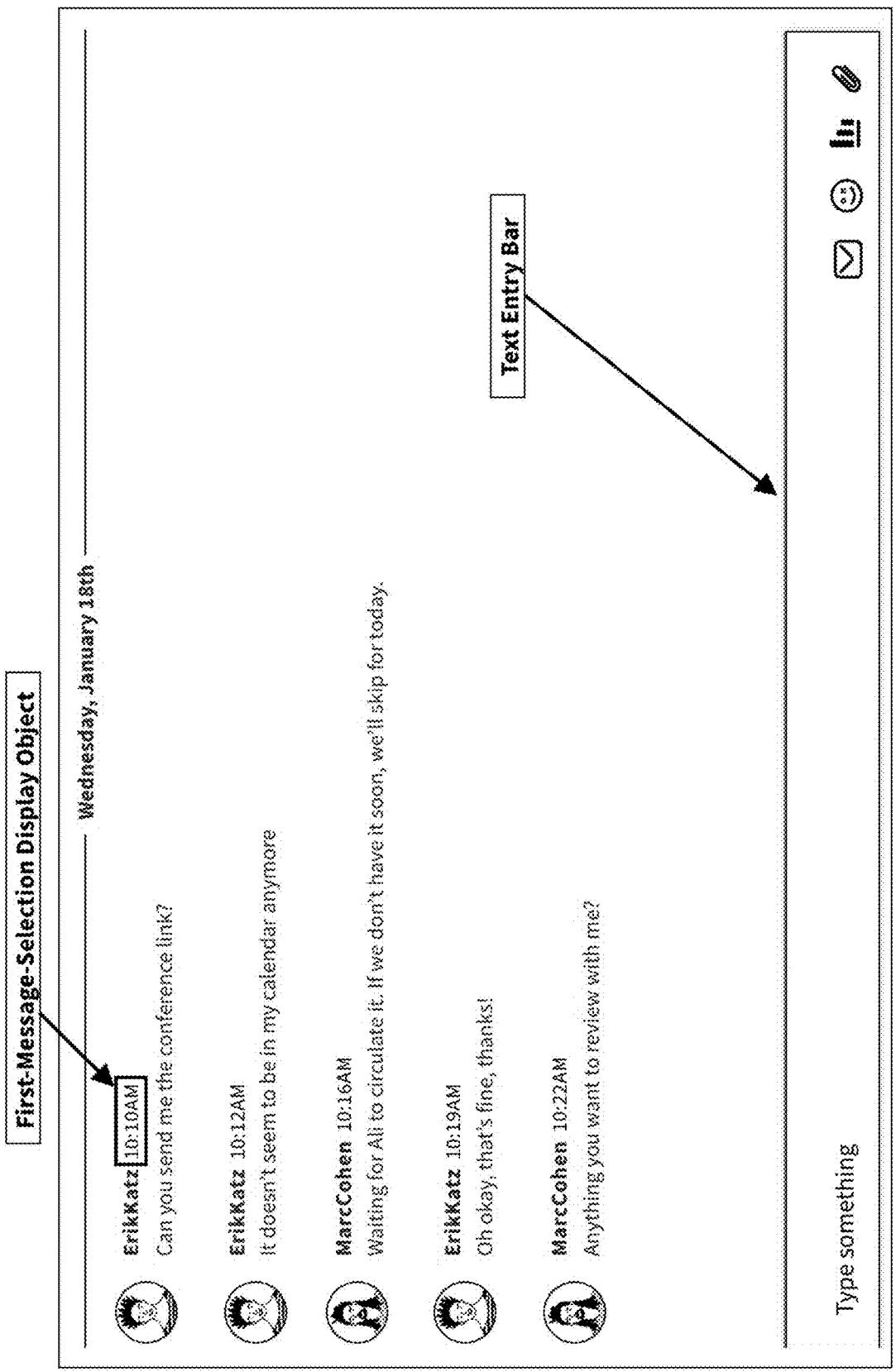
FIGS. 8A-8D are exemplary screen shots that illustrate exemplary operation of an exemplary embodiment of the present invention.

FIG. 8A-8D illustrates operation of an exemplary embodiment of the present invention. As shown in FIG. 8A, a plurality of messages have already been sent so that, in effect, a conversation (or chat) is occurring between two users. In the messages shown in FIG. 8A, two users ErikKatz (hereafter "EK") and MarcCohen (hereafter "MC") are having a chat. MC has sent a message to EK: "Anything you want to review with me?" MC now wants to send EK another message in which MC responds to EK's message "Can you send me the conference link?" (hereafter, "1st message"). It is noted in the example, however, that four messages have been sent between the 1st message and when MC is ready to send the $2^{nd}$ message (in response to the first message). The question then becomes, how does MC answer the first message without confusion because four messages have been sent in the interim? One solution identified by the inventor would be to copy the 1st message and transmit an answer to the first message along with a copy of the first message. There are difficulties with this approach. For example, copying a previous message and inserting the previous message can entail multiple steps including highlighting, selecting, copying, selecting and pasting. Also, when the copy of the first message is transmitted as part of the second message, the recipient of the $2^{nd}$ message may see more information than is desired. In accordance with an exemplary embodiment of the present invention, a text message box is displayed to the person who is sending the response to the first message—the response being the "$2^{nd}$ message." For purposes of this explanation, the person sending the first message (and receiving the second message) will be referred to as the $1^{st}$ user and the person sending the $2^{nd}$ message (and receiving the $1^{st}$ message) will be referred to as the $2^{nd}$ user. In FIG. 8A, the text message box is displayed to the $2^{nd}$ user so that the $2^{nd}$ user can enter the message (i.e. the second message) that will be transmitted to the $1^{st}$ user. As part of the $2^{nd}$ user constructing that $2^{nd}$ message, the $2^{nd}$ user wishes to reference the $1^{st}$ message.

In the example shown in FIG. 8A-8D, the following exemplary labels will be used for explanatory purposes (not all contents of each item are necessarily stated):

FIG. 8A: $1^{st}$ message displayed in message stream: "Can you send me the conference link?" plus the first-message-selection display object (timestamp "10:10 AM" in this example)

$1^{st}$ user: ErikKatz

FIG. 8A also illustrates that a plurality of messages follow the $1^{st}$ message in the message stream.

Figure 8B:
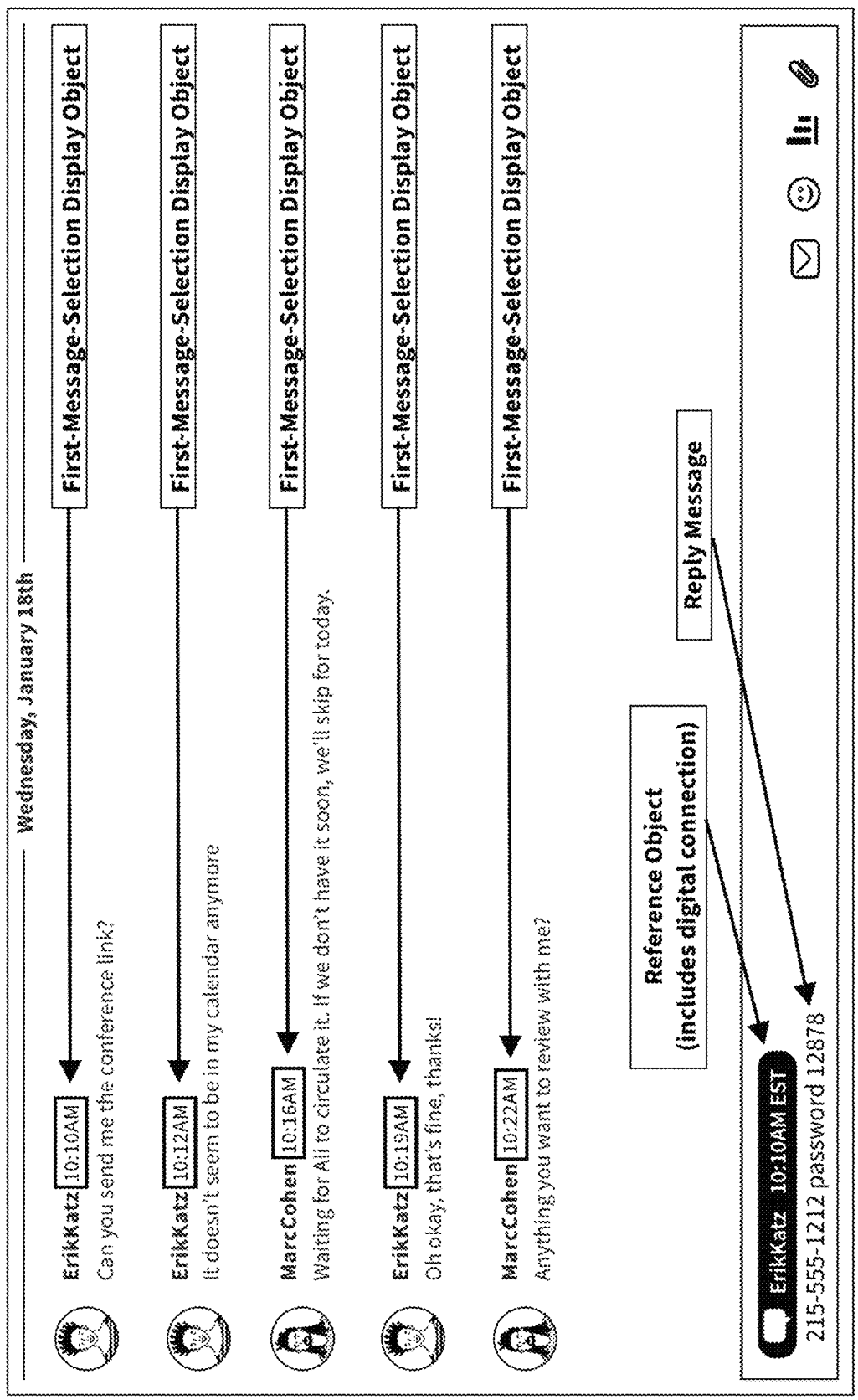

FIG. 8B ($2^{nd}$ message formation): Reply text, "215-555-1212 password 12878" plus the reference object associated with and indicating the selection of the $1^{st}$ message displayed in text entry bar.

$2^{nd}$ user: MarcCohen

Figure 8C:
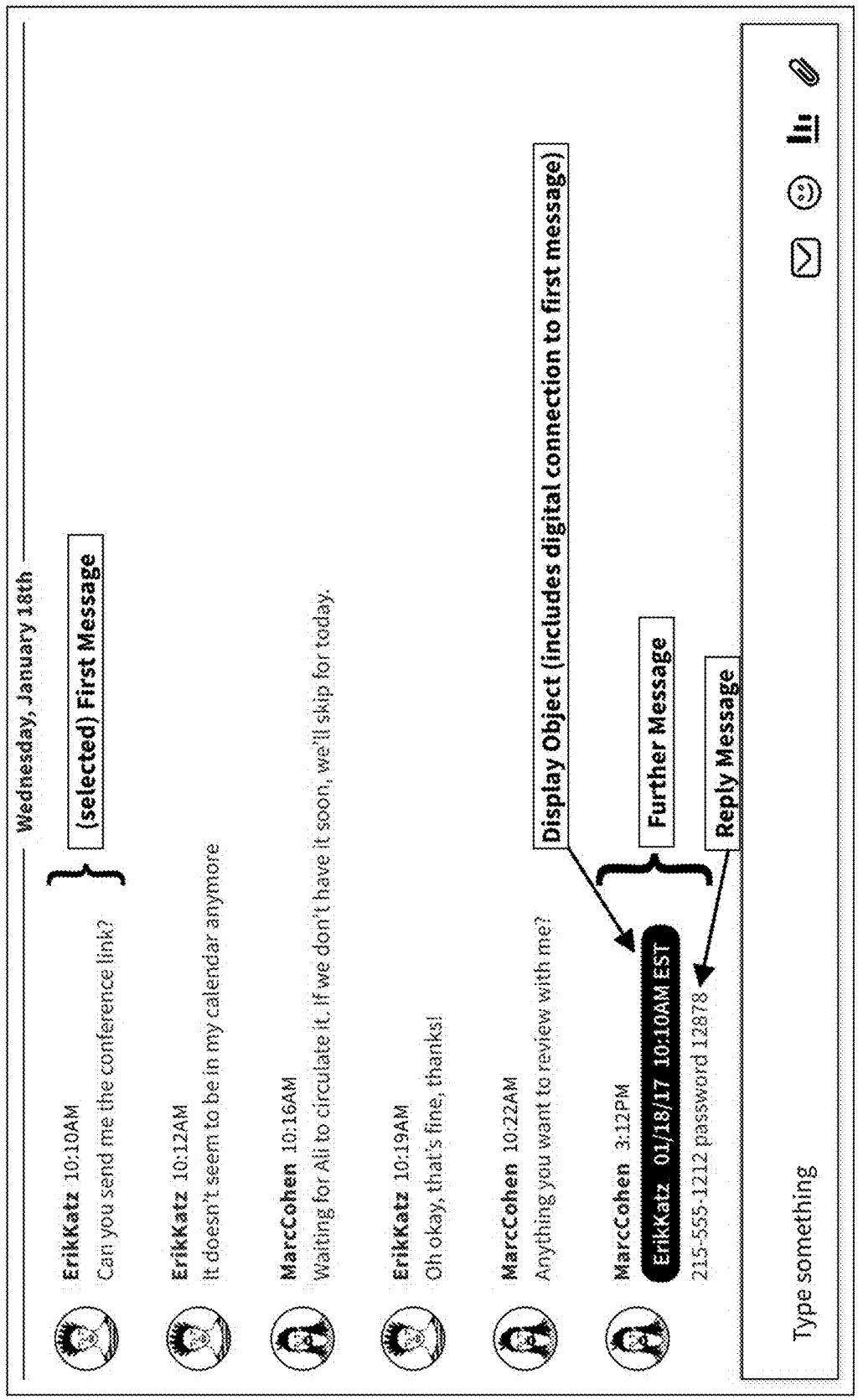

FIG. 8C. Further message (i.e., "$2^{nd}$ message") displayed in message stream:

Further message includes reply message: "215-555-1212 password 12878"

Display object: "ErikKatz 01/18/17 10:10 AM EST"

First Device: the device being used by MarcCohen

First Display: the display included in the First Device

Second Device: the device being used by ErikKatz

Second Display: the display included in the Second Device

The $1^{st}$ message (Can you send me the reference link?) is shown with the first-message-selection display object, namely (the time stamp in this example) 10:10 AM. The $2^{nd}$ user (MarcCohen) will select the first-message-selection display object. Selection of the first-message-selection display object is accomplished by various techniques including positioning a cursor over the first-message-selection display object and clicking, placing a finger over the first-messageselection display object on a touch screen, etc. These forms of selection are merely exemplary because selection can also include selecting another area associated with the 1$^{st}$ message, an object associated with the 1$^{st}$ message, text associated with the 1$^{st}$ message, etc. It is also noted that selection is accomplished by viewing whatever is to be selected on a display and by physical movement (or virtual movement) of what is being used to perform the selection. FIG. 8A also illustrates that once the first-message-selection display object is selected, part of the selection process may include changing how the first-message-selection display object is displayed.

In the above explanation, the first message is displayed on a first display. As an example, the first message has been selected by selecting an area or object of the first message that is displayed and that is associated with the first message.

While FIG. 8A illustrates a user clicking on the time ("first-message-selection display object"). This is merely exemplary as other areas of the object (or associated with the object) may be selected for initiating creation of the reference object during the process of creating the second message. In this exemplary step, selection is received from a (first) display of a (first) message (the first display is included in the first device). The selection is received by selecting an area or object of the (first) message that is displayed on the first display and associated with the (first) message. Furthermore, in an exemplary embodiment of the present invention, a text entry box is displayed. In FIG. 8A an exemplary text entry box is shown near the bottom of the illustrated screen. In an exemplary embodiment of the present invention, the text entry box is displayed before the selection occurs.

FIG. 8B illustrates what occurs after the first-message-selection display object (10:10 AM) associated with the 1$^{st}$ message has been selected. Thus, for example, FIG. 8B illustrates that a reference object has been inserted into the text entry box. The reference object shown for example in FIG. 8B is "ErikKatz 10:10 AM EST." The manner in which the reference object (i.e. name and time) appears is merely exemplary. The reference object shown in FIG. 8B includes a link (i.e., digital connection) to the 1st message. Thus, after the 2$^{nd}$ message (further message) is transmitted, the 1$^{st}$ user will receive the 2$^{nd}$ message (further message) and the 2$^{nd}$ message will include a display object. Selecting the display object in the 2$^{nd}$ message by the 1st user will cause the first message, or a portion of the 1st message to be displayed.

It is noted in this explanation that a reference object is inserted into a message when a message is created and a display object is displayed after the 2nd message (or any message) is received and displayed to the 1st user (or any user). Both the reference object and the display object reference (i.e. a digital connection to) the 1st message. For example, the reference object and the display object may both be a link (i.e. digital connection) to the 1st message. In one embodiment, the reference object and the display object both include the same link to the 1st message. In another exemplary embodiment, the reference object may include a 1st link to the 1st message, wherein the 1st link is replaced in the display object with a 2nd link to the 1st message. Alternately, or in addition, the reference object and the display object both link to the 1st message but differ in how they appear on a display. This is further described below.

FIG. 8B also illustrates that once the reference object has been inserted into the text message box, the 2nd user (in the example, MarcCohen) can continue to add text into the text message box. FIG. 8B illustrates additional text added into the text message box after the reference object has been inserted into the text message box. It is understood, however, that in some exemplary embodiments text can be added into the text message box before the reference object is added into the text message box. (See FIGS. 18A-18G)

In the above explanation, a further message is allowed to be formed responsive to the selection that was described with regard to FIG. 8A. In a further exemplary embodiment of the present invention, the formation is initiated by a single step that is the selection itself. The "single step" in such an exemplary embodiment is not an interaction with a menu.

After the 2nd user has completed entering text into the text message box (reply message) and causing the reference object to be added into the text message box, the 2nd user is then able to transmit the 2nd message ("further message") from the first device. After transmitting the 2nd message from the first device, the 2nd message will then appear as part of the chat. Thus, as shown, the first message is received on the first device and the further message is transmitted from the first device at respectively different times. Also, the further message is caused to be displayed in the message stream chronologically later than where the first message that received the selection appeared in the message stream. This is shown in FIG. 8C.

In FIG. 8C, the 2nd message appears as part of the chat (at 3:12 PM) and the reference object has been replaced with a display object (ErikKatz 01/18/17 10:10 AM EST). In FIG. 8C, the visual appearance of the display object is somewhat different than the visual appearance of the reference object that appeared in FIG. 8B. This variation in visual appearance between the reference object and the display object is merely exemplary.

FIG. 8C illustrates how the 1st user is able to view the chat (although the view being seen by the 2nd user might be similar or identical). The 1st user is then able to view the 1st message, or a portion thereof, or data associated therewith (redisplayed message), by selecting the display object. Selection, again, can include touching of a touchscreen above where the display object is displayed, virtual selection with a cursor, etc.

Figure 8D:
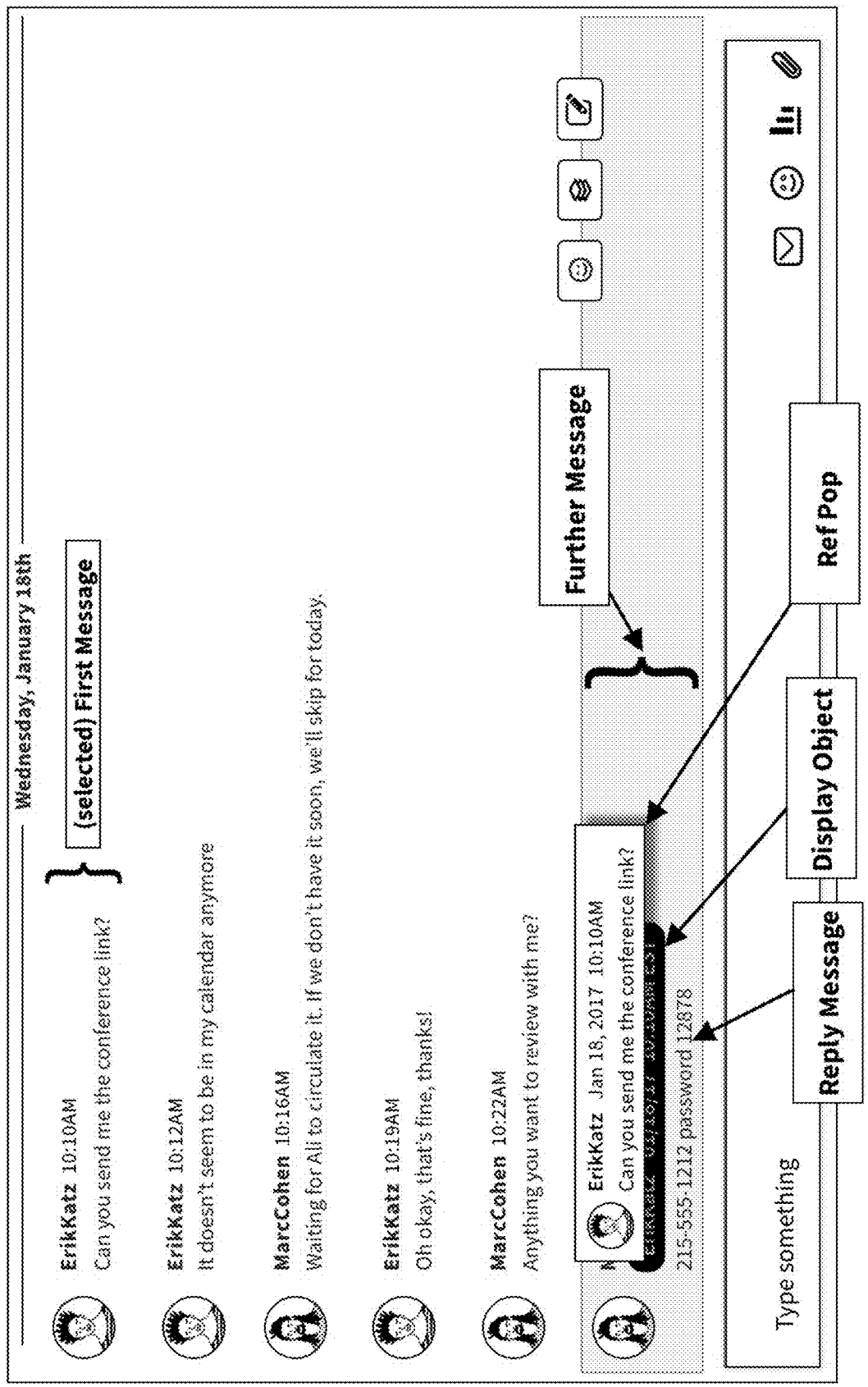

By selecting the display object, the 1st message (or portion thereof, or data associated therewith) may appear (redisplayed message) on the screen. This is illustrated in FIG. 8D. The 1st message, or portion thereof, appearing on the screen may appear by the 1st user selecting the display object, the 2nd user selecting the display object, or both. In other words, by interacting with the display object, and based on the digital connection, a visual change affecting display of the first message on the first device occurs. FIG. 8D illustrates the visual change being a "pop" of the first message, but it is understood that there are other ways to make a visual change affecting display of the first message. Examples of visual change include the use of highlighting, the use of color, the use of a visual flag, scrolling to the first message where it first appeared in the message stream, displaying the first message relative to the further message, how the first message is displayed relative to its associated display object, etc.

The above examples have included illustrations and descriptions of illustrative reference objects and display objects. It is understood, however, that the displays associated with reference objects and display objects are not limited to the examples provided above.

Assume, for example, that a reference object has the visual appearance "Sona G. 10:15 am" in the text entry box. In this regard, the label portion "Sona G." represents identifying information of the user that entered the previous chat message and the label "10:15 am" identifies the time the message was entered into the chat messaging system. In some implementations, other identifying information, such as the date in which the chat message was sent, can be included in the reference object display label. It should be noted that the above described visual appearance is merely an illustrative example. The identifying information for the reference object may include various other types of information, for example, plain text, images, audio/video mediums and other types of identifying information. The identifying information can also be inferred, derived or looked-up info. For example, the link could provide information over and above that which was included in the actual message—i.e., address and phone number—or even an advertisement or coupon based on the content or some known attributes of the $1^{st}$ message. Ex. "First 10 people who Reference this message get 25% discount coupon good for admission" the Ref Pop can be an ad—this is a desirable way to have an ad embedded by known users into messages other users will see.

The reference object, in one or more exemplary embodiments, can be inserted anywhere in the text entry box. For example, the reference object can be inserted to the left or right of the text entry box cursor either initially or at any time after the user has initiated their message. In this regard, the location of the insertion of the reference object is controlled by the location of the text box cursor. The reference object can also be in another form, such as a highlighted background color that serves to indicate that the second message is linked to the first message (i.e. clicking anywhere the background color appears) would reveal the popup message. In some exemplary embodiments, the user may include additional text that can be entered into the text entry box either before or after the placement of the reference object.

In one or more exemplary embodiments, multiple previous messages (i.e., multiple first messages) can be referenced and included in the message stream. If multiple messages are referenced, then one or more of the reference objects are displayed. For example, the user may select a first-message-selection display object associated with the date/time field of a second chat message. The interaction of the user with the first-message-selection display object may activate the reference generation module of the chat messaging system for the second chat message. A second reference object noting certain identifying information of the chat message may be inserted in the text entry box of the interface portal. The second reference object, in one or more exemplary embodiments, can be inserted anywhere in the text entry box. As noted above, the user may include additional text that can be entered into the text entry box either before or after the placement of the second reference object. It is possible for the same message to be referenced multiple times by different new messages at any time in the future (or in the past).

Figure 9:
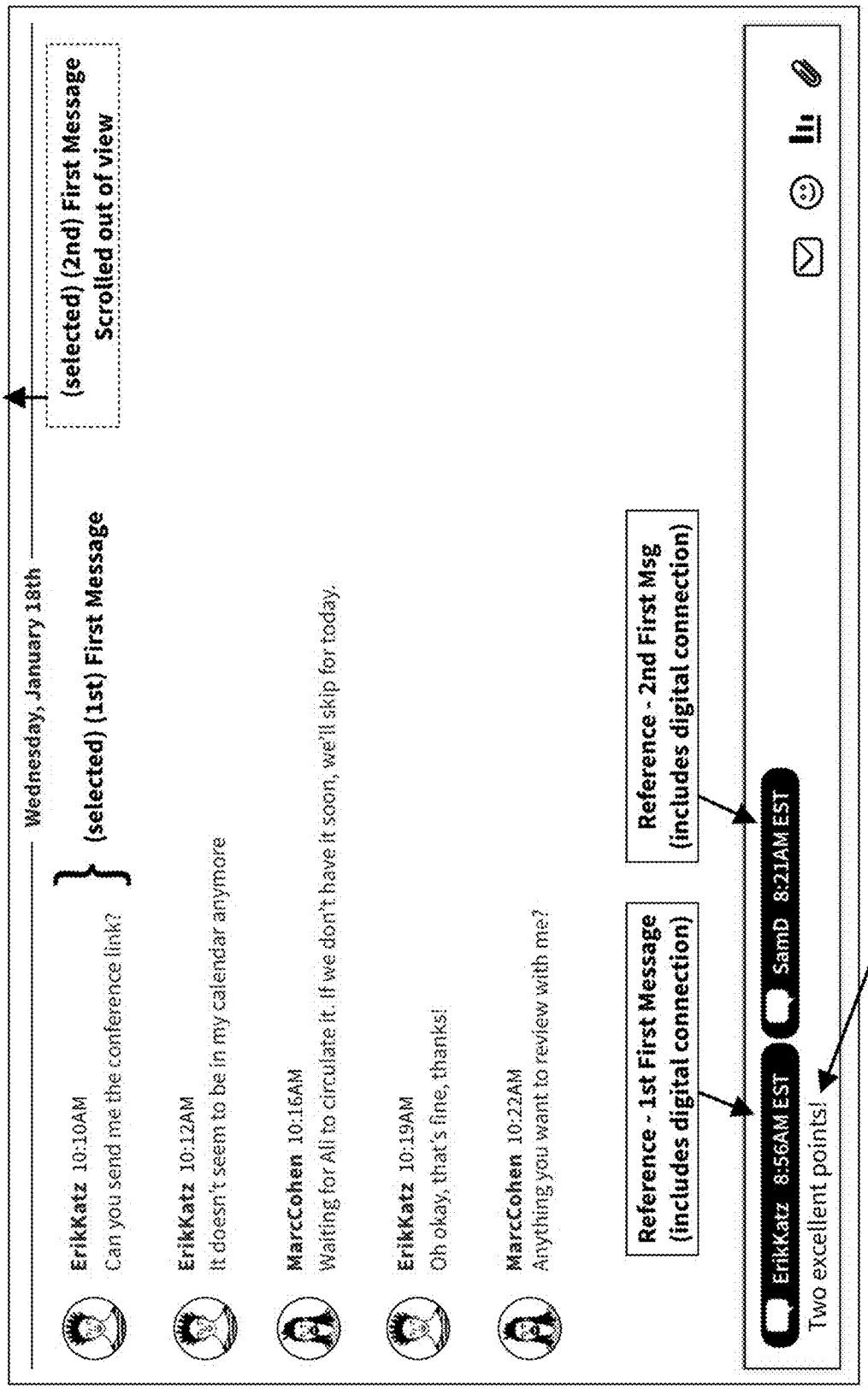
FIG. 9 is an exemplary screen shot that illustrates exemplary operation of an exemplary embodiment of the present invention.

FIG. 9 illustrates an exemplary embodiment in which two different previous messages are being referenced. As shown, two first-message-selection display objects have been selected. Therefore, two different reference objects have been inserted into the text entry box. The resulting message, once sent, may include two different display objects.

Figure 10A:
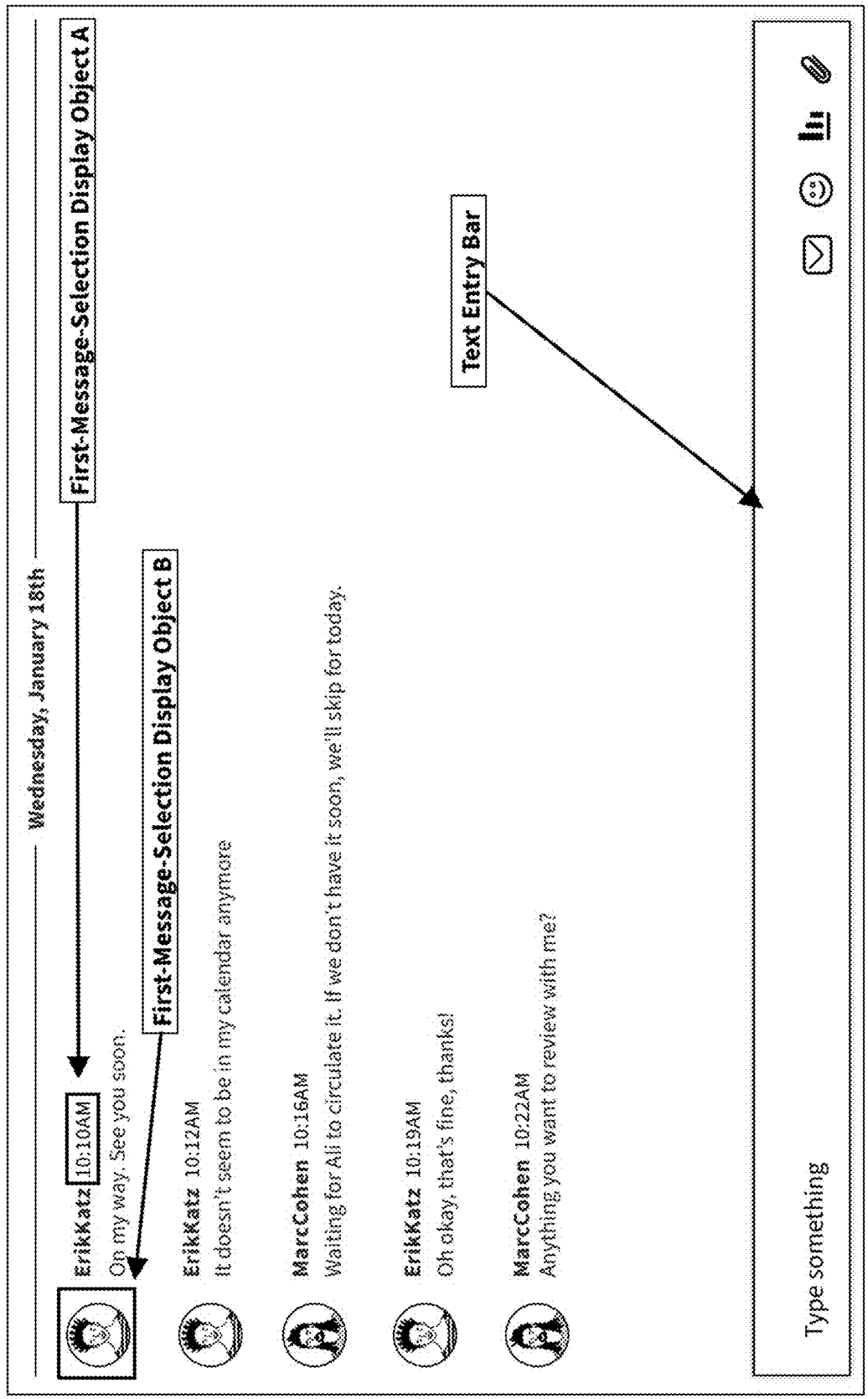
FIGS. 10A-10C are exemplary screen shots that illustrate exemplary operation of an exemplary embodiment of the present invention.
Figure 10B:
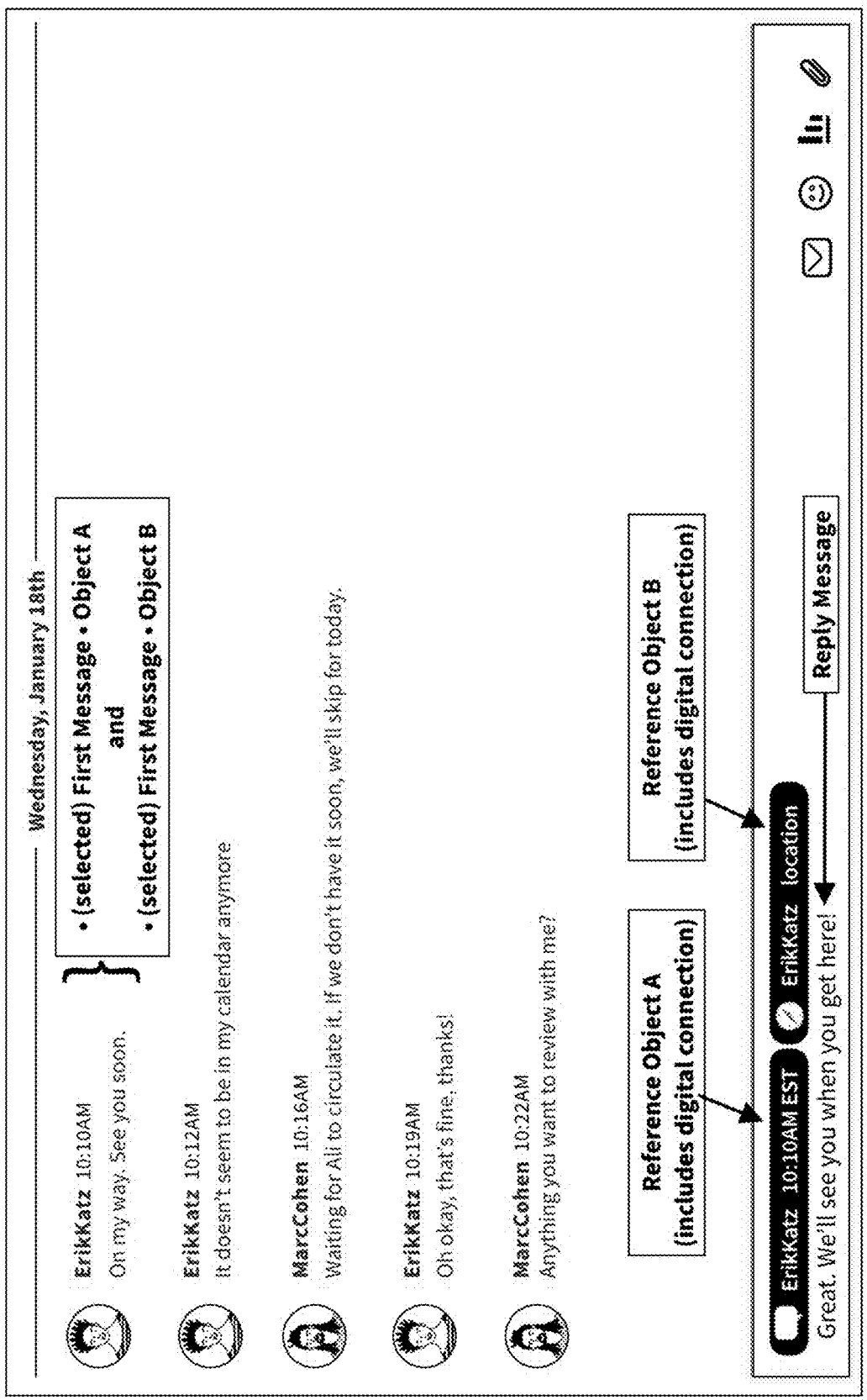
Figure 10C:
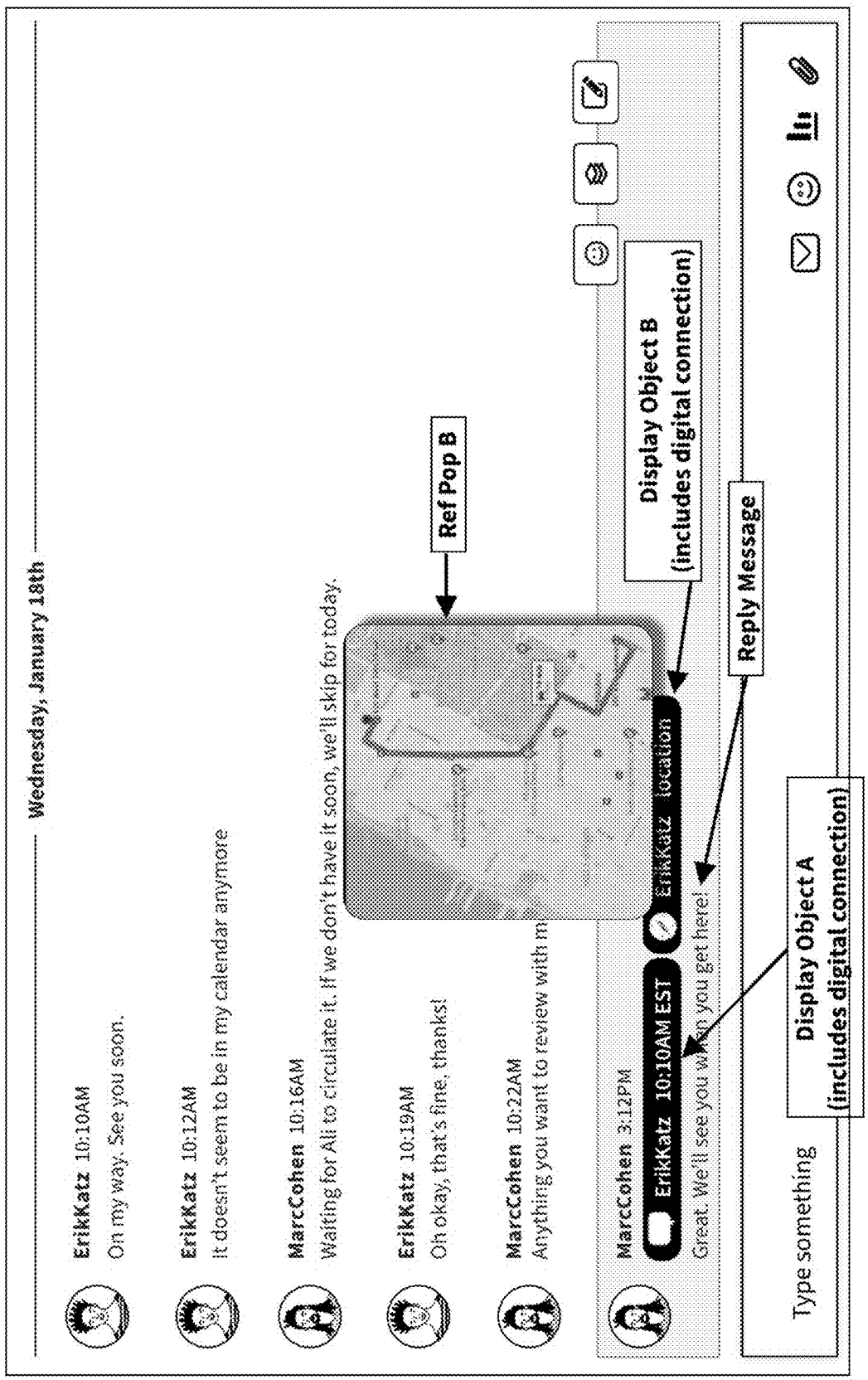

FIGS. 10A-10C illustrate a further exemplary embodiment of the present invention. As illustrated in FIG. 10A, a first message may include two or more different first-message-selection display objects (including first-message-selection display objects A and B, for example), and a different action occurs depending upon which first-message-selection display object is selected. To put it another way, a different action may occur depending upon which first-message-selection display object of the first message is selected for creation of a reference object. In the example shown, in FIG. 10A, selection of the first-message-selection display object 10:10 AM results in the display of the message associated with the first-message-selection display object 10:10 AM. Furthermore, selection of the first-message-selection display object that is represented as the person's face results in the display of location (e.g. GPS information) of that person. The display of contact information is merely exemplary as any other type of data may also be displayed (e.g. contact information, a hyperlink, etc.). In the illustrated exemplary embodiment, display of location information (e.g. GPS information) is the result of set up information that is pre-stored prior to selection of the display object. In FIG. 10B, as a result of the selection of the two selection display objects in FIG. 10A, two corresponding reference objects are inserted into the text entry box. FIG. 10C illustrates that after the message that has been entered in FIG. 10B is transmitted, the further message then appears with two corresponding display objects (Display Object A and Display Object B, for example). Furthermore, FIG. 10C illustrates that by hovering over (i.e. selecting) the right-most display object, a map showing the location of ErikKatz appears. This map is merely exemplary.

Figure 11A:
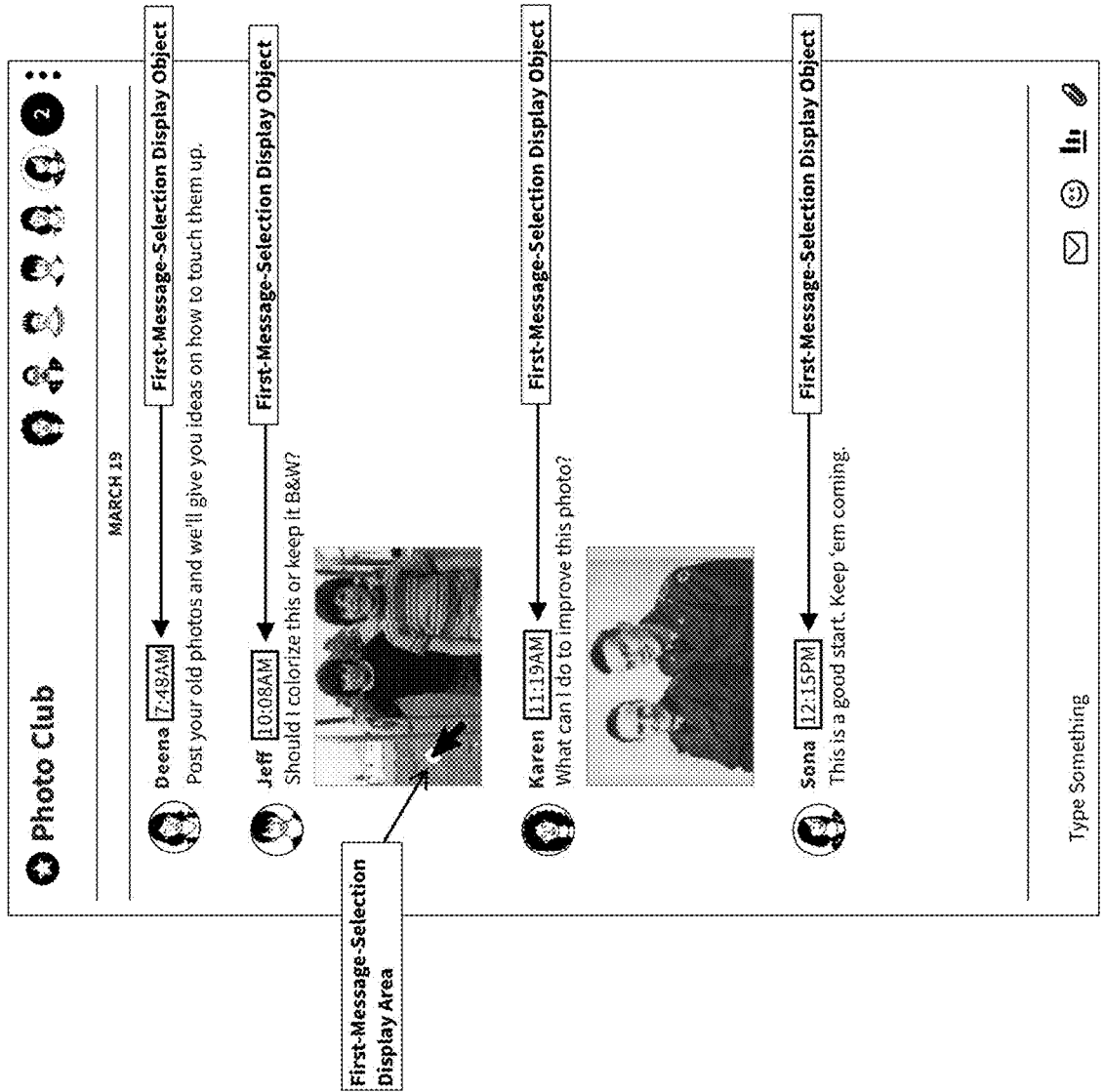
FIGS. 11A-11D are exemplary screen shots that illustrate exemplary operation of an exemplary embodiment of the present invention.
Figure 11B:
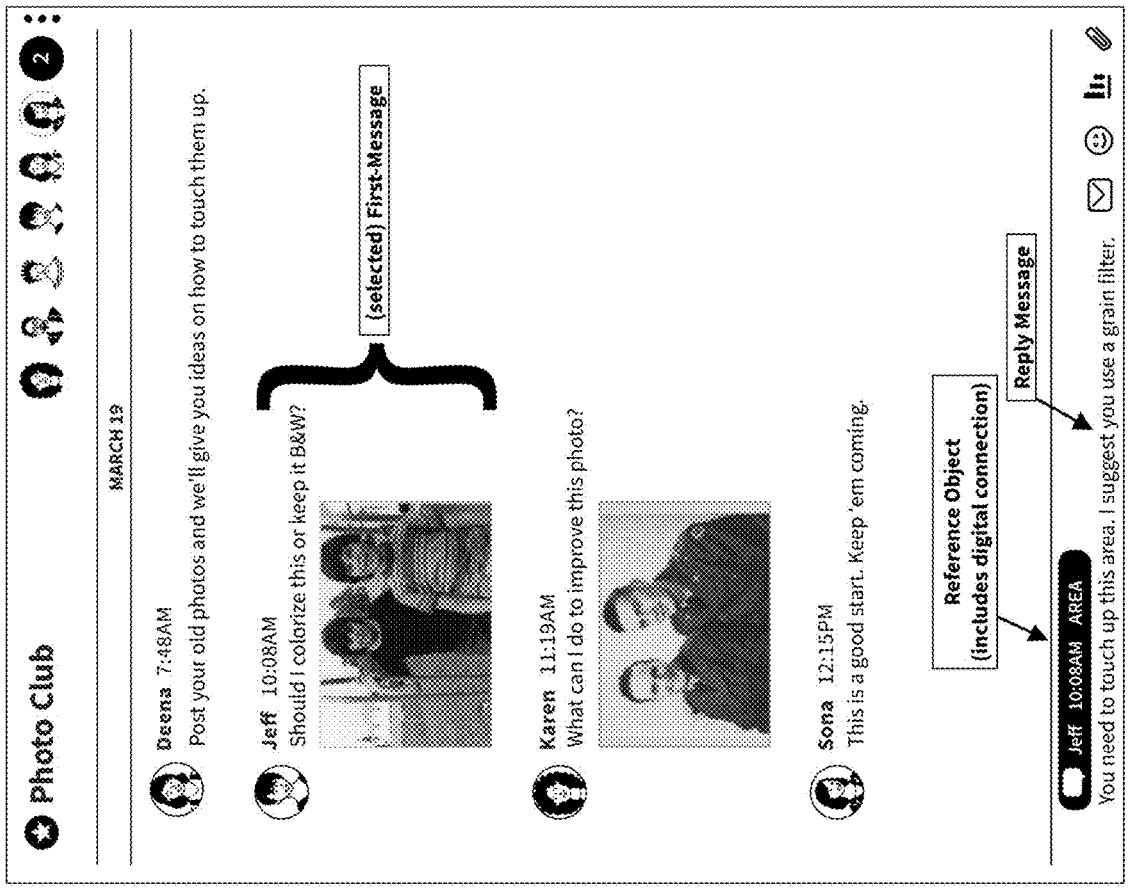
Figure 11C:
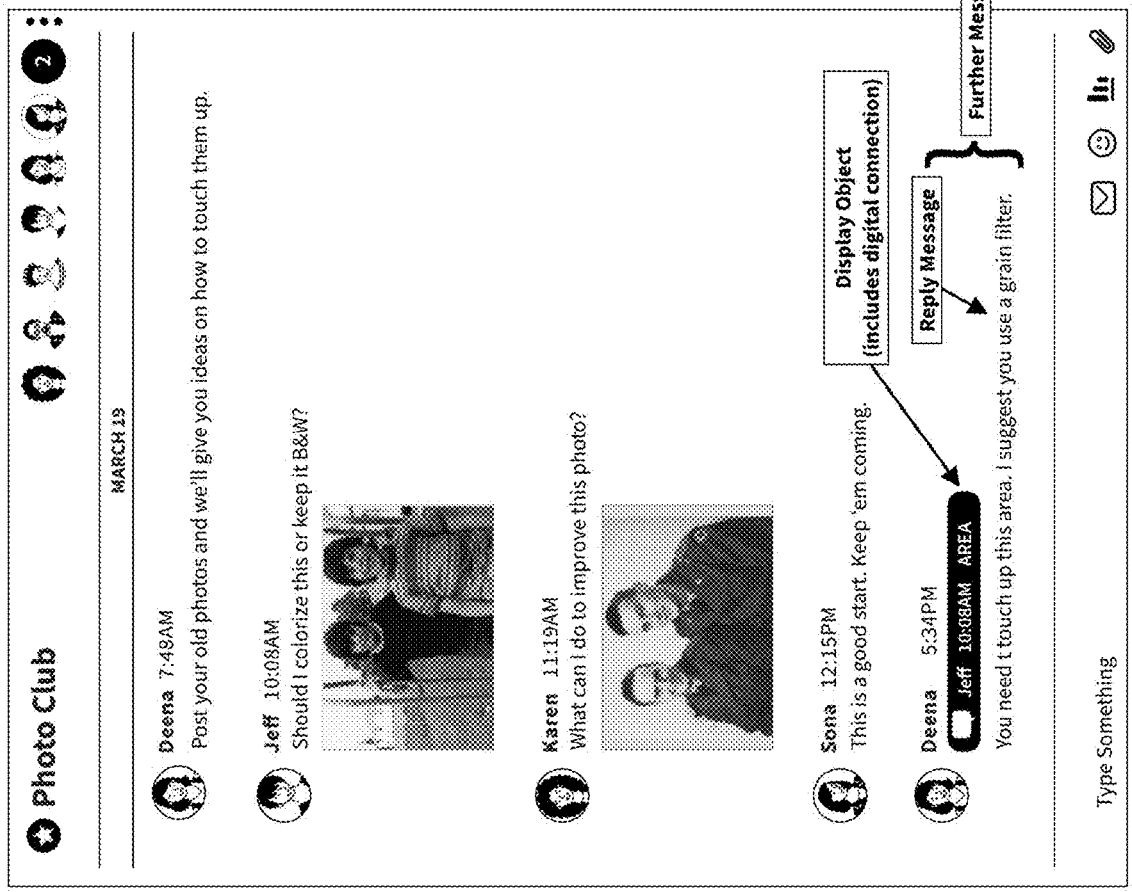
Figure 11D:
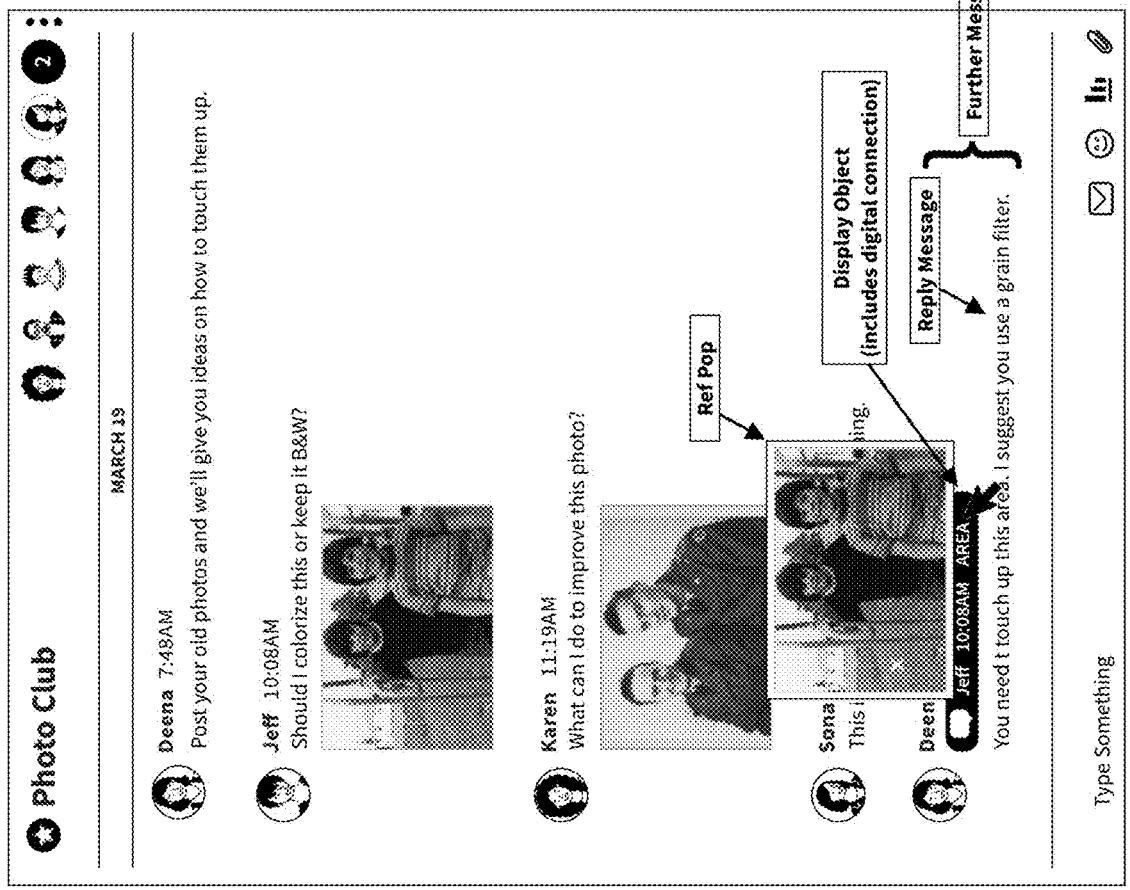

FIGS. 11A-11D illustrate a further exemplary embodiment of the present invention. These figures illustrate how it is possible to reference something other than a text message. In this case a photo is being referenced. Furthermore, the referenced photo optionally indicates an area of interest that has been indicated by a user. As illustrated in FIG. 11A, a stream of exemplary messages includes photographs. Furthermore, in this example, Deena wishes to give advice regarding Jeff's photograph. Deena selects Jeff's photograph so that a reference object (and subsequent display object) can be created that references Jeff's photograph. But Denna has also selected a portion of Jeff's photograph (shown in the figure by a white circle). FIG. 11B illustrates that a reference object has been inserted into the text entry box that references Jeff's photo with the white dot selected portion. In FIG. 11C, Deena has sent the message, which now appears with a display object that corresponds to the reference object that was inserted into the text entry box in FIG. 11B. In FIG. 11D, when the display object is selected, the photo (with the indicated portion—indicated by an "x") appears (in this embodiment as a pop up).

Figure 12:
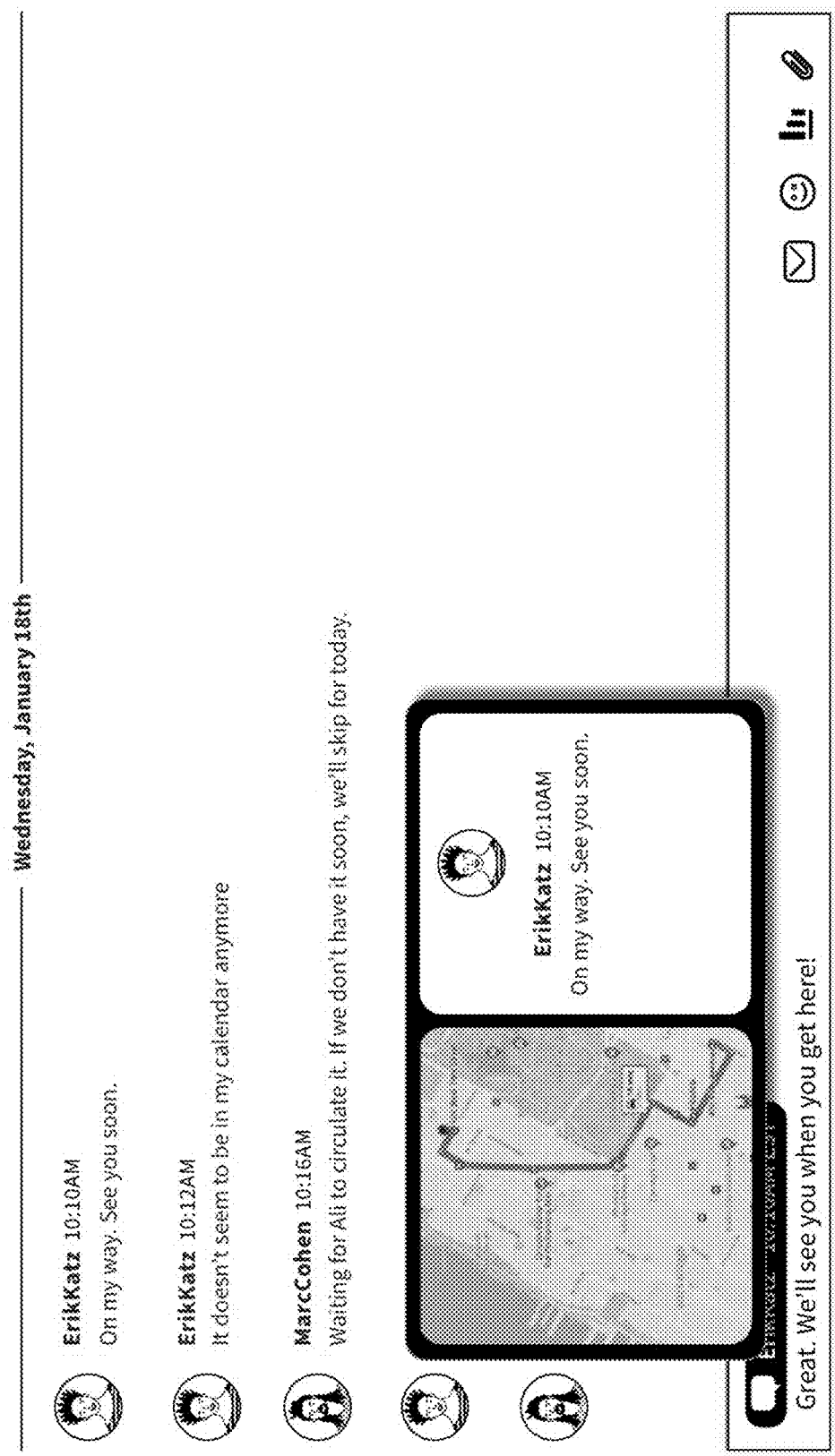
FIG. 12 is an exemplary screen shot that illustrates exemplary operation of an exemplary embodiment of the present invention.

FIG. 12 illustrates an exemplary embodiment of the present invention in which, when a display object is selected, an image based on additional data appears based on predefined rules. In FIG. 12, for example, the predefined rule is that when a display object for ErikKatz is selected, an image showing the location of ErikKatz (based for example on GPS data) also appears. While the image shown in FIG. 12 is a map with location data, this image is merely exemplary.

Figure 13A:
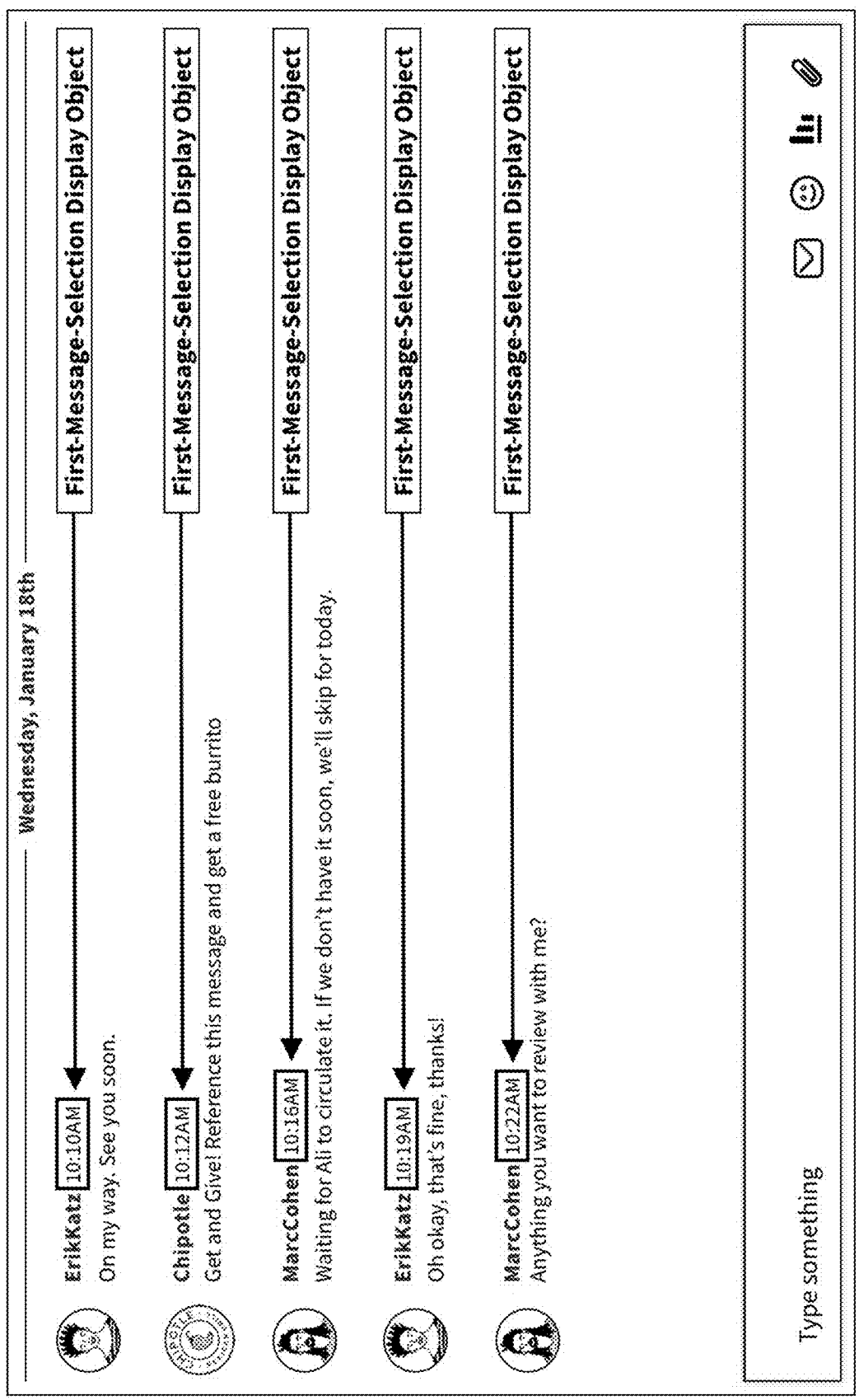
Figure 13C:
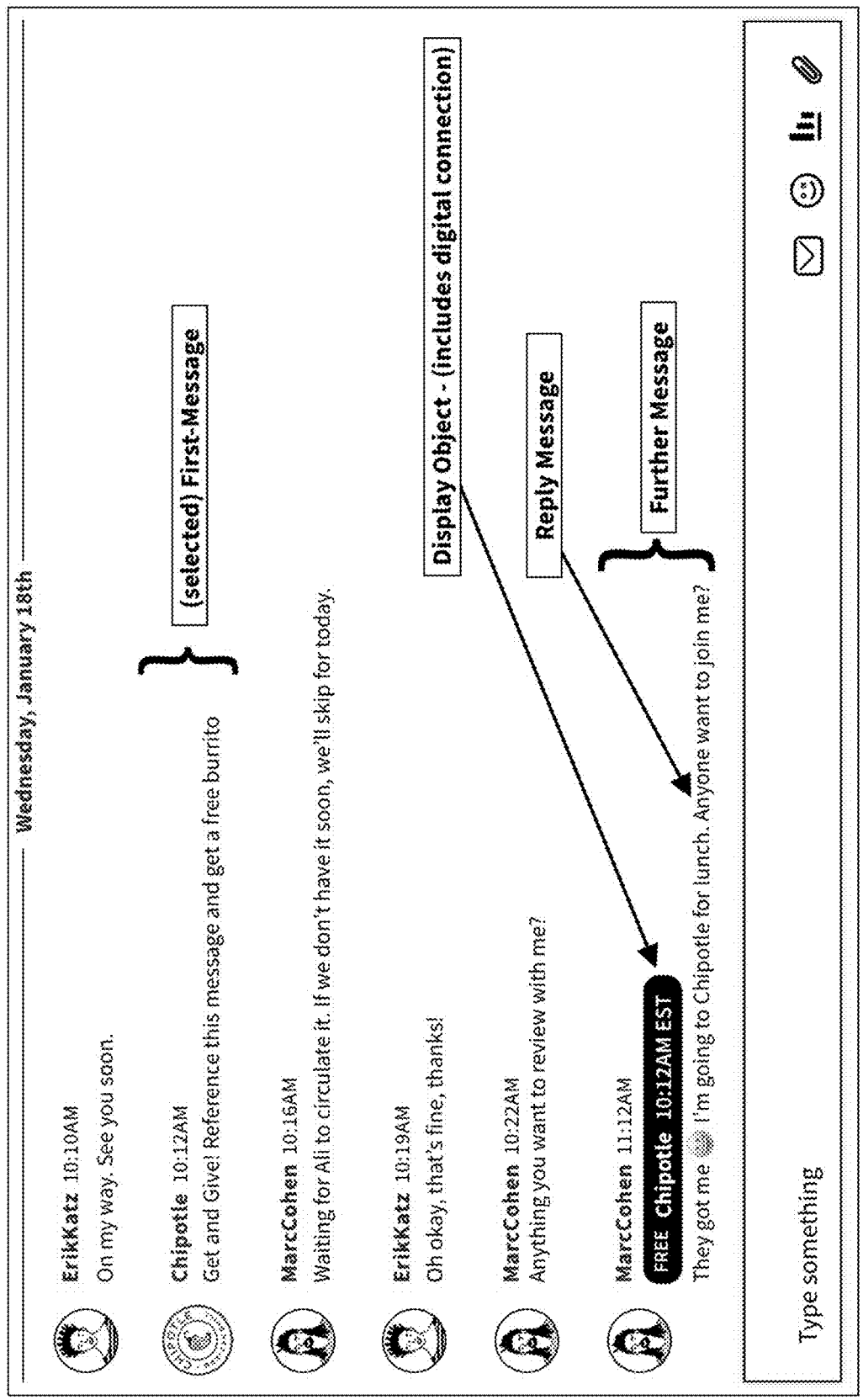
Figure 13D:
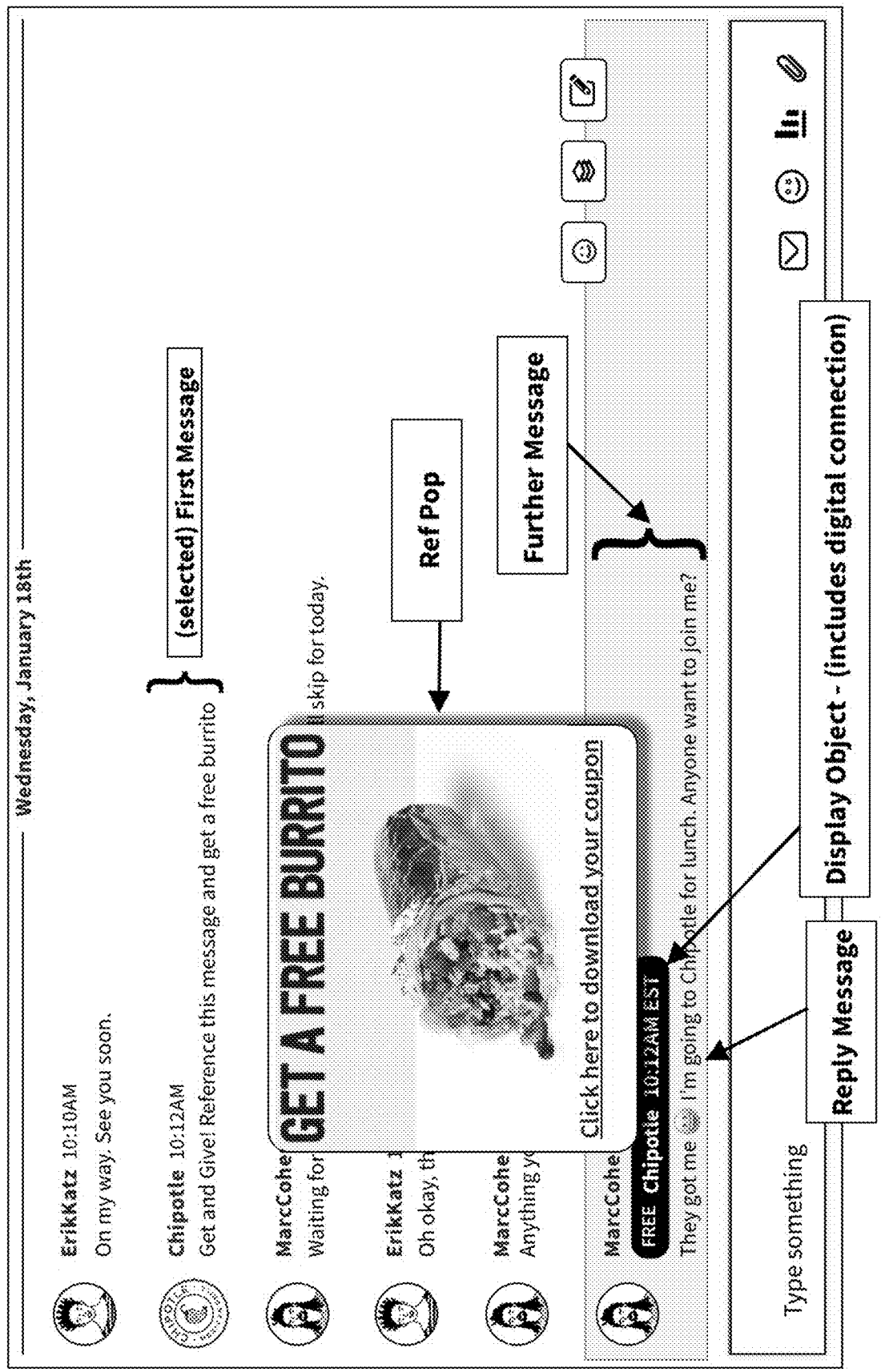

FIGS. 13A-D illustrate a further exemplary embodiment of the present invention, in which selection of a display object does not reference a previously displayed (or later displayed message) but instead references other data—in this example an advertisement. In FIG. 13A, the first-message-selection display object for the Chipotle message has been referenced. Thus, in FIG. 13B, a reference object corresponding to the first-message-selection display object referenced in FIG. 13A is inserted into the text entry box. Once transmitted, a message appears in FIG. 13C that includes a display object corresponding to the reference object inserted into the text entry box in FIG. 13B. FIG. 13D illustrates an exemplary image that appears when the display object illustrated in FIG. 13C is selected. The exemplary image may appear as a popup, but this is merely exemplary as the image may appear using other display mechanisms. Selection, as in the other embodiments can be in the form of hovering, a click (from an I/O device such as a mouse), or some other action. As shown in FIG. 13D, the exemplary image in the popup includes a link that can be selected for a further action to occur. In this example, clicking the link results in the user (i.e. the user that created the message with the display object) receiving a promotion (i.e. free food). The promotion can be sent as a data transmission in a variety of manners including text, email, a popup, etc. The text can be sent, for example, simultaneously with the display of a popup on the screen where the display object has been selected.

In the above explanation, the result of the actions described is the display of a popup that includes a digital link which, when clicked, results in access to a discount coupon (for example). This is merely exemplary. Other actions may occur upon selection of a field in such an exemplary popup, or instead of or in addition to display of the popup. Exemplary actions include initiation of an SMS text message, saving messages to an application (such as Evernote), popping up an additional window (which may also include a link that can be selected for further action to occur), and/or other actions.

In several exemplary embodiments, a first message is displayed before a second message is formed with a reference object (that may be converted to a display object). In those embodiments, after the second message is formed, when the display object associated with the second message is selected, the information associated with the first message that is displayed is at least a portion (e.g. text) of the first message that was displayed. The examples illustrated in FIGS. 13A-D show a feature in place of, or in addition to the above feature. In the examples illustrated in FIGS. 13A-D, again, a first message ("Get and Give! Reference this message and get a free burrito") is displayed before a second message ("They got me . . . I'm going to Chipotle for lunch. Anyone want to join me?") is formed with a reference object (that may be converted to a display object). After the second message is formed, however, when the display object ("FREE Chipotle 10:12 AM EST") associated with the second message is selected, information associated with the first message that is displayed is other than any portion of the message that was displayed (e.g. an advertisement).

Figure 14A:
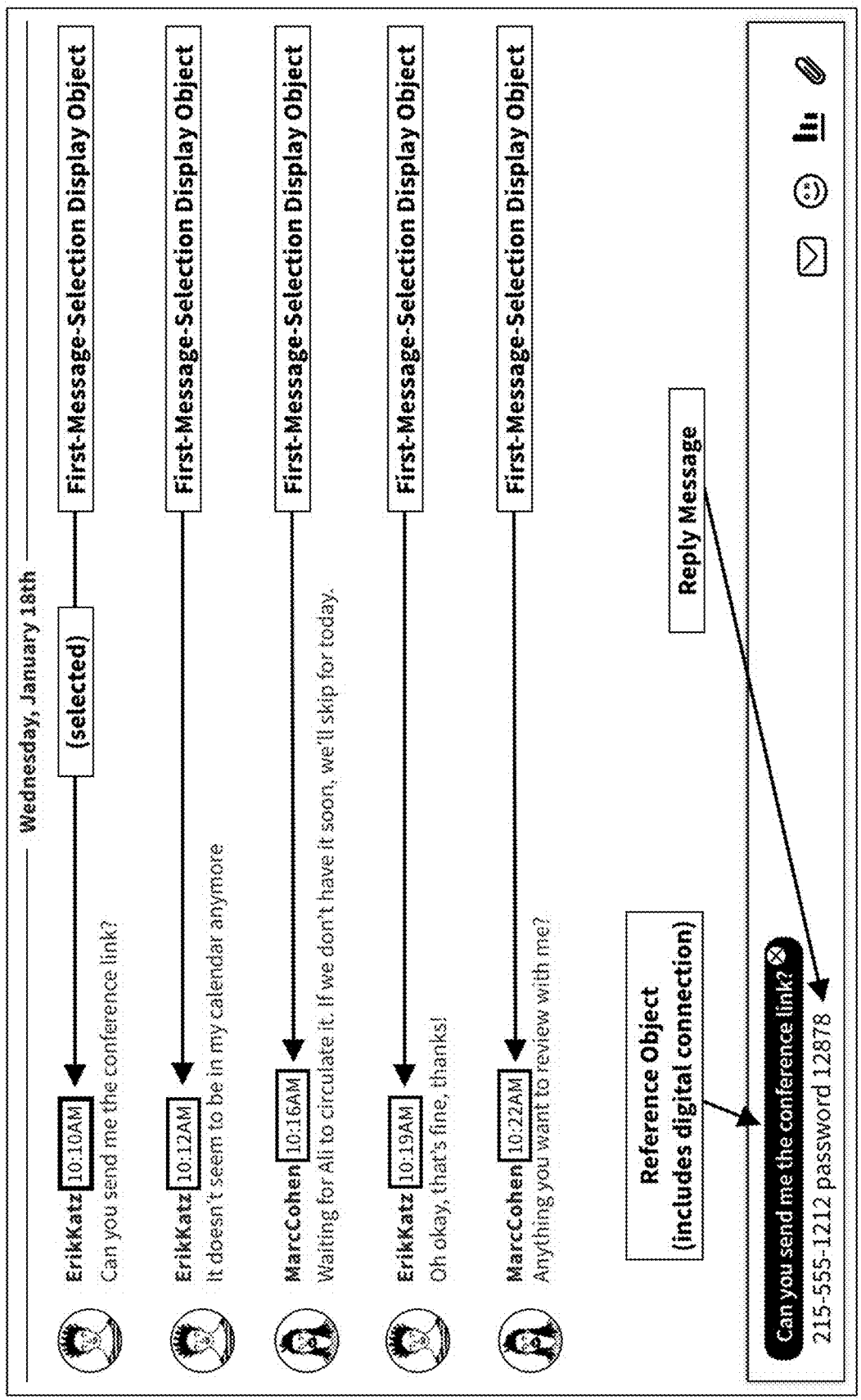
FIGS. 14A-14B are exemplary screen shots that illustrate exemplary operation of a further exemplary embodiment of the present invention.
Figure 14B:
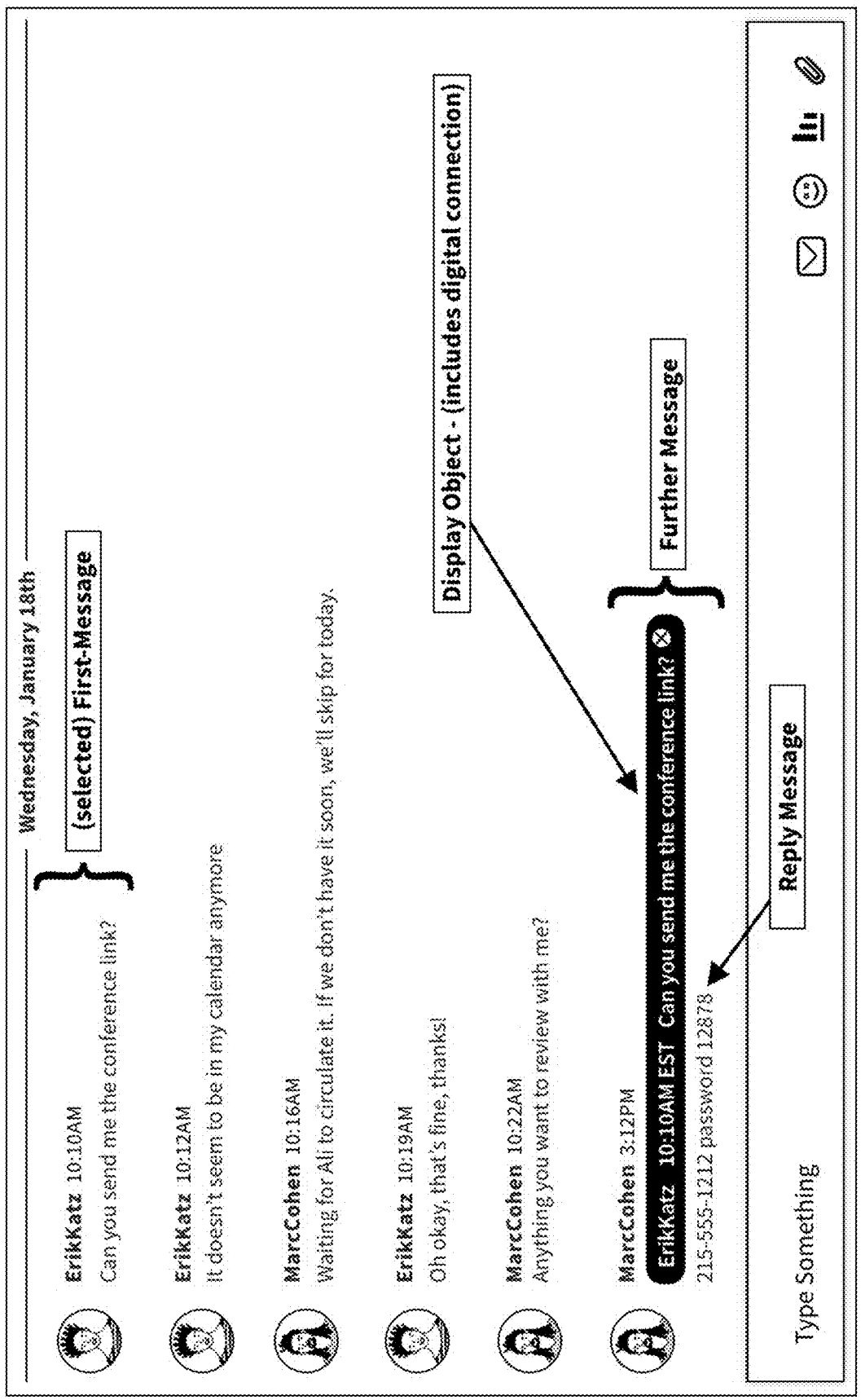

FIGS. 14A-14B are screenshots that illustrate a further exemplary embodiment of the present invention. In FIG. 14A, MarcCohen wishes to send a message to ErikKatz. MarcCohen also wishes to respond to ErikKatz's question that appears at the top of the figure, "Can you send me the conference link?" However, since several messages have been exchanged since ErikKatz asked his question, MarcCohen wishes ErikKatz's question (or portion thereof) to appear again (in some manner, for example as a display object) when MarcCohen sends his message to ErikKatz (similarly, for example, to the steps that are illustrated in FIGS. 8A-8D).

While FIG. 14A illustrates a user clicking on the time, this is merely exemplary as other areas or objects (or areas or objects associated with the object) that may be selected for initiating creation of the reference object during the process of creating the second message.

FIG. 14A illustrates what occurs after the object associated with the first message has been selected. Thus, for example, FIG. 14A illustrates that a reference object has been inserted into the text entry box. The reference object shown for example in FIG. 14A is "Can you send me the conference link?" The manner in which the reference object is inserted is merely exemplary. The reference object shown in FIG. 14A may include a link to the first message (or the link may be created later, or not at all). Thus, after the second message is transmitted, the first user will receive the second message and the second message will include a display object. In this example the copy of the first message included in the display object (redisplayed message) includes a link to the first message. The display object may appear as soon as the second message is received by the second user.

It is noted in this explanation that a reference object may be inserted into a message when a message is created and a display object is displayed after the second message is received and displayed to the first user (or any user). Both the reference object and the display object reference the first message or are simply a copy of the first message. For example, the reference object and the display object may simply be a copy of the text of the first message (or alternatively both may be a link to the first message). Thus, for example, the copy of the text of the first message is the redisplayed message. Thus, the redisplayed message may be a display object.

In an embodiment, the reference object and the display object both include the same link to the first message.

In another exemplary embodiment, the reference object may include a first link to the first message, wherein the first link is replaced in the display object with a second link to the first message. Alternately, or in addition, the reference object and the display object both link to the first message but differ in how they appear on a display.

In a further alternative embodiment, the reference object and display object are both copies of the first message. Copies of the first message may include a link (i.e. digital connection) to the first message for the purpose of maintaining synchronicity between the first message and the redisplayed message. This is further described below.

In an exemplary embodiment of the present invention, the second message maintains a digital connection with the first message. So, if the first message is edited the "Ref Pop" (what a user sees when selecting the reference object) displays the first message with its edits. In addition to the benefit of displaying the most recently edited version of a referenced message (i.e. the referenced message is in sync on the respective devices of each message stream participant), another benefit of this approach is the fact that embedded links and files that are part of the first message remain actionable and/or downloadable when the reference object is selected.

FIG. 14A also illustrates that once the reference object (such as the actual text of the first message) has been inserted into the text message box, the second user can continue to add text into the text message box.

It is understood, however, that in some exemplary embodiments text can be added into the text message box before the reference object is added into the text message box.

After the second user has completed entering text into the text message box and causing the reference object to be added into the text message box, the second user is then able to transmit the second message. After transmitting the second message, the second message will then appear as part of the chat. This is shown in FIG. 14B. In FIG. 14B, the second message appears as part of the chat and the text (partial or entire) from the first message appears (in one exemplary embodiment the reference object has been replaced with a display object). In FIG. 14B, the visual appearance of the text from the first message (or the display object) is somewhat different than the visual appearance of the text that appeared from the first message (or the reference object) that appeared in FIG. 14A. For example, the message may be in italics, bolded, indented, highlighted, with a different font, or some other distinguish characteristics. This variation in visual appearance of the first message (or of the reference object and the display object) is merely exemplary, and alternatively, this variation may not appear at all. In this embodiment an interaction with the display object causes a jump back (such as an immediate "jump" or an automatic scroll back) to the first message in its original location in the message stream.

Figure 15A:
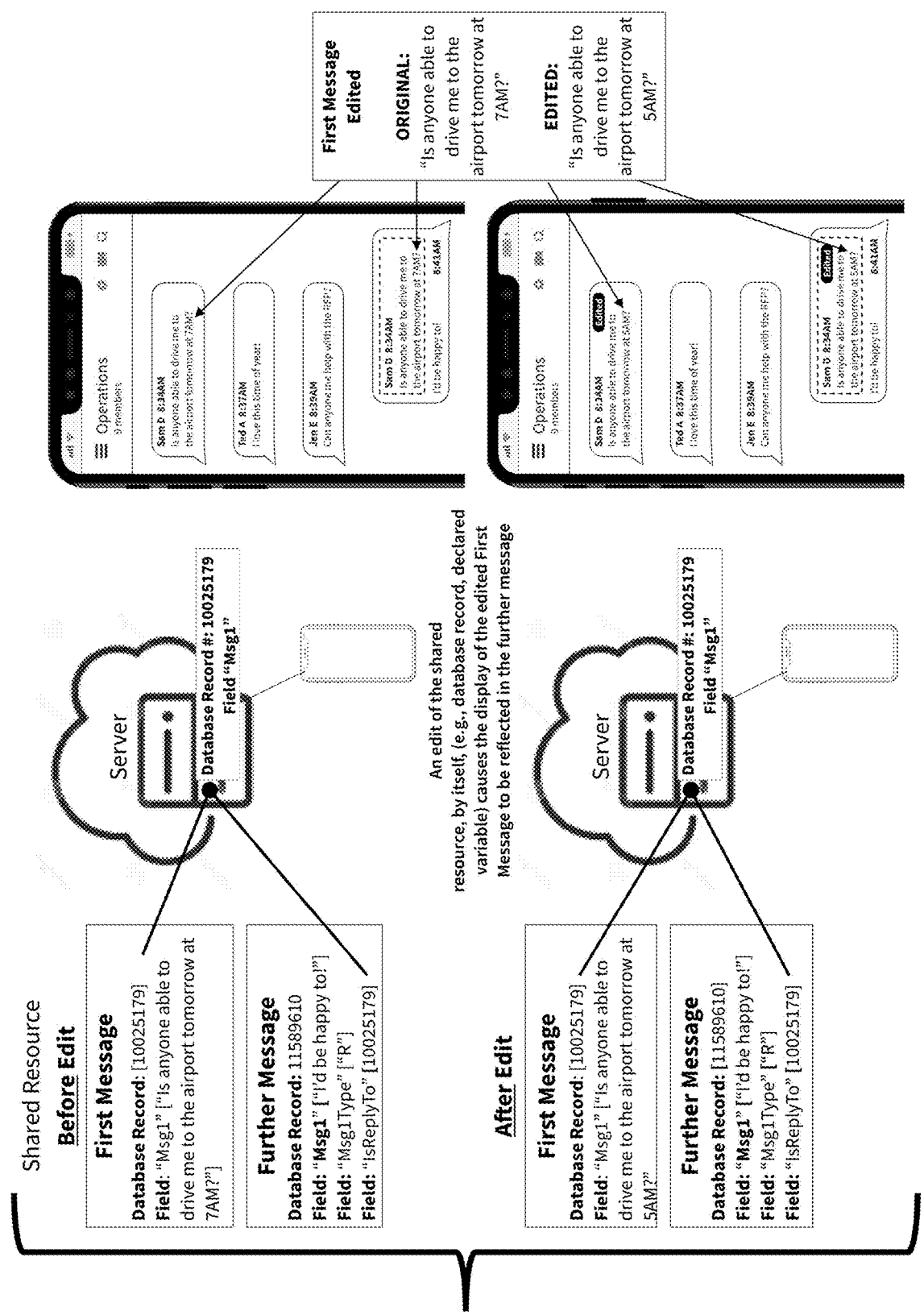
FIG. 15A illustrate exemplary screenshots and exemplary resources for achieving message synchronicity between a first message and a quoted portion of said first message.
Figure 15B:
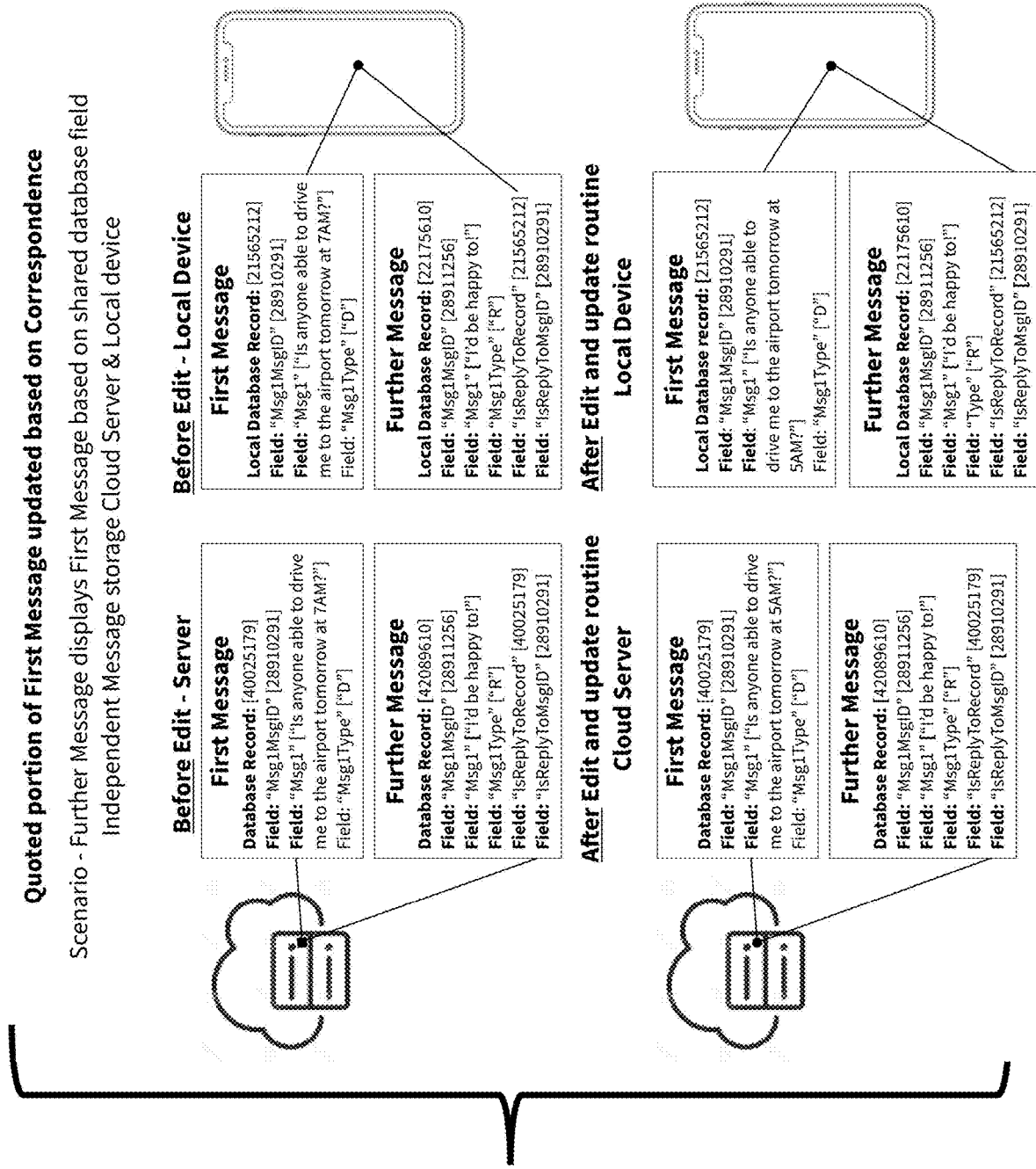
FIG. 15B illustrates exemplary resources for achieving message synchronicity between a first message and a quoted portion of said first message.

FIG. 15A, FIGS. 15B and 15C illustrate further exemplary embodiments of the present invention. In these exemplary embodiments, message synchronicity is achieved between a first message, and a quoted portion of said first message (redisplayed message) that is associated with a further message. In particular, these exemplary embodiments are with regard to an edit enabled and quote-reply enabled messaging system. In these exemplary embodiments, the first message is accessed from a shared resource (such as a data storage location that may be included for example in a cloud server, a record in a shared database, a declared variable). Thus, the quoted portion of the first message, and the first message outside of being quoted (for example, when the first message appears in the message stream before being quoted) are both accessed from the shared resource. In FIG. 15A, by accessing the first message from a shared resource, synchronicity is achieved between occurrences of the first message in the message stream (the occurrence of the first message if it was previously quoted before an edit, occurrences if the first message is quoted after an edit, and the occurrence of the first message itself if and after it has been edited). In FIG. 15B, the receiving device retrieves the message type ("Edited" message type) from the message packet associated with the transmitted edited message, the receiving device then updates the corresponding first message content field based on the transmitted message identifier. In FIG. 15B, the edited message is then stored in the "Msg1" field of the record, which is a shared database resource. In this manner occurrences of the first message associated with further messages are synchronized. In FIG. 15C, as an alternative to accessing the first message from a shared resource, and in a further exemplary embodiment of the present invention, the first message may be accessed via corresponding message identifiers. Each exemplary embodiment is described below.

FIG. 15A is an exemplary embodiment that illustrates an edited first message. Assume a message stream within a messaging channel, and two users, each using a respective device, participate in the message stream. Assume a first user participates in the message stream using a first device and a second user participates in the message stream using a second device. Also assume a second user transmits a first message in the message stream, the first user received the first message, and the first user responds to the first message with a further message that quotes the first message. Subsequently, the second user edits the first message. In an exemplary embodiment of the present invention, the edits to the first message are incorporated in both instances of the first message in the messaging stream: the instance of the first message in which the first message was placed into the message stream by the second user, and the instance of the first message in which the first message was quoted in the further message.

FIG. 15A illustrates the first message and the further message, before the first message is edited and after the first message is edited. In this exemplary embodiment, at the top of the figure, the first message is stored in a shared resource, (such as a data storage location that may be included for example in a cloud server, a record in a shared database, a declared variable). In this exemplary embodiment (device and message stream shown top right quadrant), Sam D has texted at 8:34 AM: "Is anyone able to drive me to the airport tomorrow at 7 AM?" This is the first message. The user of the illustrated device has responded: "I'd be happy to!" and has quoted the first message. The response and a digital connection (which is used for displaying the first message) form the further message.

As shown (top left quadrant) of the figure, the first message is stored in a database record [10025179]. Information associated with the first message is stored in fields associated with the record. The content of the first message, "Is anyone able to drive me to the airport tomorrow at 7 AM?" is stored in a field named "Msg1." In addition, "D" to indicate that the message is of the type "Default" is stored in a field named "Msg1Type." Additional fields associated with the message, such as sender identifying information, channel name, message transmission date and time may be provided. The content of the first message, in this example, based on its Record Number and "Msg1" field, is displayed both as part of the initial first message and again when the first message is quoted as part of the further message.

The bottom left quadrant and bottom right quadrant of FIG. 15A illustrate the first message and the further message, after the first message has been edited. As can be seen in this exemplary embodiment, the content of the "Msg1" field associated with the first message is still accessed from the same database Record whether it is being accessed by the first message (before being quoted in the further message) or by the further message (after having quoted or while quoting the first message).

Thus, in this example, when the first message is edited by the second user, the edit and associated data, if any, such as date and time of the edit, are reflected in the appropriate fields associated with the first message (database at record number [10025179]) and is automatically incorporated into the quoted portion of the first message in the further message because the first occurrence of the first message (the original message) and the second occurrence of the first message (being quoted in the further message) are both displayed based on the contents of the shared database resource in the cloud server. Again, the edit itself to first message causes the value of the shared database resource to be updated. This has the effect of causing all occurrences of the first message to reflect the update.

In this embodiment the Further Message (Record Number [11589610]) stores the Record Number [10025179] of the associated quoted First Message in its "IsReplyTo" field. In this embodiment the Further Message's reply message content is stored in the "Msg1" field. In this example a field named "Msg1Type" is included to identify the type of message stored in the "Msg1" field. So, for example, in the box labeled "First Message" (left-bottom quadrant) below the words "After Edit" the Msg1Type is "D" (a Default type message) and the Message type (Msg1Type) of the Further message is "R" (a Quote-Reply type message). Because the message type is "R" it is known that the message stored in its own "Msg1" field (a reply message) should be displayed with the content of the "Msg1" field of the Record Number stored in its ([11589610]) "IsReplyTo" field (the number stored in the "IsReplyTo" field is 10025179] By using this approach, the reply message is also a first message in its own right, meaning that for the purpose of displaying the further message, the reply message will be displayed with the referenced first message, but the reply message stored in the field "Msg1," can also be "quoted," i.e., a selected first message, and included, in a further, further message.

FIG. 15B illustrates a further exemplary embodiment of the present invention in which data is independently stored (e.g., stored both on a cloud server and device such as a mobile phone). In this exemplary embodiment, a message identifier may be used to establish correspondence between messages stored in two locations, respectively. In this exemplary embodiment, an edit to a first message can cause an application routine to run on for example, the mobile phone, which in turn can locate instances in the local store of the mobile phone of the message identifier associated with the edited message. This in turn can cause the update in the local storage of all messages corresponding to the message identifier of the edited message.

In some embodiments using message identifiers, for example, to establish correspondence between messages stored both locally and on a cloud server (for example), other mechanisms can be used to synchronize an instance of a first message on a cloud server and in local storage, when or after that first message is edited. For example, as illustrated in FIG. 15B, message synchronization between a first message and further messages that include a display of the first message, could be caused to occur through use of a shared field in a local database record, so for example, updating a first message content field (e.g., "Msg1" field) could result in the display of the edited version of the first message in further messages that retrieve the field data associated with the message identifier associated with the first message.

FIG. 15C illustrates a further exemplary embodiment of the present invention in which data is independently stored (e.g., stored both on a cloud server and device such as a mobile phone). In this exemplary embodiment, a message identifier may be used to establish correspondence between messages stored in two locations, respectively. In this exemplary embodiment, an edit to a first message can cause an application routine to run on for example, the mobile phone, which in turn can locate instances in the local store of the mobile phone of the message identifier associated with the edited message. This in turn can cause the update in the local storage of all messages corresponding to the message identifier of the edited message.

In some embodiments using message identifiers, for example, to establish correspondence between messages stored both locally and on a cloud server (for example), other mechanisms can be used to synchronize an instance of a first message on a cloud server and in local storage, when or after that first message is edited. For example, message synchronization could be caused to occur periodically, or when a user scrolls, switches channels, or otherwise causes the display of messages in the message stream to change. Message synchronization could thus occur after polling to identify an edit, or based on an interrupt.

FIG. 15C illustrates that an edit of a First Message stored in the database on the cloud server causes the First Message stored on the server to become out of sync with the version of the first message having a corresponding Message Identifier that is stored on a receiving device.

To achieve synchronicity between a newly edited message stored on, for example, a cloud server, and a device with its own independent message store, the receiving device (e.g., a mobile phone) desirably recognizes that an edit to the first message has taken place on the sending device (e.g., the server) to then cause a process of locating and updating any instances of the edited message in its local store of corresponding messages (in this example, correspondence is identified based on Message Identifiers).

In the embodiment illustrated in this figure, a further message includes a reply message and a static copy of (a version of) the first message at the moment the further message was initially created. To achieve synchronicity between an edited message stored on the server and the version of the first message stored locally, the version of the first message, stored locally, is desirably updated to reflect the edit made on the server. In addition, since in this embodiment, the first message is included in the display of further messages (i.e., message's that display a reply message in response to a quoted first message) it is desirable to reflect the edit to the first message in associated further messages. See also FIGS. 25A-25B.

Figure 25A:
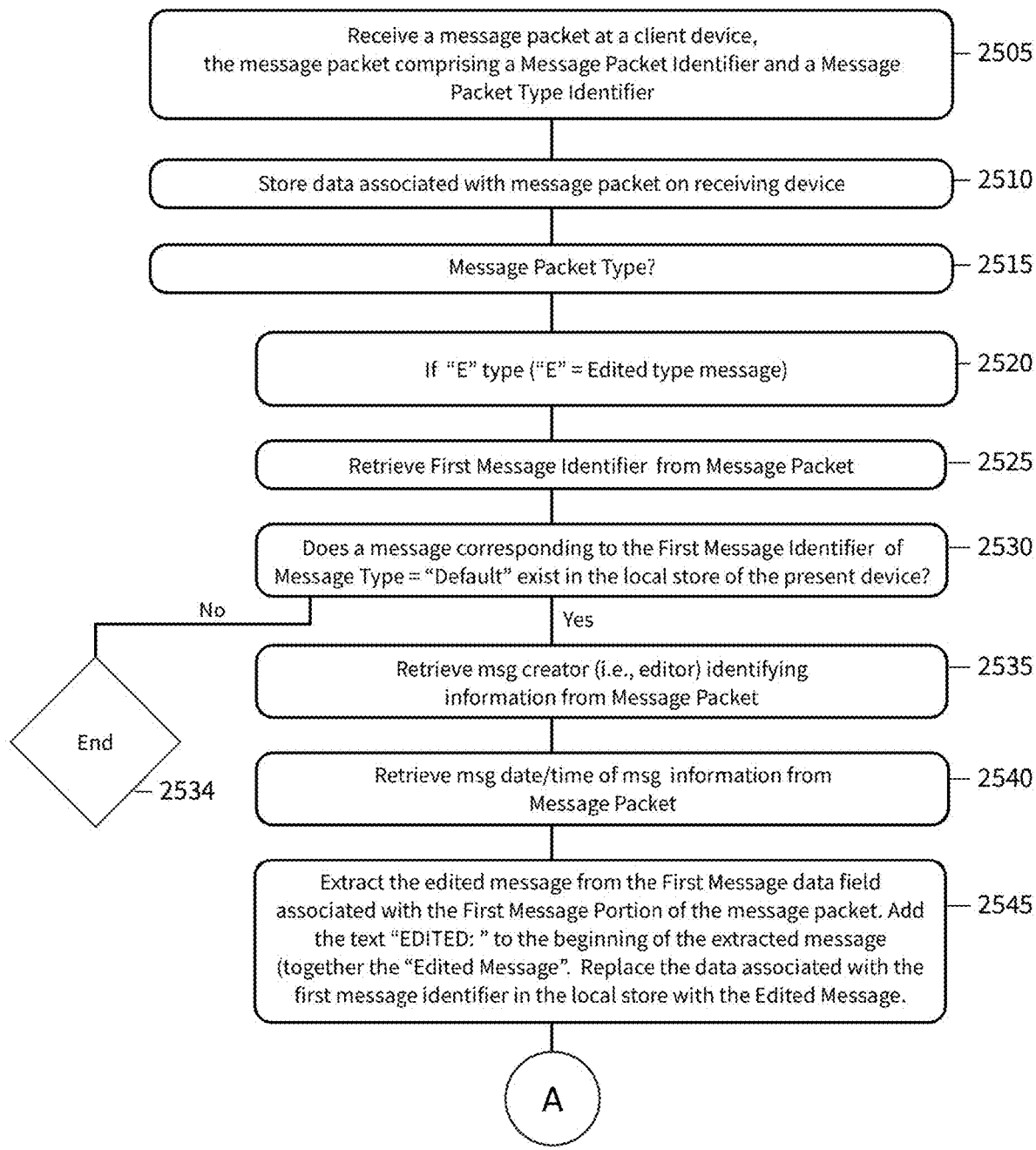
FIG. 25A-25B is a flowchart diagram that illustrates exemplary message flow in accordance with an exemplary embodiment of the present invention.
Figure 25B:
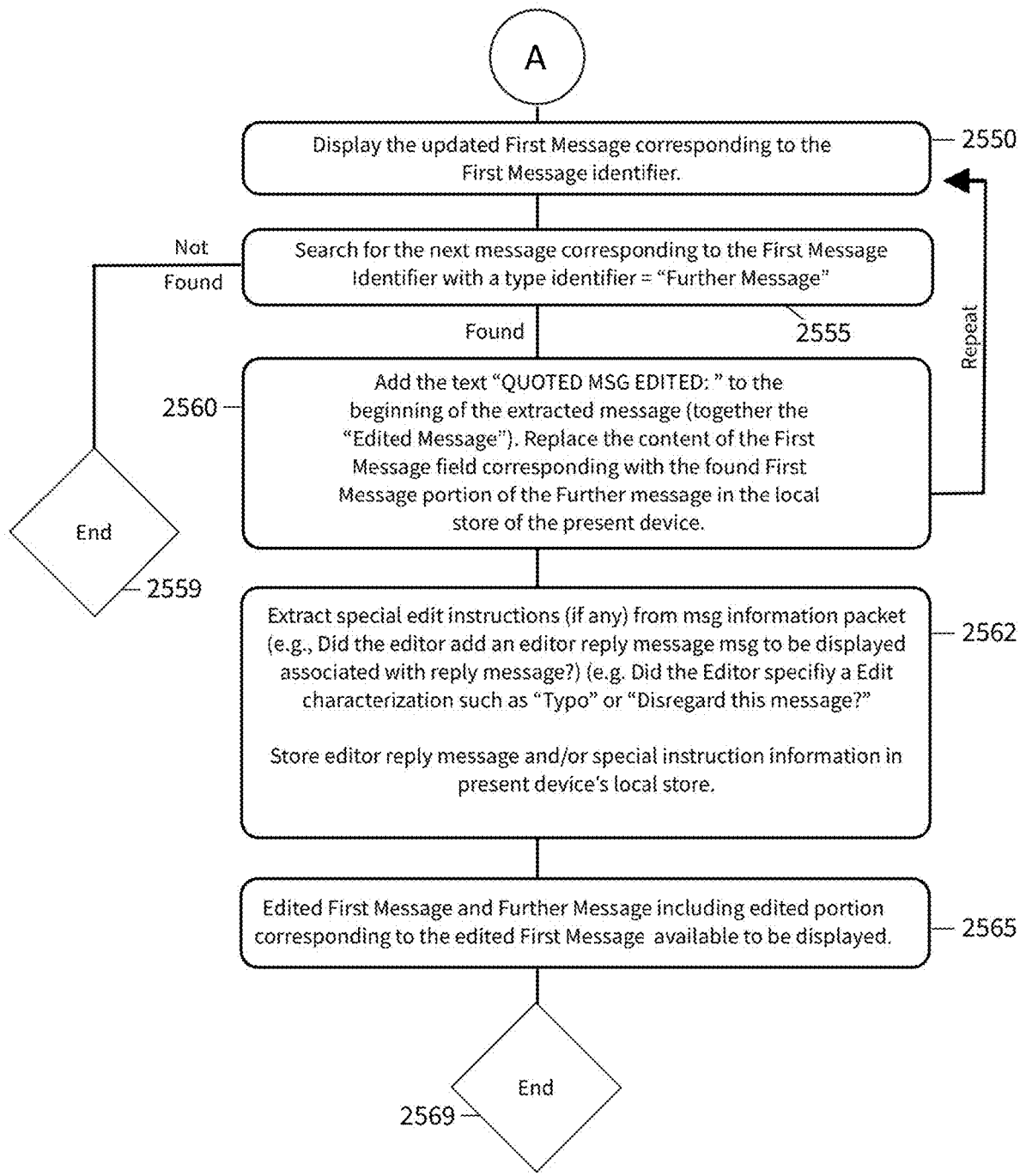

This figure illustrates that before the edit, the version of the first message content ("Is anyone able to drive me to the airport tomorrow at 7 AM?") stored in the database on the cloud server (Database Record [40025179], "Msg1MsgID" [28910291], "Msg1" ["Is anyone able to drive me to the airport tomorrow at 7 AM?" ], "Msg1Type" ["D" ]) and is in sync with the content of the first message stored in the database of the local server (Local Database Record [21565212], "Msg1MsgID" [28910291], "Msg1" ["Is anyone able to drive me to the airport tomorrow at 7 AM?], "Msg1Type" ["D" ]). The respective Further Messages are also in sync. This figure and FIGS. 25A-25B illustrate an approach to achieving synchronicity between the separate databases (in this example, between the cloud server database and the receiving device database). When the receiving device receives the transmission packet, it recognizes that the message it has received is an "Edited" type message. Based on that information and in accordance with FIGS. 25A-25B, synchronicity is achieved.

Receiving deceive receives a transmitted message. FIG. 25A (#2505)

Receiving device recognizes received message is an edited message. FIG. 25A (#2520)

Receiving device extracts Message Identifier (e.g., record number and/or message identifier) from message transmission package. FIG. 25A (#2525)

Receiving device searches its local store for instance of corresponding Message Identifier that is a First Message. FIG. 25A (#2530)

If found, receiving device updates its local storage to reflect edited message (In some embodiments other and/or additional rules may be applied). FIG. 25A (#2545)

In this embodiment database records can include a field that identifies the record as a "Quote-Reply" (i.e., further message) type. In this embodiment, the receiving device searches for and updates the local store with the content of the edited message in where the corresponding edited first message's message identifier is located in records that are of a Quote-Reply type. (FIG. 25A #2555)

Receiving device displays edited first message. Updates, based on the edited first message's message identifier, are made to "Quote-Reply" type records that contain versions of the edited first message. The further messages including the edited first message are available for display. FIG. 25A (#2565)

FIGS. 16A-16E illustrate further exemplary embodiments of the present invention. In several exemplary embodiments, more than one "first" message can be selected e.g., a (first) first message, a second first message, an n first message can be selected (FIG. 9). In some embodiments, first messages can reside in channels different than the channel in which the further message is transmitted. In some embodiments, the further message can be transmitted to more than one channel.

In an exemplary embodiment of the present invention, the first message can have associated permissions for sharing the first message via a further message outside of the channel in which the first message was sent. Various permissions may exist, such as permissions associated with the user that originated the first message, permissions associated with the device that originated the first message, permissions associated with an account from which the first message originated, permissions associated with the first message regardless of whether it has been edited, permissions associated with the first message after it has been edited, permissions associated with whether edits to the first message may be shared outside of the channel in which the first message originated, etc.

In some exemplary embodiments such as what is illustrated in FIGS. 16A-16E, a message can be selected in a different channel from which the message was transmitted. Assume a first message is displayed in a first channel and a further message is displayed in a further channel. Assume also the further message in the further channel displays a) all or part of the first message; and b) reply text. In some embodiments, an interaction with the display object associated with the further message can cause a "jump back" to the location in the message stream of the first message. In some embodiments restrictions can be put in place limiting whether or not jump backs to first message residing outside the channel in which the further message was transmitted will be permitted.

FIGS. 16A-16E illustrate a further exemplary embodiment of the present invention, in which a further message is formed that consists of one or more selected first messages from another one or more channels. In other words, the quoted message (i.e., the selected first message) was not originally transmitted in the same channel in which the further message is ultimately transmitted.

FIG. 16A illustrates that the user (MarcCohen in this example) is currently viewing the Three Amigos channel.

Figure 16B:
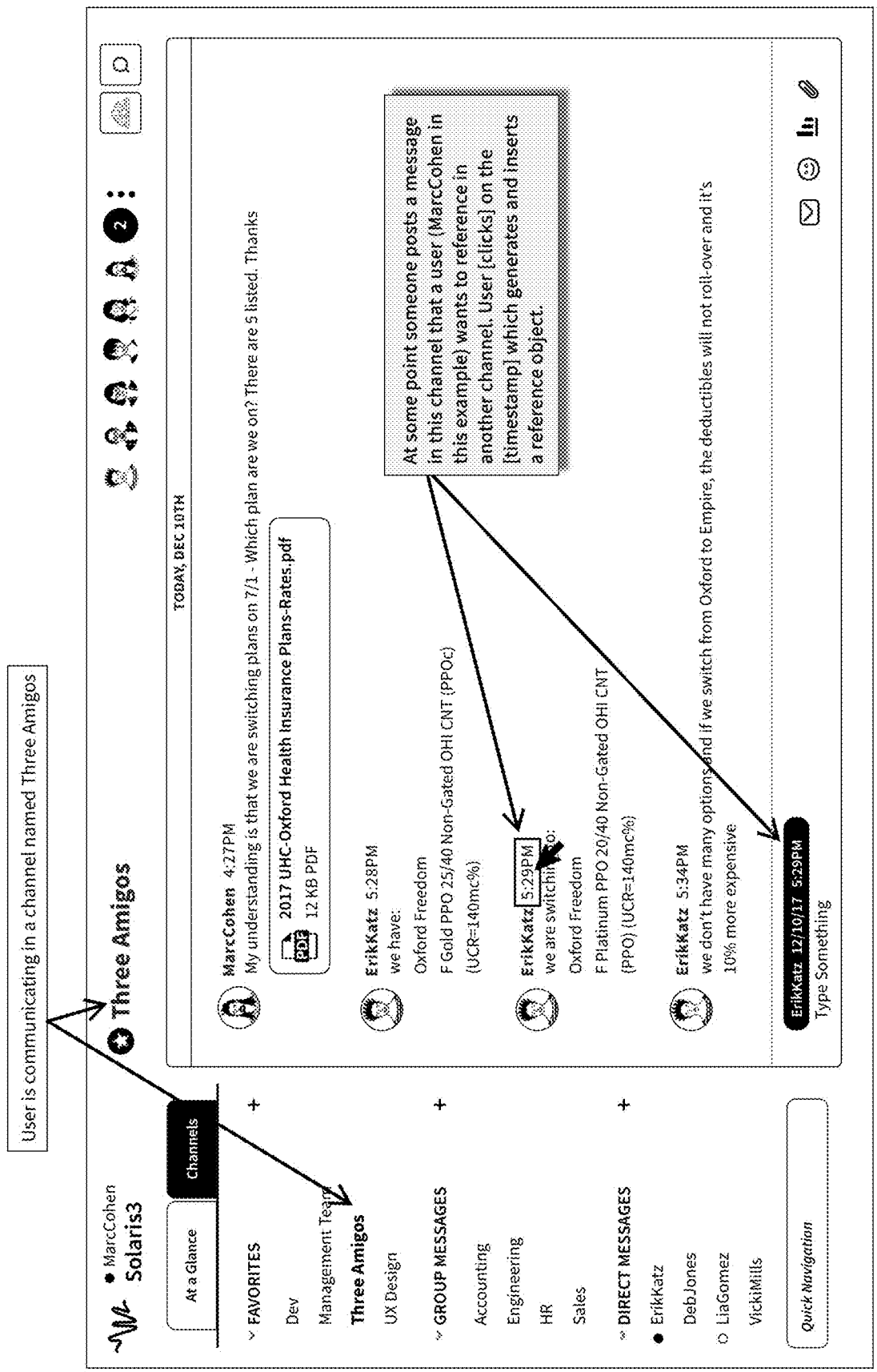

FIG. 16B illustrates that MarcCohen clicks or taps the timestamp (5: 29 PM in this example, associated with a message received from ErikKatz). The selection of this message (selection of a first message) causes a reference object to be inserted into the text entry area associated with the text entry box receptive to data input associated with the user's reply message. In some embodiments said selection occurs before the entry of reply text. In some embodiments the selection of a first message occurs after the reply message has been entered into the currently displayed text entry field (See FIGS. 18A-18G).

Figure 16C:
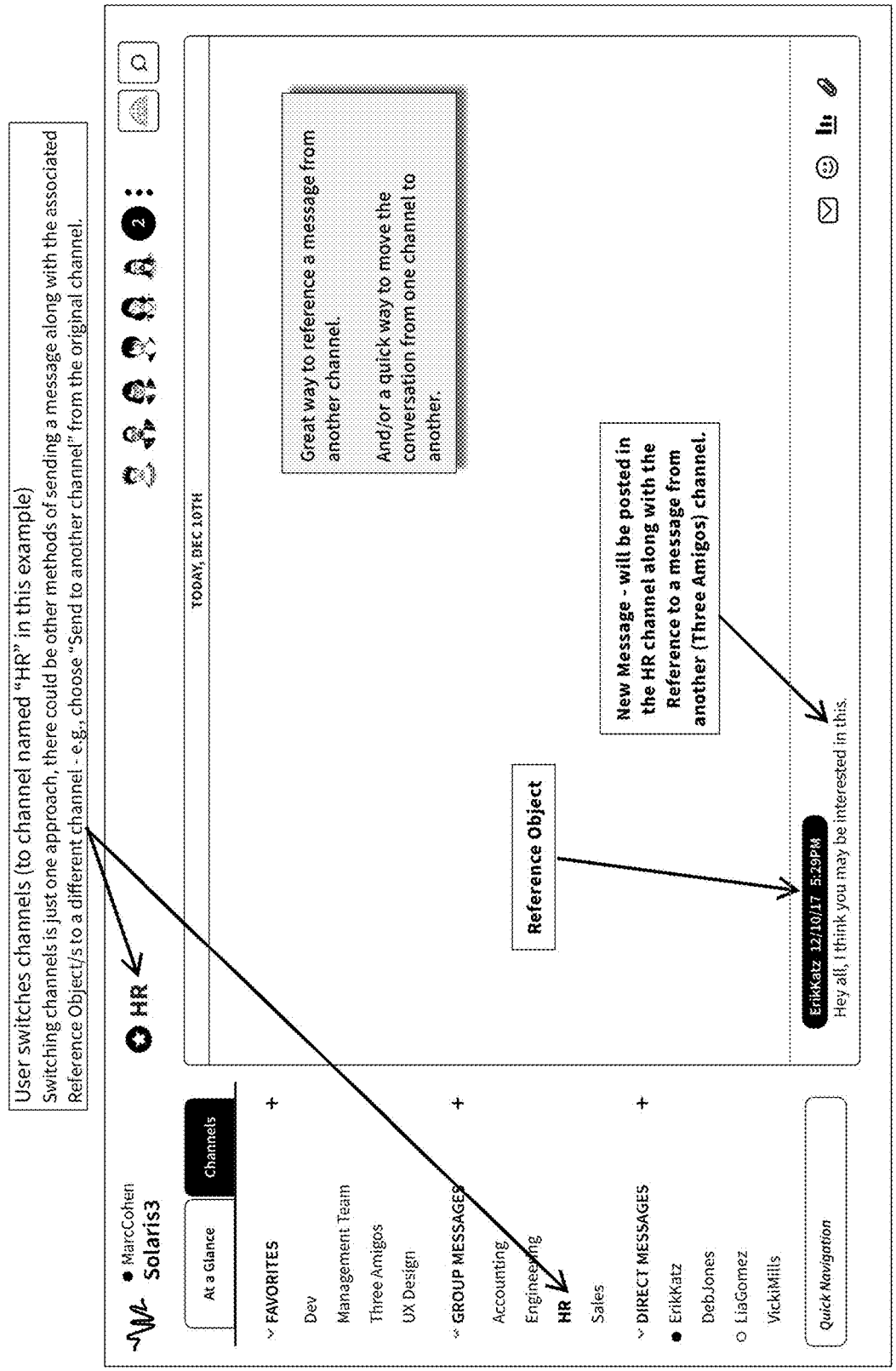

FIG. 16C illustrates an exemplary embodiment in which the text entry bar is persistently displayed and receptive to input. In this embodiment the channel to which the message is ultimately transmitted is determined at the time the user presses send to transmit the message. In other words, a user can begin to type a message into the text entry bar while in channel A, and then switch to a view of Channel B without losing the text already entered into the text entry bar. In this embodiment, the message will be sent to the channel being displayed at the time the user presses send, regardless of the channel being viewed at the time data was first entered into the text entry bar, or the channel or channels viewed at times prior to the user pressing send to transmit the message. This can be useful functionality for among other purposes, it allows a replying user to quote a message from a different channel from the channel into which a quote reply is ultimately transmitted.

FIG. 16C illustrates that user MarcCohen has switched channels and is now viewing the HR channel. Notice that the reference object persists and is still displayed associated with the text entry bar. At this time, MarcCohen enters the text "Hey all, I think you may be interested in this." MarcCohen then presses return or chooses another means to cause the transmission of the further message to be transmitted to the HR channel.

Figure 16D:
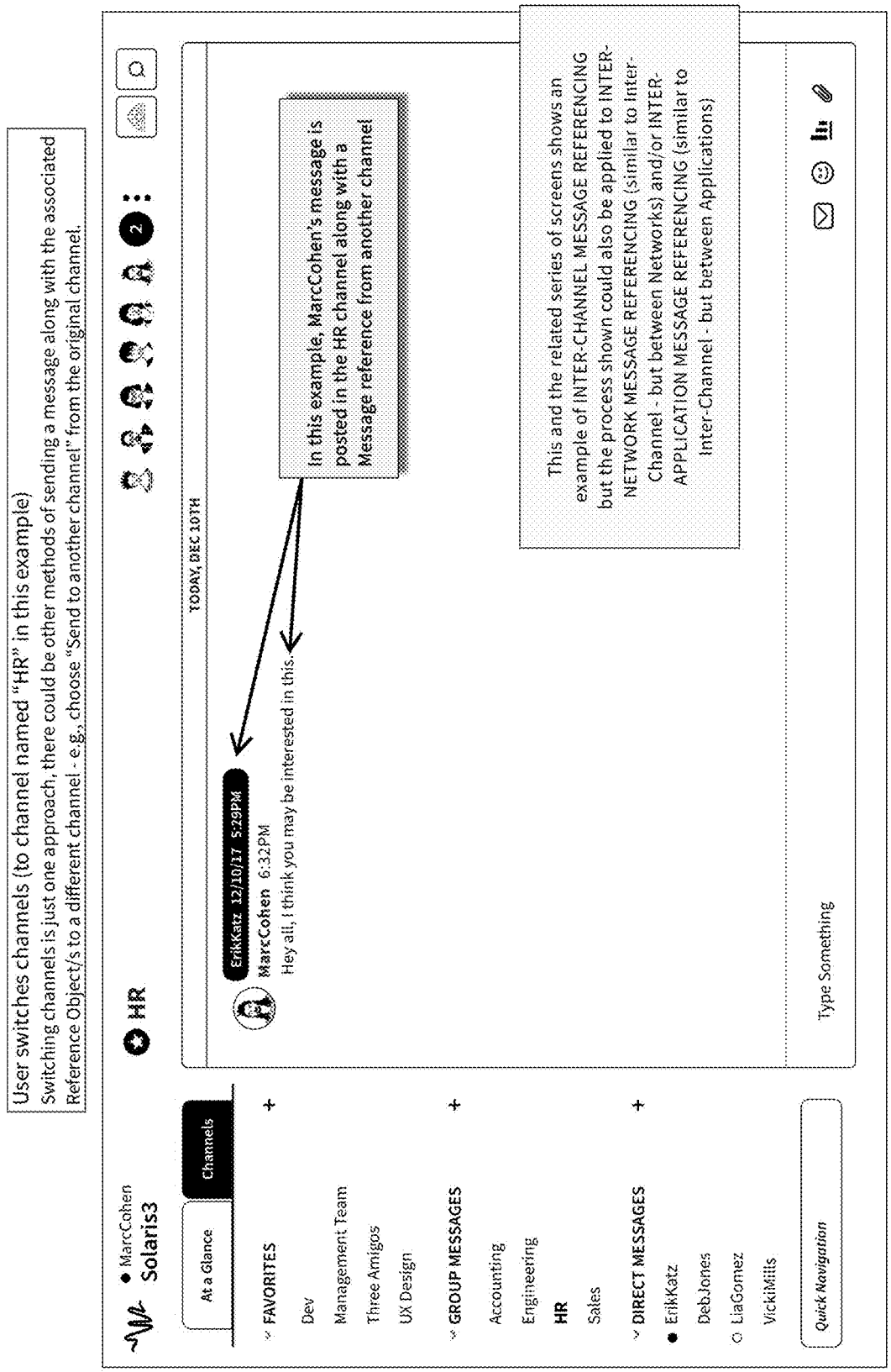

FIG. 16D illustrates that the further message has been received by and is displayed in the HR channel. In addition to the reply text, and metadata associated therewith, the message includes a display object that when interacted with will cause a change of display by for example, displaying the content of all or a portion of the associated first message.

In a further exemplary embodiment of the present invention, a text entry bar is capable of retaining data entered (e.g. text, and associated data, such as a reference object) while viewing one channel even though the data was previously entered while viewing another channel. This feature permits various messaging options such as inter-channel message referencing. Thus, a "connection" is retained between one channel (in which one or more "first" messages are selected) and another channel (from which the "further" message is transmitted). Put another way, in some embodiments, a message may be referenced (i.e., a first message selected) from a channel in a network that is different from the channel and network in which it is ultimately transmitted. For example, a user may subscribe to two different networks; for example, their own company's messaging network in addition to one or more other networks such as a client's network. It is anticipated that a user may want to quote a first message from a channel on a first network and create and transmit a further message (i.e., includes a reference object and reply text) associated with the selected first message from the first network to a channel associated with a second network.

Figure 16E:
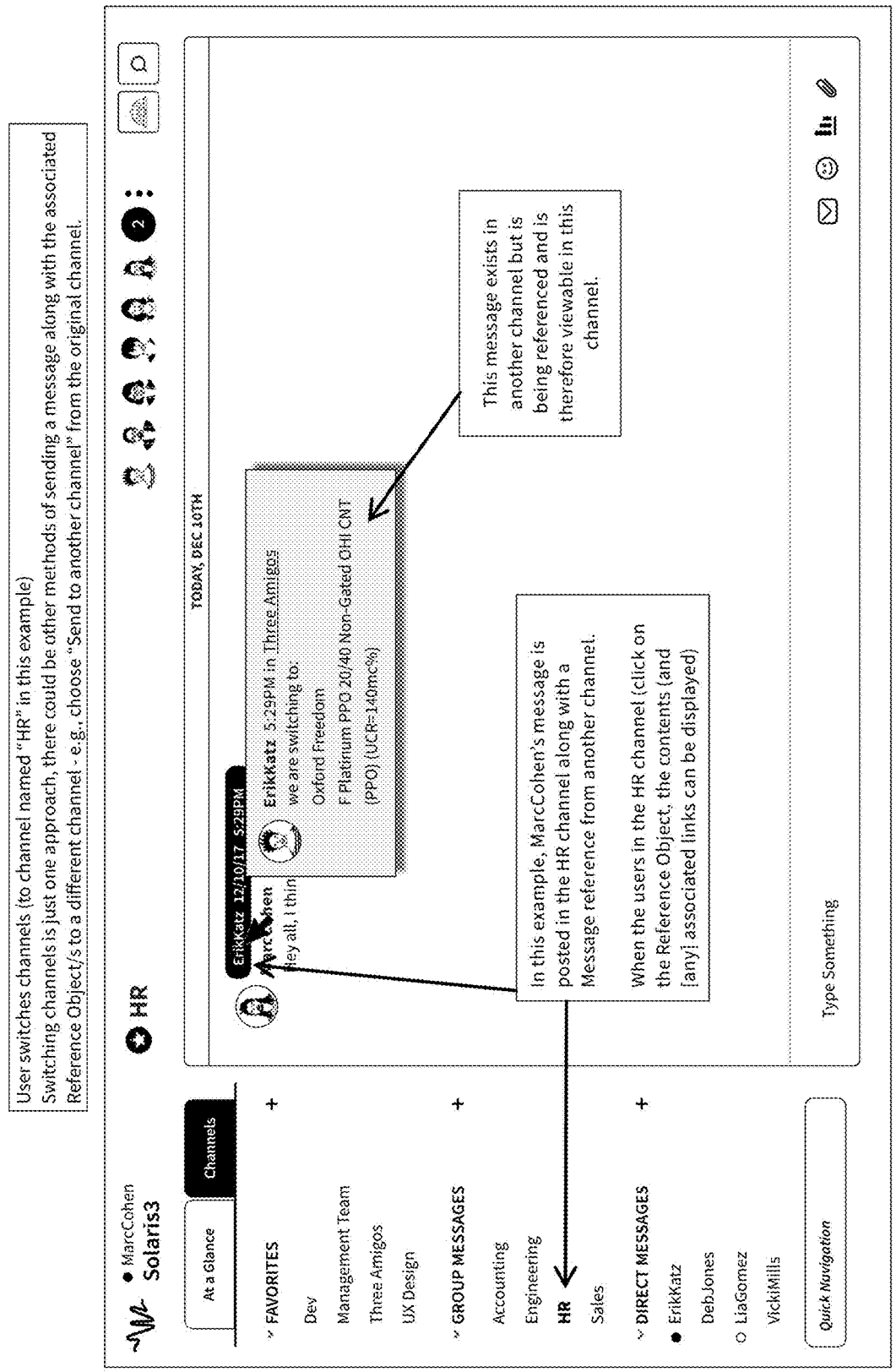

FIG. 16E illustrates a further exemplary embodiment via an exemplary screenshot. In this embodiment, information associated with all or a portion of the selected first message is caused to be displayed as a result of an interaction with the display object associated with MarcCohen's further message. In this example, an indication of the channel from which the first message was selected is indicated ("Three Amigos").

Figure 17A:
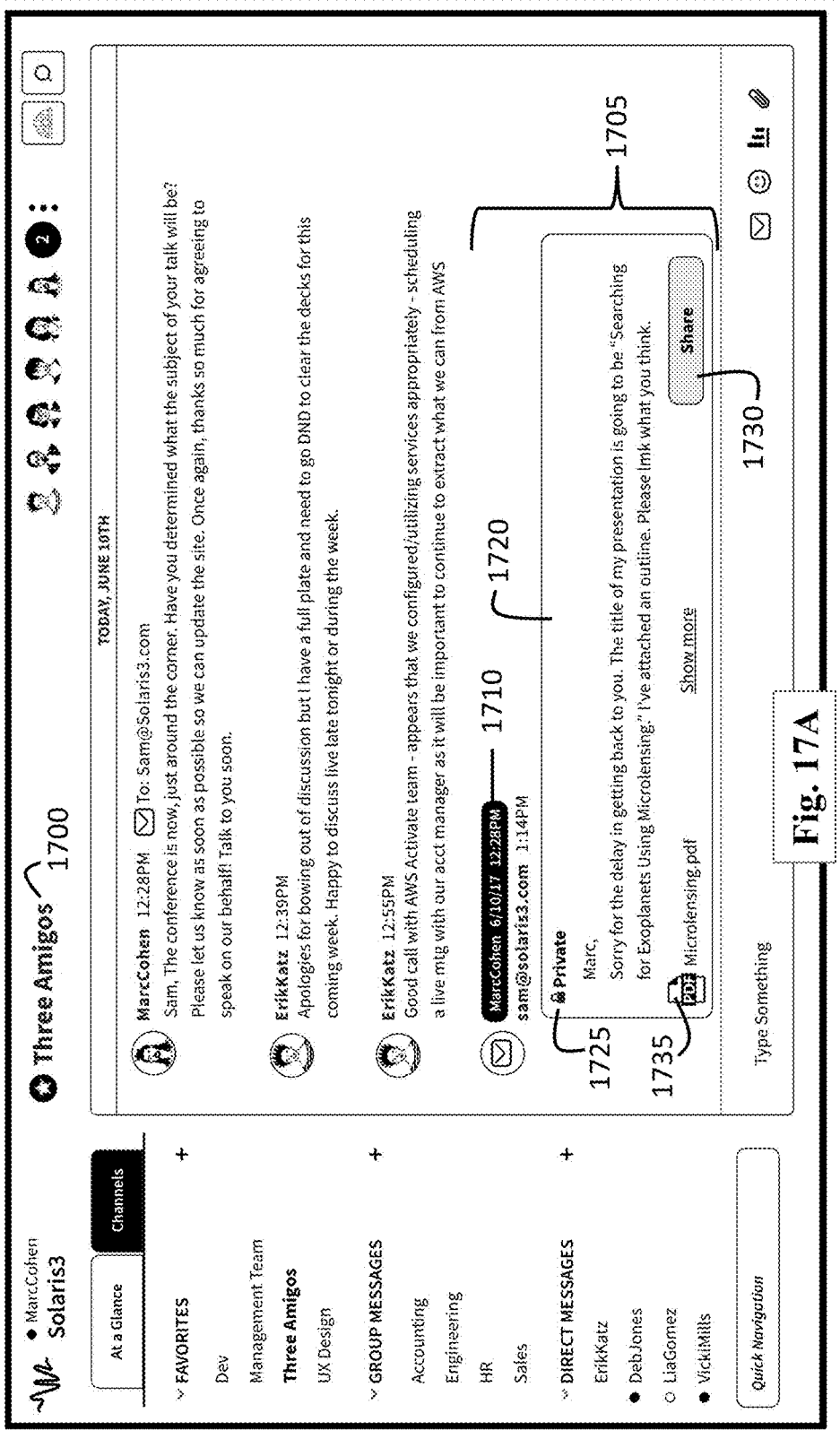
Figure 17B:
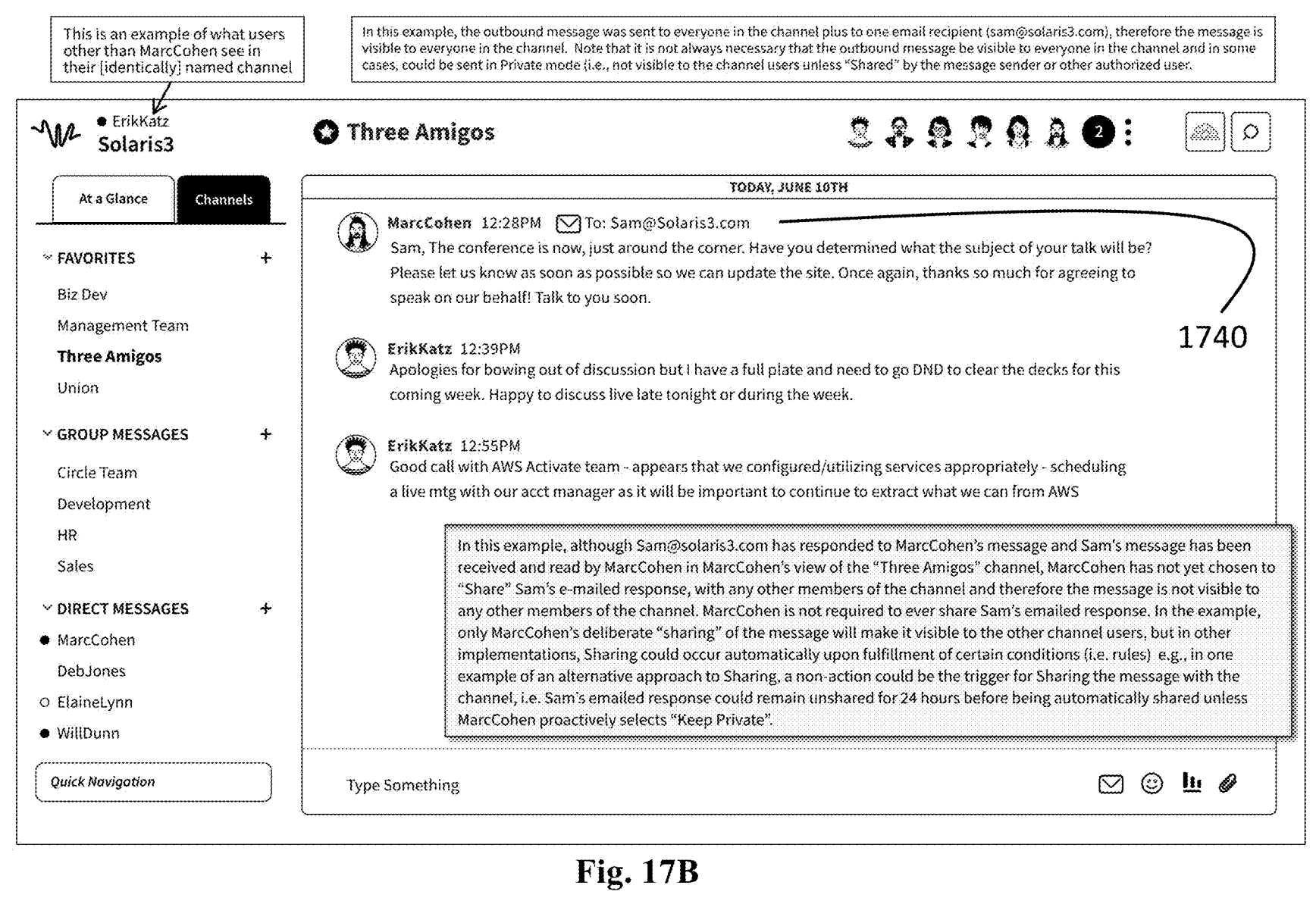
Figure 17C:
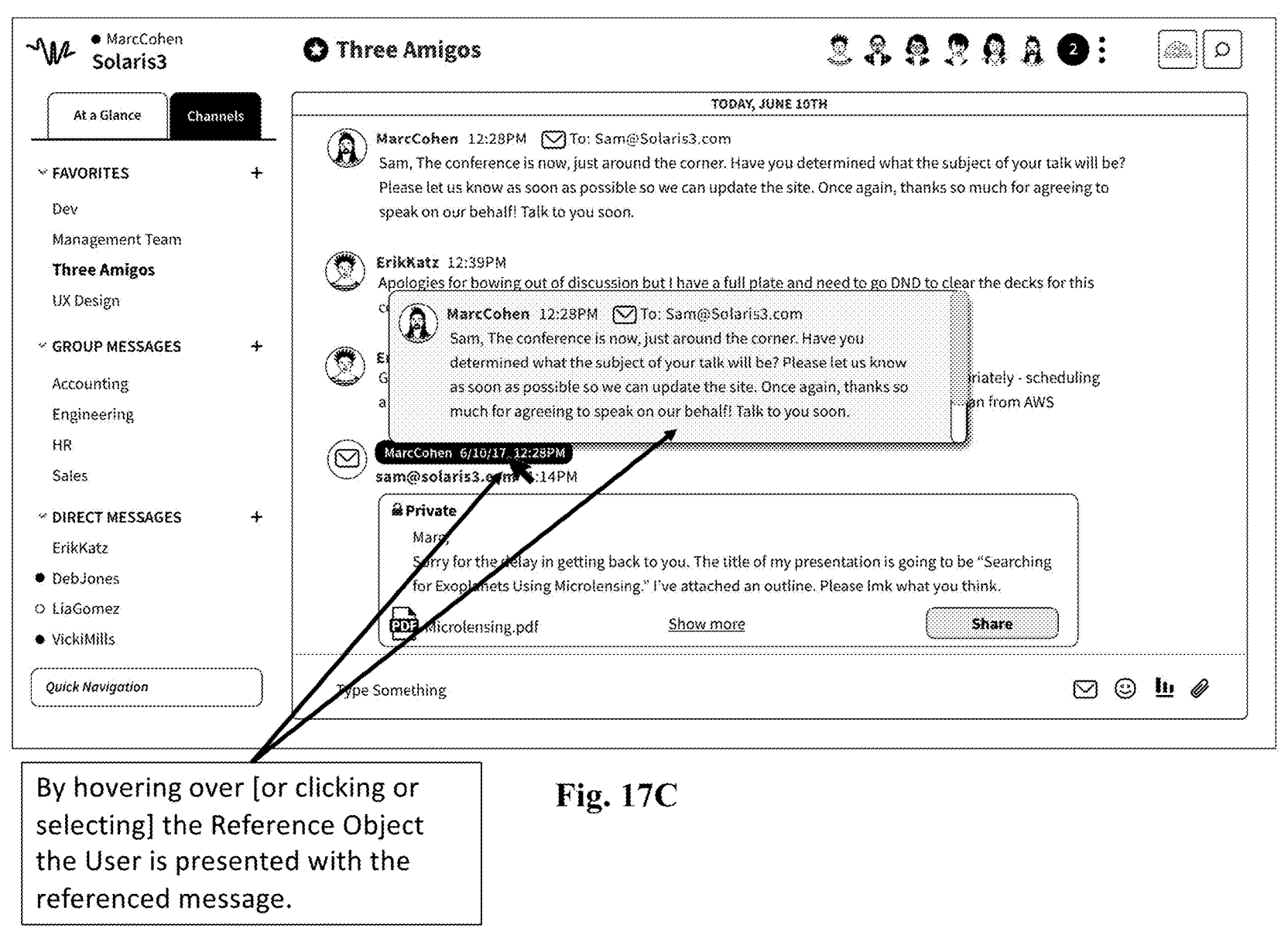

FIGS. 17A-17C illustrate a further exemplary embodiment of the present invention, in which a first message is automatically determined, and an associated display object is automatically associated with a further message.

In some exemplary embodiments, users are able to send a message to a group in a channel while at the same time sending the message to an external email address or addresses. This functionality is further described in U.S. Pat. No. 9,712,466, which is incorporated by reference herein for its teachings regarding messaging and other forms of electronic communication.

FIG. 17A is a screenshot that illustrates an exemplary embodiment of the present invention. In this example, user MarcCohen created a message at 12:28 PM on Jun. 10, 2017, that was transmitted to members of the ThreeAmigos channel (#1700) while simultaneously being transmitted via an email interface to an external recipient (sam@solaris3.com). In this example a reply from the email recipient has been received, associated with the ThreeAmigos channel, and displayed in said channel in chorological order relative to the date and time that messages have been received in the channel. Group messaging is considered a fast-paced means of communication, i.e., there is an expectation that responses will be informal and relatively quick. The response time expectation for email is less immediate. By the time an external recipient of an emailed message responds to a message sent to him from a group messaging user via email there will [likely] have been quite a few other messages posted into the messaging channel. For this reason, the incoming response from the message-to-email recipient may seem out of context. It is important that the group messaging users be able to link the incoming email to the associated message. By automatically inserting the REF object with the incoming email-to-message, it becomes clear to the user/group what the incoming email-to-message is referencing. In this example, the messaging system automatically determines a first message that is associated with the incoming email by identifying the incoming email as a reply to the message that was originally sent from the messaging system to the external recipient (i.e., the "first message" is automatically determined). In other words, the "selection" of the first message is performed automatically by the system. The system then forms and displays a further message that includes a display object (that includes a link to the automatically selected first message)(#1710), the display of the reply email (i.e., the incoming email that is a reply to the first message message) (#1720).

In some embodiments an emailed reply is expressed as a message. In some embodiments an emailed reply can be accessed via a link such as a hyperlink. In the exemplary embodiment illustrated in FIG. 17A, the email is "Private" (#1725) and visible only to MarcCohen (the sender of the first message). In this embodiment the recipient of the private message (MarcCohen in this example) has the option to click or tap on a "Share" control (#1730) which when activated, will cause the private further message to become "public" and visible to other members of the ThreeAmigos channel. In some embodiments, a user can choose to share all or just a portion of the message and in some cases a user can modify the contents of the message being shared. Once the message is "Shared" it becomes visible to other members of the channel and/or Network.

In this example, the email included a PDF file attachment which is presented and available for access through a further action such as a double-click on the PDF file icon (#1735). The further message (#1705) depicted in FIG. 17A, comprises multiple distinct areas that are independently activatable.

FIG. 17B is a screenshot that illustrates an exemplary embodiment of the present invention. This figure illustrates an example of the messaging interface from the point of view of ErikKatz, a subscriber of the ThreeAmigos channel. In this example, MarcCohen's 12:28 PM outbound message was sent to everyone in the channel plus to one email recipient (Sam@solaris3.com) (#1740). MarcCohen's 12:28 PM message (#1740) is visible to everyone in the channel. Note that it is not always necessary that a message be visible to everyone in the channel and in some cases, a message could be sent in Private mode (i.e., not visible to the channel users unless "Shared" by the message sender or other authorized user. In this example, although Sam@solaris3.com has responded to MarcCohen's message and Sam's message has been received and read by MarcCohen in MarcCohen's view of the "Three Amigos" channel, MarcCohen has not yet chosen to "Share" Sam's e-mailed response with any other members of the channel and therefore the message is not visible to any other members of the channel. MarcCohen is not required to ever share Sam's emailed response. In the example, only Marc's deliberate "sharing" of the message will make it visible to the other channel users, but in other implementations, Sharing could occur automatically upon fulfillment of certain conditions (i.e. rules) e.g., in one example of an alternative approach to Sharing, a non-action could be the trigger for Sharing the message with the channel, i.e. Sam's emailed response could remain unshared for 24 hours before being automatically shared unless Marc proactively selects "Keep Private."

FIG. 17C is a screenshot in accordance with an exemplary embodiment of the present invention. In this example, hovering over [or clicking or selecting] the Display Object causes the display of the first message.

FIGS. 18A-18G illustrate an example of a conversation in group channel named "Sales." A benefit of having a text entry bar receptive to entry prior to selection of a first message is illustrated.

Figure 18A:
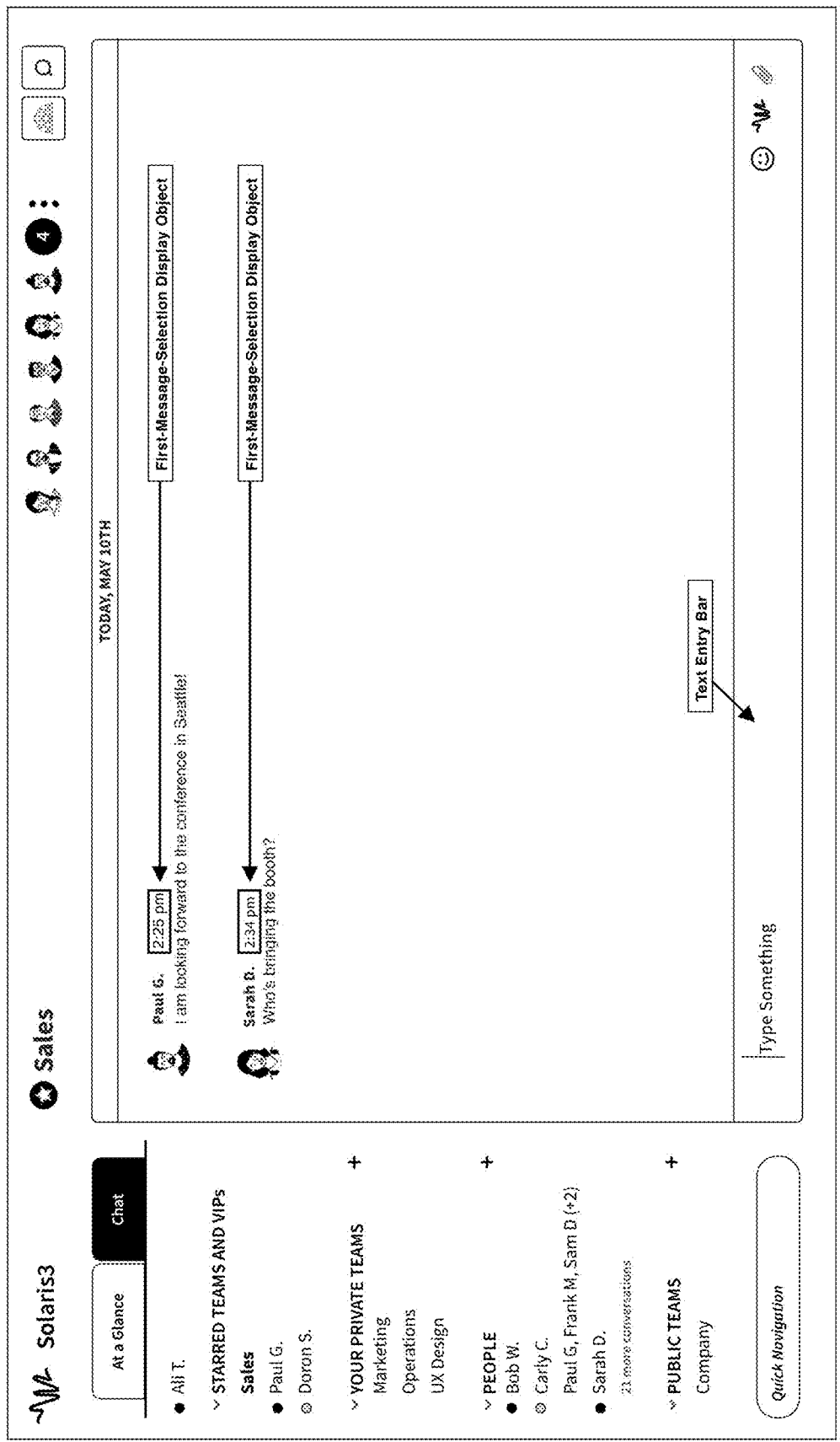
FIGS. 18A-18G are exemplary screen shots that illustrate exemplary operation of a further exemplary embodiment of the present invention.

FIG. 18A is a screenshot in accordance with an exemplary embodiment of the present invention. In this embodiment, the text entry bar is persistently displayed and receptive to input prior to the selection of a first message. In other words, a user can begin to type a message into the text entry bar, and then select a first message to reference, without losing the text already entered into the text entry bar. This can be useful, for among other reasons, in cases when the responding user doesn't feel the need to quote an earlier message at the time she began typing her reply (e.g., in cases when, perhaps, there were not many messages posted into the channel after the first message was posted and the time the user began thinking about and typing her reply to that the first message). In some cases, and for some users, typing a reply before specifying a message to quote, is simply a preferred workflow.

For example, FIG. 18A at 2:25 pm, Paul G. posted a message that reads "I am looking forward to the conference in Seattle." At 2:34 pm, Sarah D. posted, "Who's bringing the booth?"

Figure 18B:
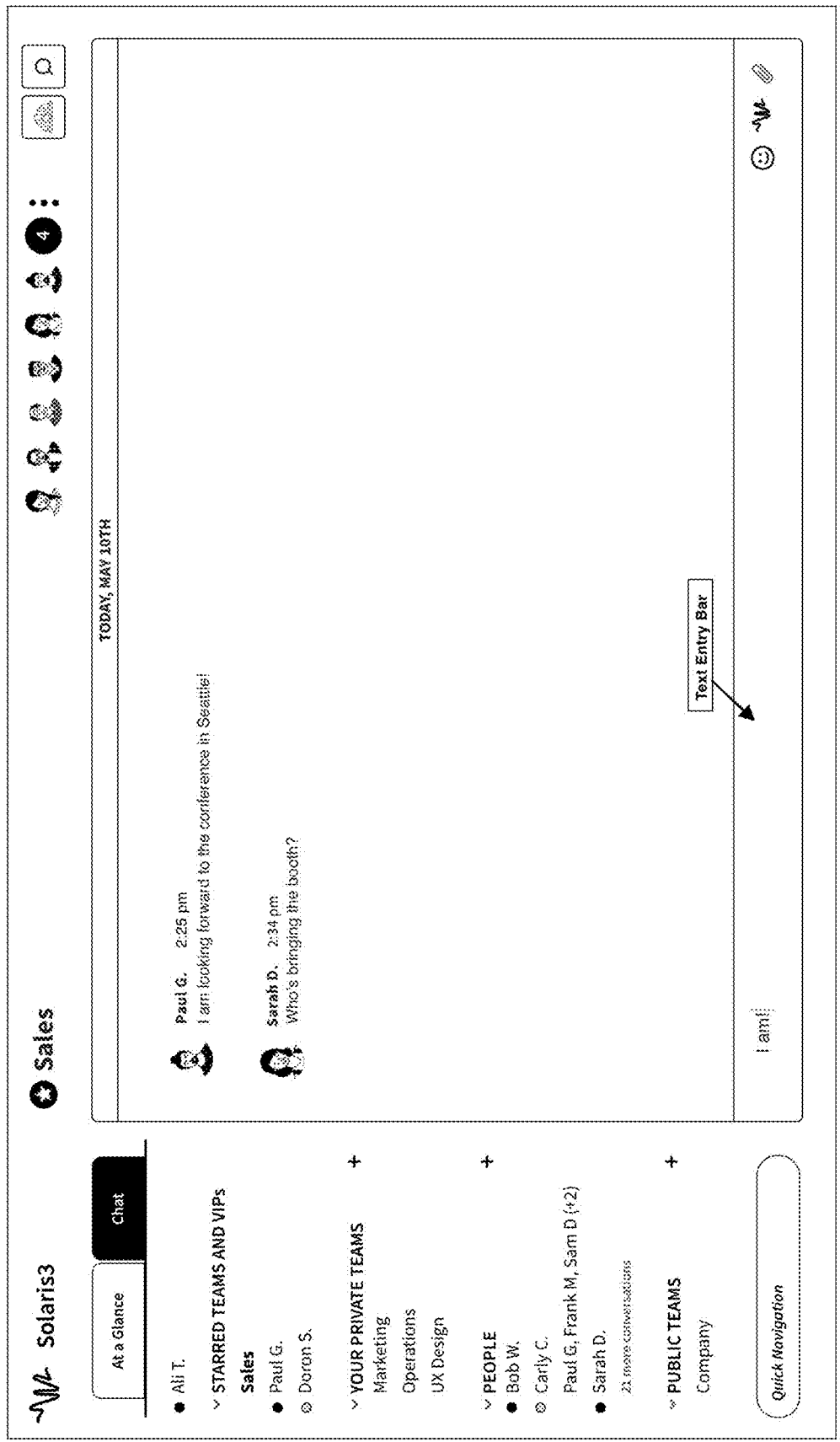
Figure 18C:
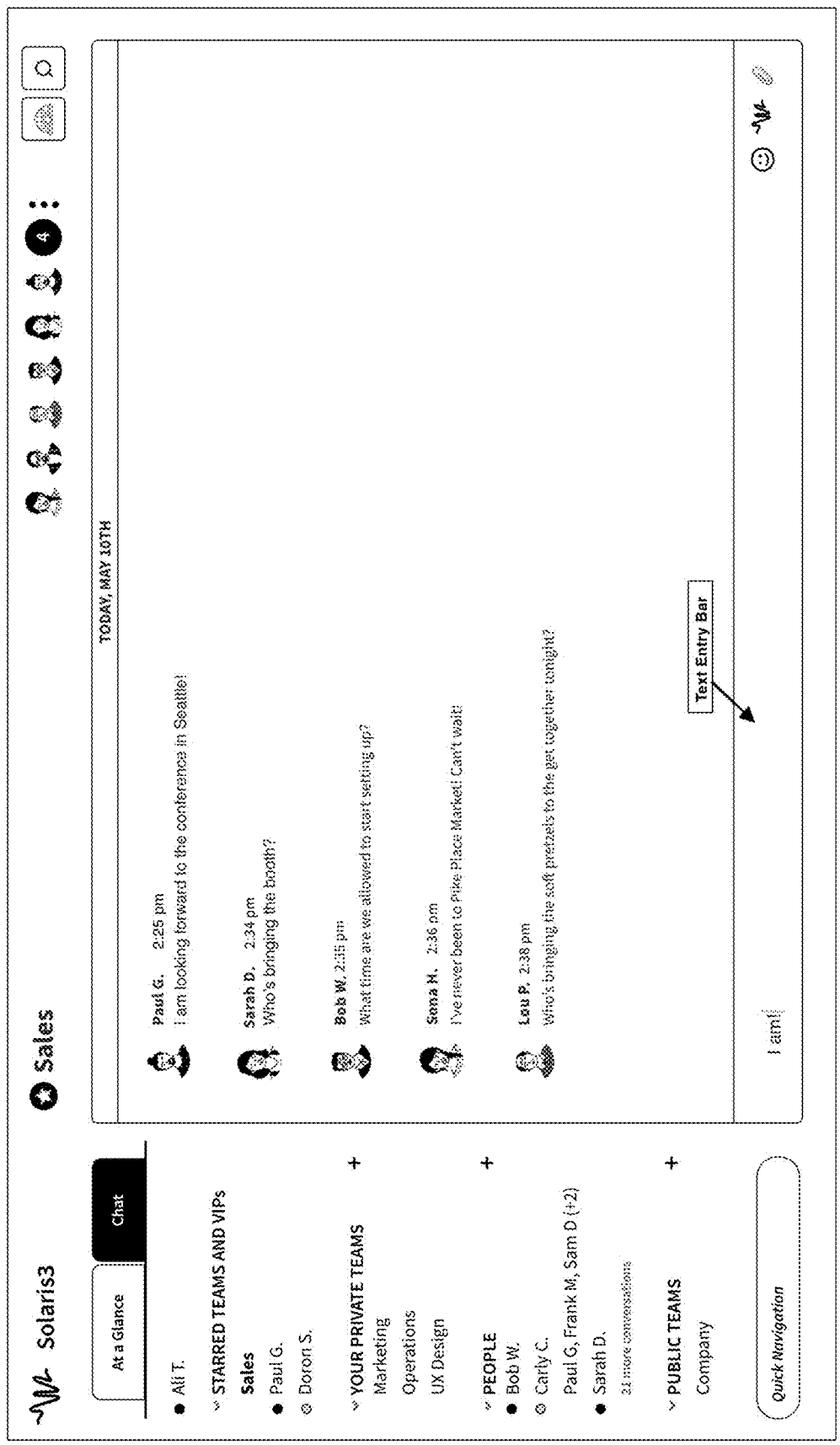

FIGS. 18B-18C are screenshots in accordance with an exemplary embodiment of the present invention. In response to seeing the two prior messages, Ali T., immediately begins typing a message into the text entry bar that says, "I am!" but, in this exemplary scenario, Ali T. gets interrupted by a co-worker for several minutes before having the chance to finish his reply and send it. By the time he looks at his screen again, three additional messages have been posted, including a 2:38 pm message posted by Lou P. that reads "Who's bringing the soft pretzels to the get together tonight?" At this point, Ali T. realizes that his reply of "I am!" needs a bit more context to be understood. If he isn't careful, his "I am!" reply could be confusing or even look to be a response to Lou P's 2:38 pm message.

Figure 18D:
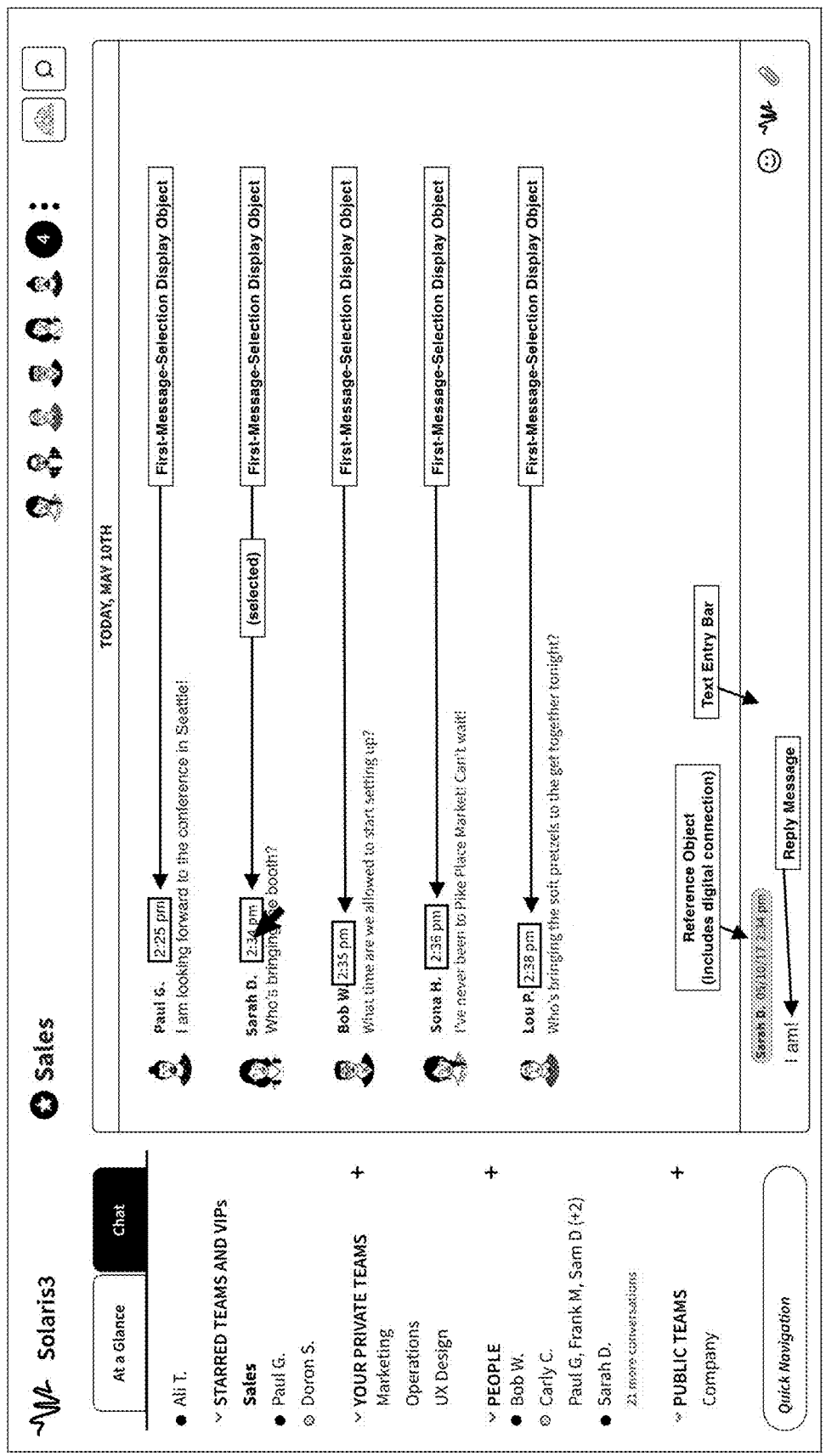

FIG. 18D is a screenshot in accordance with an exemplary embodiment of the present invention. In this example, Ali T. simply clicks on Sarah D.'s 2:34 pm message which causes a reference to her message to be inserted into the text entry box. Problem averted!

Figure 18E:
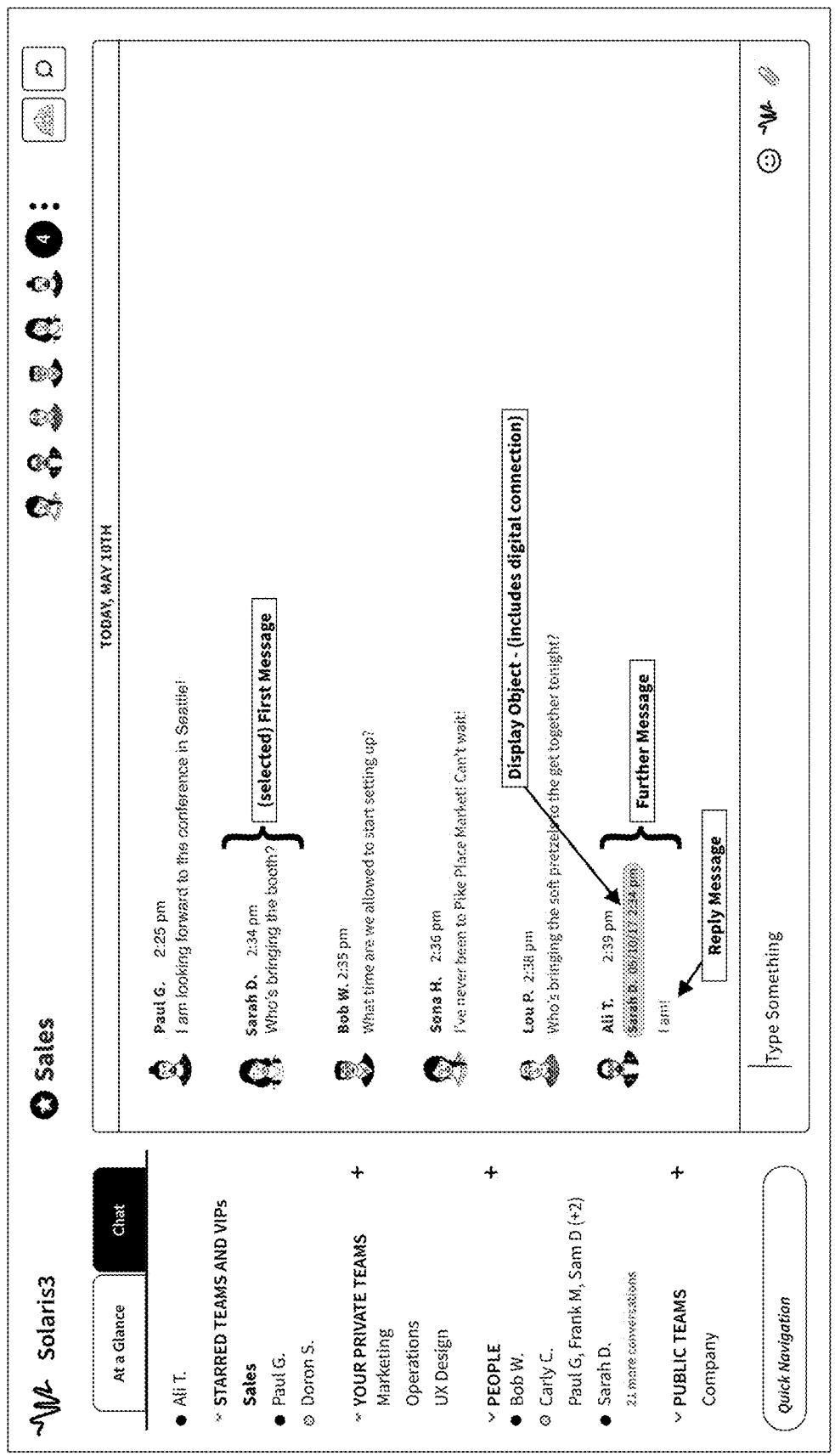

FIG. 18E is a screenshot in accordance with an exemplary embodiment of the present invention. In this example, Ali T.'s posted a "quote-reply" message (2:39 pm) which includes the reply text and a display object referencing the selected first message.

Figure 18F:
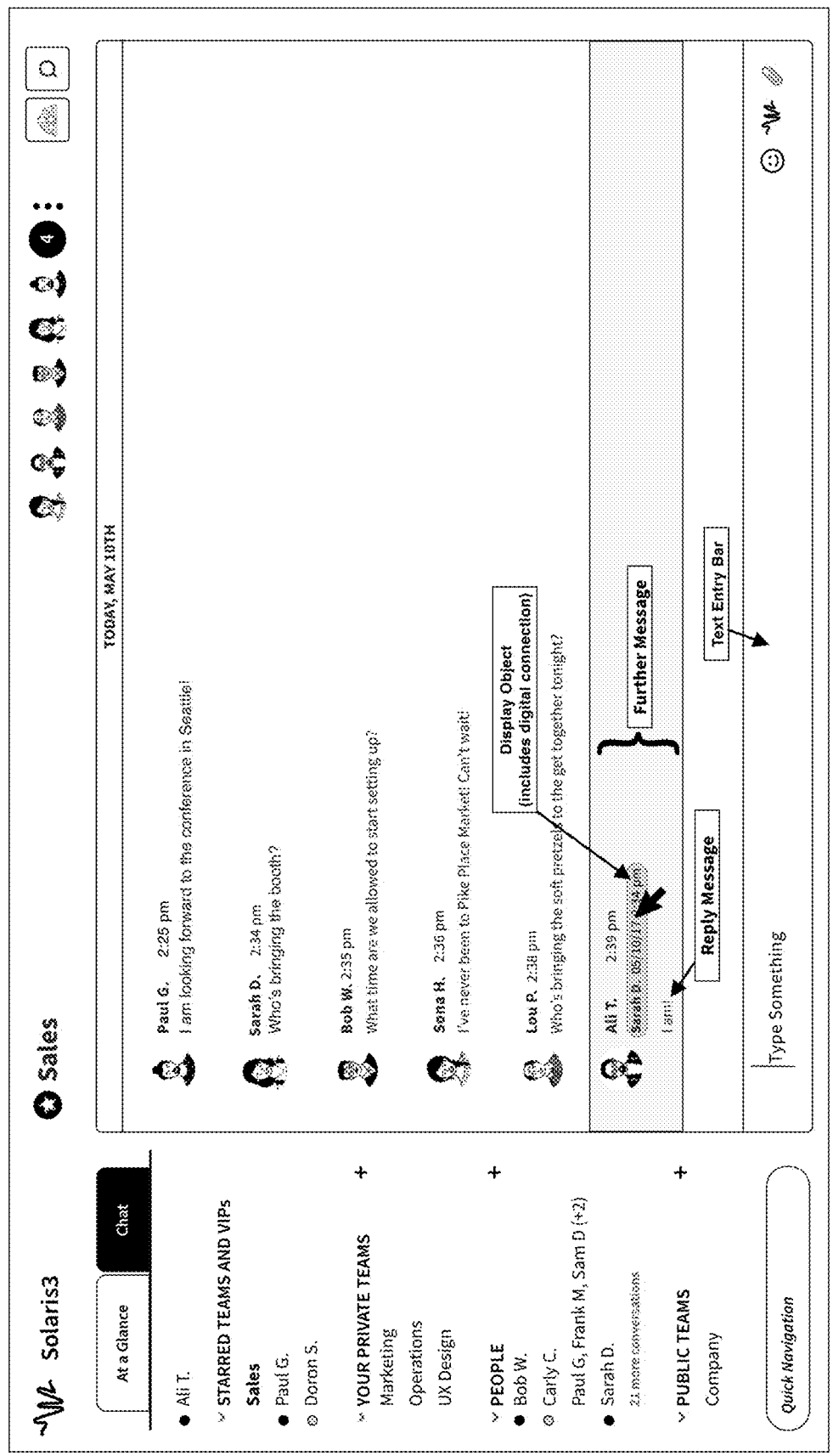
Figure 18G:
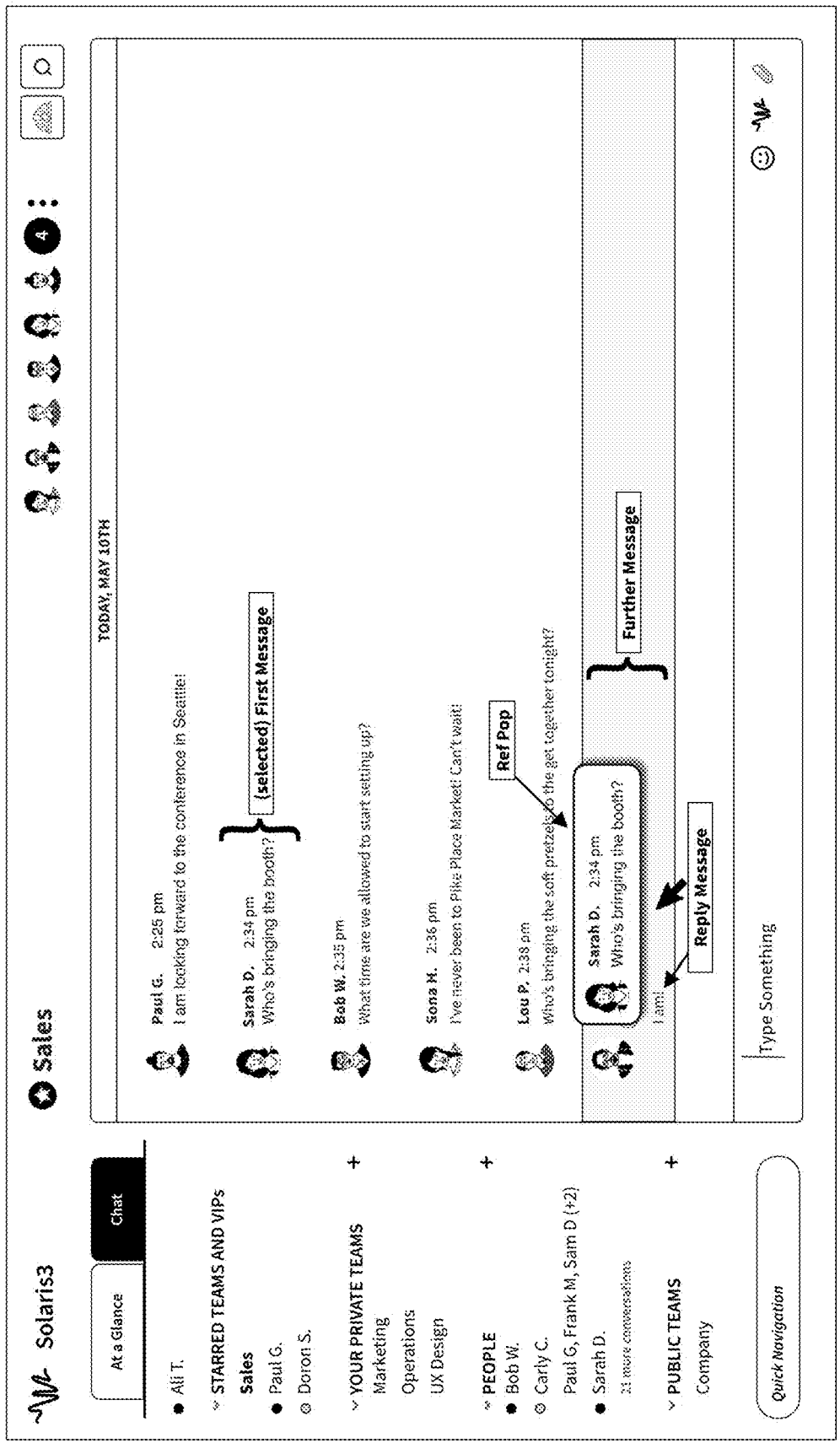

FIG. 18F-18G are screenshots in accordance with an exemplary embodiment of the present invention. In this exemplary embodiment, clicking the display object (labeled "Sarah D. 01/13/17 2:34 pm") causes the first message to be displayed.

One aspect of the present invention relates to "quoted" messages. With regard to one or more exemplary embodiments of the present invention, when a first user replies to a message placed in the message stream by a second user, the first user may wish to "quote" the second user's message. The message placed in the message stream by a second user, and received by a first user, may be referred to as a first message. The reply to the first message may be referred to as a further message. When the further message is displayed in the message stream, an example of what is displayed is the "quoted" portion of the first message (sometimes called the redisplayed message) and the first users reply to the first message (sometimes called the reply message).

Further to the above explanation, is the following issue: what happens if the second user edits the first message? For example, if the second user edits the first message where it initially appeared in the message stream, does the edit "flow through" to the quoted part of the first message that is displayed when the further message is displayed? In exemplary embodiments of the present invention, "flow through" is achieved. In other words, an edit to the first message is reflected in the redisplayed message. Put another way, there is "synchronicity" between the first message and the redisplayed message.

One way to achieve synchronicity in accordance with the present invention is to include a link (i.e. a digital connection) between the first message and the further message. An example of this is when the redisplayed message appears as part of the further message when a user clicks on a Ref object included with the further message. By clicking on the Ref object, a "Ref Pop" (i.e. the first message) appears as the redisplayed message. However, it may be desirable for the redisplayed message to appear with edits that were made to the first message. Therefore, a link (digital connection) is maintained between the further message and the first message so that edits to the first message "flow through" to the redisplayed message.

There are technical advantages achieved by providing the above described "flow through" (or "remaining in sync").

In addition to the benefit of displaying the most current edited version of a first (referenced) message by remaining in sync, another benefit of remaining in sync is the fact that embedded links and files remain actionable and/or downloadable from the Ref object. Put another way, after the first message appears in the message stream, if the first (referenced) message is subsequently edited, updated or deleted, the inserted representation (e.g., text) of the referenced message may, be updated to match, approximate or indicate such update or change.

Other technical advantages are achieved through the above described "flow-through." One advantage is that the above described process ensures that an entered reply message is being directed to the most current version of the first message. Without the above process, if a first message is edited and a reply is sent, it may be unknown whether the reply message is being directed to the most recent version of the first message. Another achieved advantage is that a further message that had been sent prior to a subsequent editing of the associated first message can reflect the edit to the first message. Another achieved advantage is that when the redisplayed message is displayed with the reply message, the redisplayed message is the most recent version of the first message. Without the features above, the redisplayed message being displayed with the reply message may not be the most recent version of the first message. In other words, without the above described features the redisplayed message may be incorrect. Exemplary embodiments of the present invention thus provide technical advantages over the prior art in which display of an edited first message (or portion thereof) in combination with a reply message to the edited first message was not contemplated.

Thus, in an exemplary embodiment of the present invention, the Reference Object (or display object or further message (whether verbatim or otherwise) maintains a link (digital connection) with the first (original) message. So, for example, if someone edited the first (original) message (with or without prior edits)—the "Ref Pop" or other display of the redisplayed message—(what a user sees when they click on the REF object) shows the updated, changed or edited message. Again, in addition to the benefit of displaying the most current edited version of a referenced message by remaining in sync, another benefit of this approach is the fact that embedded links and files remain actionable and/or downloadable from the Ref object.

Figure 19:
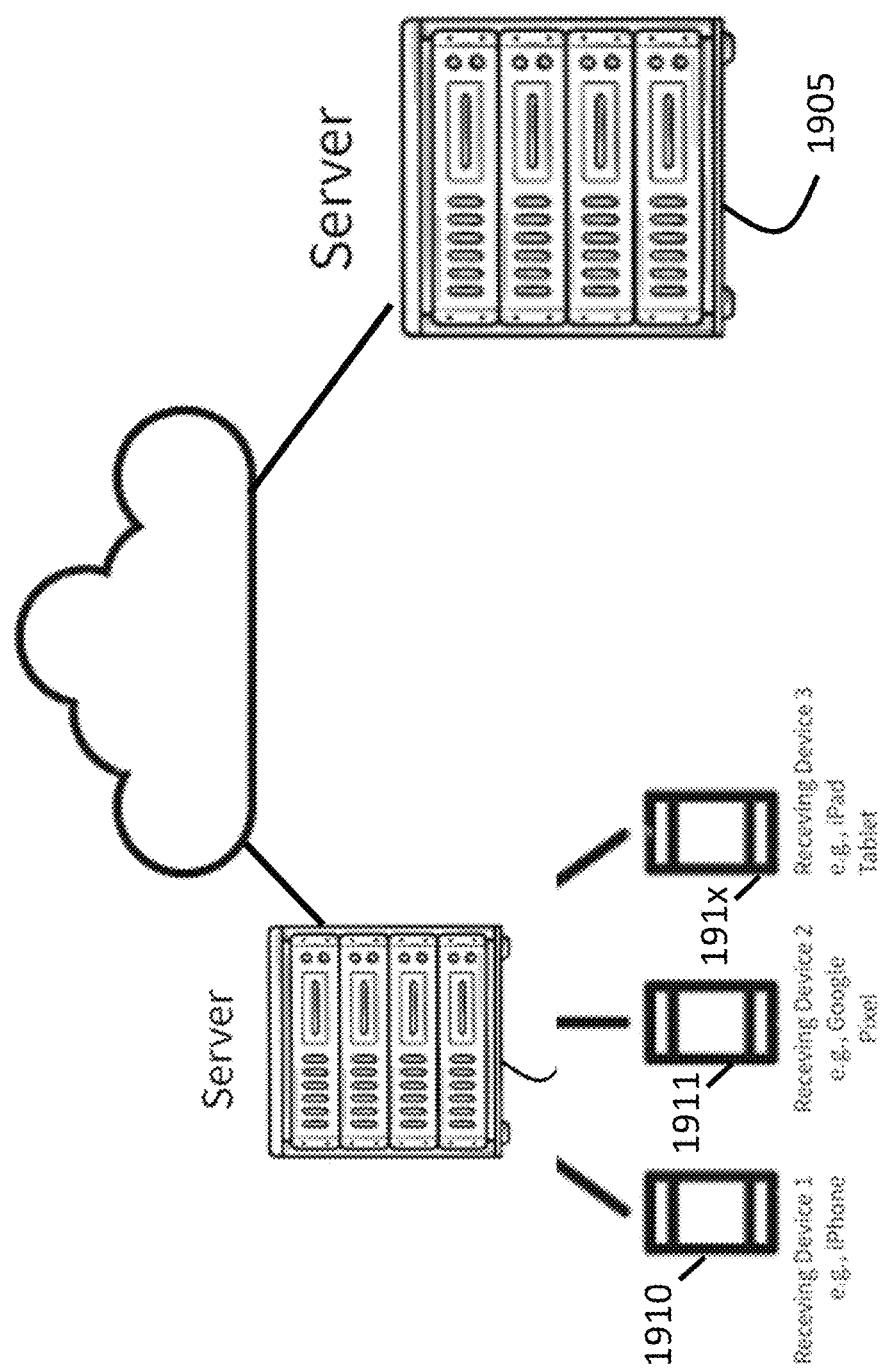
FIG. 19 is a block diagram that generally illustrates communication with an exemplary client device in accordance with an exemplary embodiment of the present invention.

FIG. 19 illustrates a system level block diagram in accordance with an exemplary embodiment of the present invention. In this example of a messaging system, data associated with message content resides on one or more servers 1905 accessible via "the cloud." In some embodiments, data associated with message content is distributed across a network of servers and devices (1910, 1911, 191X) such as mobile phones, tablets, laptops, gaming consoles, smart watches and/or desktop computers.

In some embodiments, it is desirable to maintain synchronicity between an original message and the quoted portion of said original message in a further message.

In some embodiments, and/or in some scenarios in some embodiments, it may be undesirable to maintain synchronicity between an original message and the quoted portion of said original message in a further message. In such an exemplary embodiment, synchronicity may be desirable in some situations and undesirable in other situations. Alternatively, synchronicity may be initially desirable, but later undesirable. An exemplary scenario is a messaging platform directed towards auctions or sales whereby, message editing is generally permitted, or conditionally permitted based on, for example, a specified period of time after an original message is posted. In this example, once a subscriber posts an item for sale in a channel and channel subscribers have made offers and purchases, it could be undesirable to permit edits to the description of an item after the item had been bid on or purchased.

Figure 20:
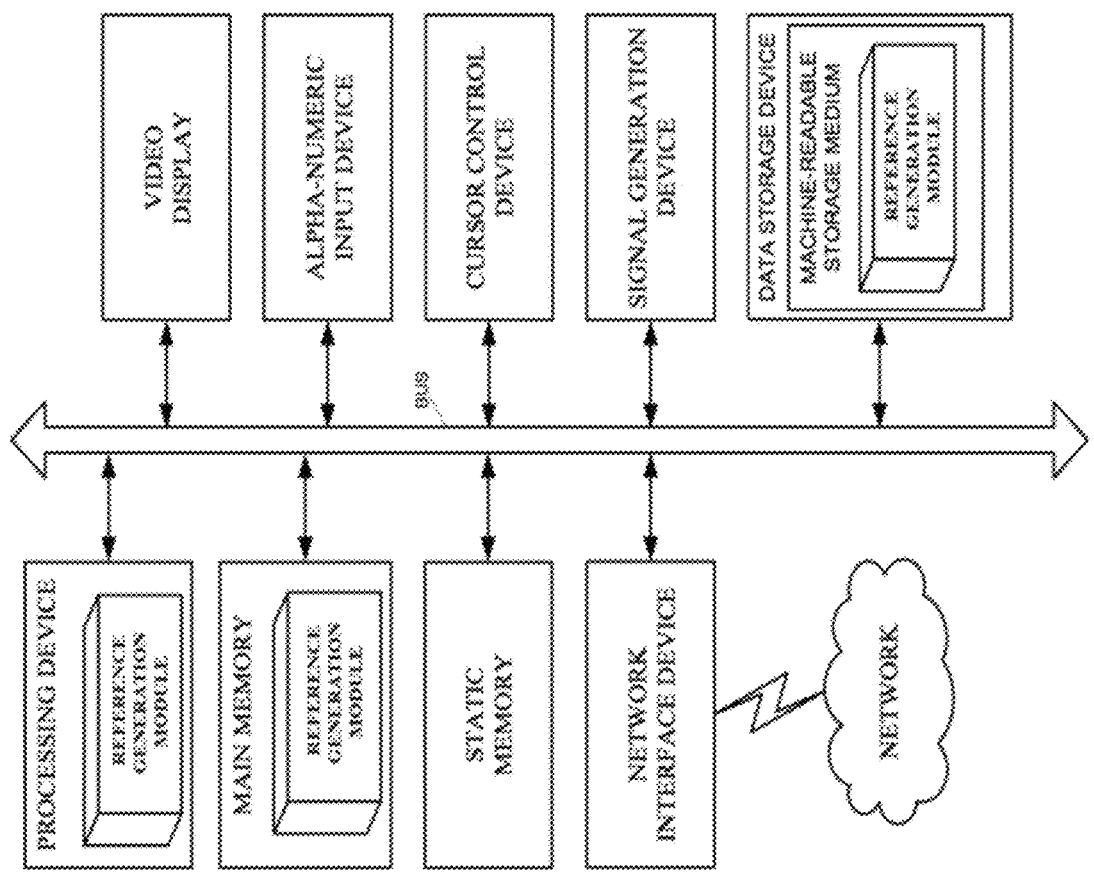
FIG. 20 is a block diagram that illustrates exemplary computer system architecture.

FIG. 20 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

FIGS. 21A-21E. are screenshots of the messaging system WhatsApp® (WhatsApp is a registered trademark of WhatsApp, LLC, Menlo Park, California). The illustrated messaging system provides quote-reply functionality to subscribers of its messaging platform. The illustrated quote-reply feature is highly utilized functionality. The illustrated messaging system includes the feature of message editing. However, the inventor is unaware of the illustrated messaging system providing for edited message flow-through to a display of a previously quoted first message associated with a further message.

FIGS. 21A-21E are screen shots of that messaging system and illustrate an edited first message. The inventor is unaware of edits to a first message in that message system that flow-through to further messages that quoted the first message prior to the edit. When a first message is edited a text indication is added to the associated first message chat bubble that reads "Edited [hh:mm]." The edited text of the first message does not flow through to the further message (i.e., the quote-reply message). There is no indication of any kind provided, associated with the further message, that there has been an edit to the associated first message.

In contrast to the messaging system described above, exemplary embodiments of the present invention include simultaneous or near simultaneous message edit flow-through in a quote-reply messaging system. Also provided are mechanisms for providing an indication of said edit.

More specifically, exemplary embodiments of the present invention include features for facilitating simultaneous or near simultaneous edits to an original message in a quote-reply enabled messaging system.

In an exemplary embodiment of the present invention, an indication of said edit is displayed associated with the edited first message in addition to the display of one or more edit notifications associated with the further message. One indication of the edit associated with the further message is the change in a display of the quoted portion of the quoted message itself. An example of a second edit notification is the display of an "Edited" icon or added text such as "EDITED". In some exemplary embodiments, the edit notification associated with the further message can include a control that when activated can cause an action such as the launching of an "edit my reply" modal or the displaying of the history of edits to the first message (e.g., a control that when activated allows a user to view a list—or to page through—previous edits to the associated edited first message.)

Figure 22B:
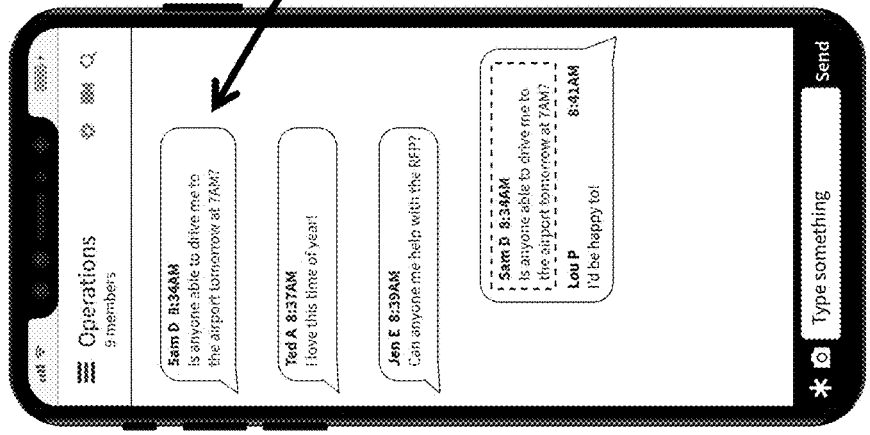
FIGS. 22A-22D are screenshots that illustrate messaging in accordance with an exemplary embodiment of the present invention.

In some exemplary embodiments, a sender of a quote reply message, (i.e., a user that selected a first message for quoting, added a reply, and transmitted a further message) would be alerted if the selected first message associated with her quote-reply message (the "further message") had been edited, and provided the opportunity to edit her own reply associated with said further message. (FIG. 22E). In some embodiments, only the message author may edit their own messages. In some embodiments one or more channel members may be permitted edit messages.

A solution to maintaining synchronicity between corresponding data elements could be through the use of a shared resource, such as a shared data resource location (FIG. 15A). From this shared resource, multiple activities occur: a) a first message is stored in the shared resource from a source device; b) a first message is edited in the shared resource by the source device; c) the first message (or portion thereof) is accessed from the shared resource by a destination device for inclusion in a further message (as a redisplayed message). The shared resource (such as a data storage location that may be included for example in a cloud server, a record in a shared database, a declared variable), can be electronically pointed to (i.e. electronically accessed) via a computer link or other addressing, such as a pointer (i.e. a dynamic variable whose value is the address of another variable).

A computer link is processed by a computing device. Exemplary computing devices include the devices and/or servers (such as cloud servers) illustrated in FIG. 19. The contents of the shared resource are thus electronically accessed via a computer link in order to display the redisplayed message. In this manner, if the (data available via the) shared resource is for example modified/edited, the change can be instantly and automatically reflected in the display of messages pointing to the common resource. As a further example, in the case of devices that are not connected to the Internet or not logged on to the associated app at the time a modification to the common element occurs, the update can automatically occur (for example) when reconnected. In cases where an edit occurs on one or more disconnected devices at respectively different times, an algorithm can be applied that updates the common object based on, for example, the time stamp of the most recent edit. In the case of simultaneous "most recent" edits occurring on one or more devices, a further condition could be applied such as the application of a priority deference based on, for example, seniority of a respective editor.

The above explanation has been with regard to a shared resource. A shared resource can be, for example, a shared memory location and/or a shared data structure. The shared resource can be at a physical address or at a virtual address. The shared resource can be in multiple locations (e.g. multiple servers and/or redundant servers in a cloud environment, or other multiple locations). The shared resource may be a physical location (such as a server) or a logical/virtual location such as a variable or a field in a database.

Figures 21A, 21B:
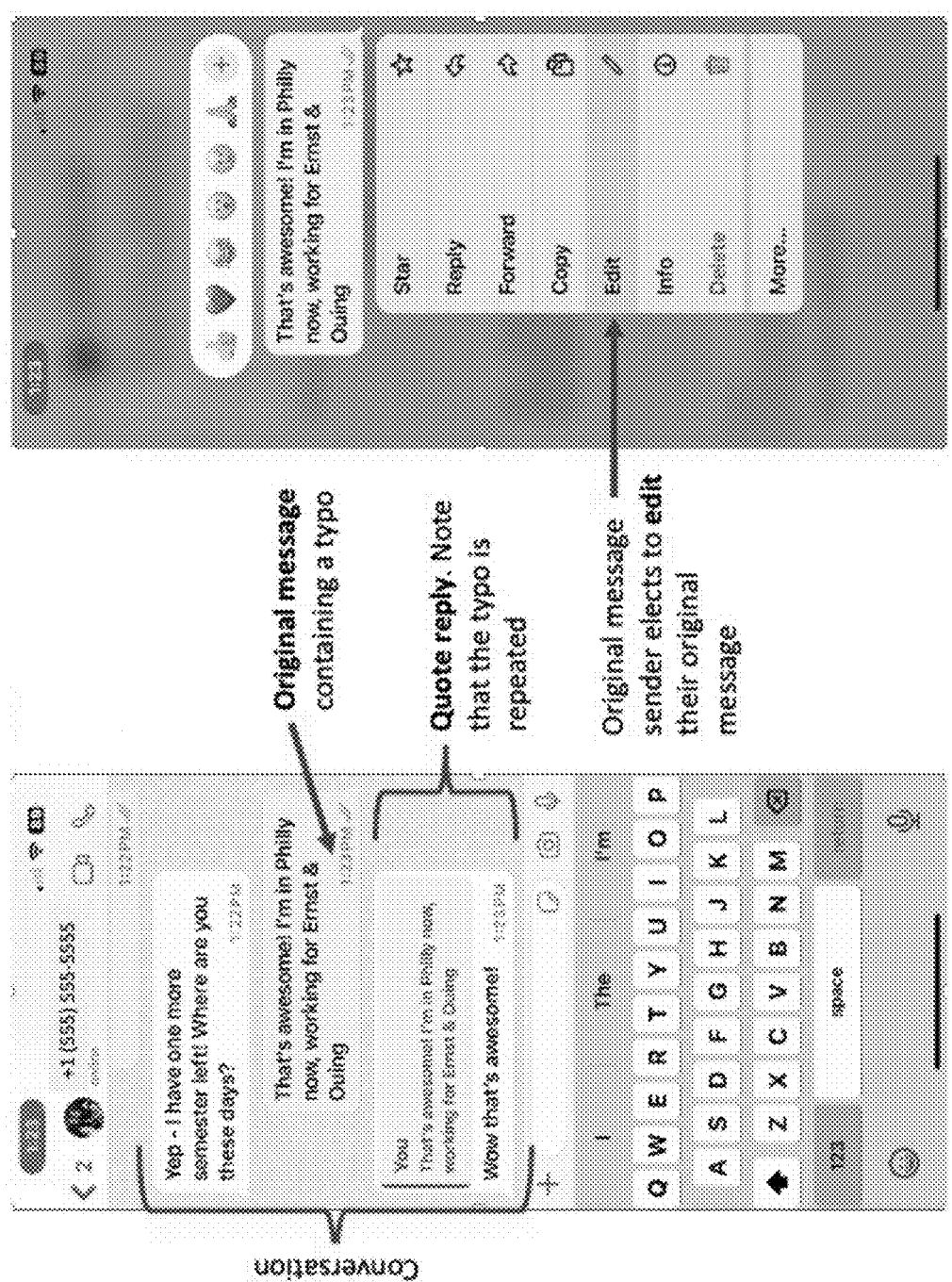
FIGS. 21A-21E are screenshots of an exemplary messaging system.
Figure 21D:
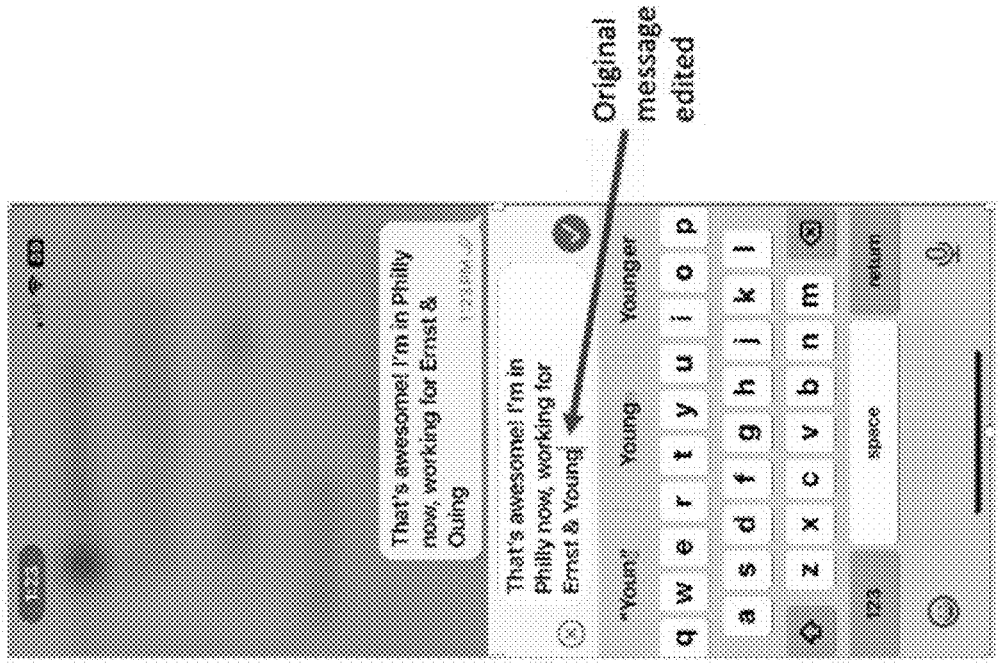
Figure 21C:
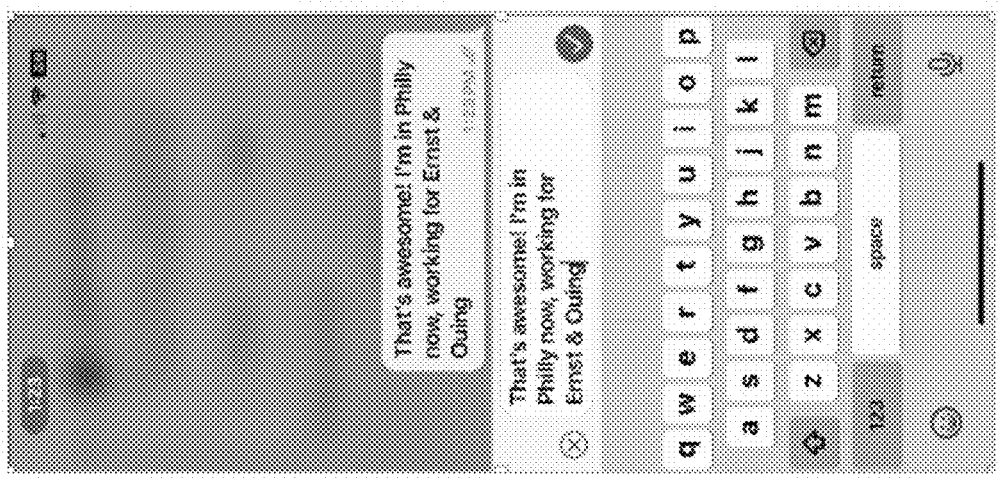
Figure 21E:
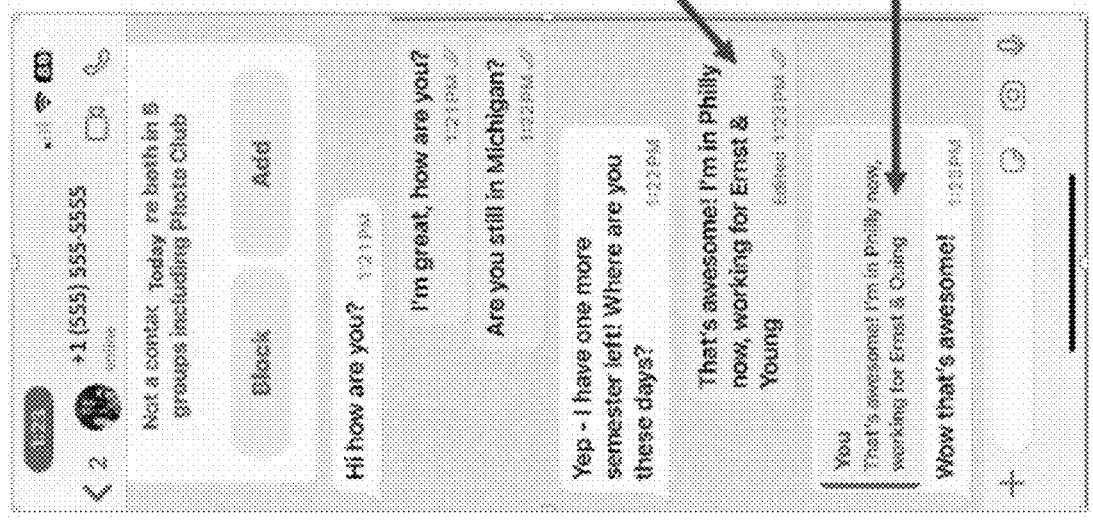

In several of the examples provided above, the first message is displayed in a message that replies to the first message (variously referred to for example as a "quote-reply message," "further message," or sometimes a "second message"). Thus, in the further message, what is typically visible is the first message and the reply to the first message. For clarity, the combination of the reference (i.e., digital connection) and the reply are referred to as a further message. When the first message appears in the further message, the first message may be referred to as the quoted message). In the example above, when the first message and the reply are grouped together to form the further message, as illustrated in FIG. 21E, the further message is formed by including content of the first message in the further message at the moment the further message was created. Hence, the first message included in the display of the further message is a version (i.e., a static copy) of the first message at the moment the further message was created. There is a disadvantage to creating the further message in this manner. For example, after the further message is created, the author of the first message may edit the first message. But in this example, the author's edit of the first message does not by itself change the first message as it appears in the further message (as the first message in the further message is merely a copy of the first message as it was at the time the further message was created (i.e., a "snap-shot"—a now outdated, earlier version of the first message). Put another way, the copy of the first message in the further message is static to the first message.

Thus, in FIG. 21E, the display of a quoted message (displayed associated with the further message) is a copied or retrieved [static] version of the first message (i.e., the first message "as-is") at the time that the first message was selected. The associated quoted first message is an instance of the current state of the value of the first message (a snap-shot) at the instant the first message was selected (FIG. 21E). A change to the first message after it has been snap-shotted, has no effect on the display of later displays of said selected first message (a "new" (i.e., edited) first message is not the same first message anymore. (they are out of sync)—(the further message in effect is no longer a "quote" of the first message. It was at one point but is no longer)

In accordance with an exemplary embodiment of the present invention, the display of a quoted message (displayed associated with the further message) is not a copied [static] version of the first message (i.e., the first message "as-is") at the time the first message is selected. But rather the associated quoted message is an instance of the current state of the value of the first message. Said instance being for example stored in a variable: wherein the value of the first message is a stored value that is pointed to by a digital connection associated with a further message. A change to the variable by itself has immediate/current effect on the display of said variable in all occurrences of said display of the content of said variable.

In some embodiments a process can be put in place to prevent the automatic "immediate/current effect" from occurring. In some exemplary embodiments, where use of a shared resource (such as a data storage location that may be included for example in a cloud server, a record in a shared database, a declared variable). is applied, it may be desirable not to have all instances pointing to the shared resource updated. In other words, in some exemplary embodiments, it may not be desirable to keep the respective instances that point to a common variable in sync. In such cases, an edit function can be created that causes the "disconnection" of one or more instances that point to the common variable (i.e., shared resource). An example of an approach that could facilitate such a disconnection could be a subroutine that recognizes that an edit is occurring, (e.g., "on message edit"), spawn a new variable containing the current value of a shared resource, and repoint one or more instances of messages that point to the old shared resource (e.g., variable) to the newly spawned variable (i.e., the newly spawned variable that retains the original message content).

One advantage of transmitting a computer link (i.e., digital connection) that points to a shared resource is that the approach is non duplicative, i.e., in some cases (such as the copying the entirety of the content associated with a quoted first message) the approach reduces transmission time, bandwidth requirements, and storage overhead. E.g., data such as quoted text, images and/or video information need not be duplicated, transmitted, and stored. In some embodiments, data may be stored in different places. For example, some data may be stored locally while other data may be stored on a cloud server. In some embodiments, the digital connection references data stored locally, or references data stored in a cloud server, or references data stored locally and in a cloud server.

In some exemplary embodiments that permit both quote-reply messaging and message editing, implementation of a shared resource approach may not be desired. In some embodiments, updating corresponding elements may not be desired and other approaches should be devised or considered. For example, users modifying an image (editing a group photo for example) that was initially shared via a quote reply message, may each want to apply and maintain their own respective local version of their own edits. Another example is a messaging platform directed towards auctions or sales whereby sellers post items for sale in a channel and whereby channel subscribers can monitor listings as they are posted. In an embodiment, sellers may be afforded a limited window (e.g., 15 minutes) during which they may edit their listing and wherein for that initial period of time quote-replies of bids or orders associated with an offered item are not permitted. Once the window has closed and bids and purchases begin, edits to an original description may be prevented by the system in some manner such as preventing display of an editing modal after an "allowed-to-edit" time period.

In some embodiments, where synchronicity between a first message and a quoted portion of said first message in a further message is achieved by use of a shared resource, such as a stored variable, it may be desirable to provide an additional indication that an edit has occurred (an indication in addition to the indication provided by the display of the text itself being changed).

In some embodiments, a modified version of the edited quoted text may be useful, or an "edited" icon, symbol added. For example, added text such as "Edited" could be displayed in an area proximate to the displayed updated display of the first message associated with the further message.

Since in some systems, the modification of the value stored in the shared resource occurs without regard to what effect the update has in cases where the stored value is displayed, it may be desirable in an exemplary embodiment to monitor (e.g., via polling or an interrupt) the messaging system for instances of a modification of the shared resource so that modifications can be indicated to users. For example, it may be desirable to provide an additional indication (i.e., a "second edit indication") to instances of edits of first messages associated with previously transmitted further messages. In some embodiments it could be beneficial to add an additional indication such as an "edited" icon associated with the displayed edited (all or a portion of the) quoted first message (associated with the displayed further message).

Other examples of added additional indications include, new text, message pinning, font change, edited text highlighting, or other indicator added to or replacing the content of the shared resource. The additional indication can be a visual indication that differs from how other redisplayed messages appear in order to call heightened attention to the fact that the redisplayed message has been edited. For example, if the first message text "It was good to see you today" was edited to read, "It was lovely to see you today", new text such as "EDITED:" could be added to the pre-existing content. In this example the stored content of the shared resource becomes "EDITED: It was lovely to see you today."

In some embodiments, other approaches to adding an additional indication to the portion of the further message displaying all or a portion of the edited first message associated with the further message can be applied.

For example, if a new message is created and transmitted that reads "Can someone take me to the airport tonight a 6 PM," it can be determined that the time of transmission (for example) is the moment of creation of the resource being created. At a later point if, for example, the first message associated with the existing message identification number is edited, it can be determined that this is not the moment of creation for the resource (i.e. the resource has been edited, and is not being initially created) and by recognizing this fact, content could be added to the field such as "EDITED."

In this manner all instances of the shared resource could reflect the edited message along with the text "EDITED." In some exemplary embodiments, rules could be applied as to when and if added text or an icon are to be added. For example, in some exemplary embodiments, an indication of editing (e.g., "EDITED") may be added after [two] minutes has elapsed from the message's first transmission.

In some exemplary embodiments, other and/or additional rules could be applied to limit or change the displayed representation of the shared resource. For example, in one exemplary embodiment, software could distinguish between types of messages (and apply different rules) and display a different representation of the edited quoted text depending upon the type of message is associated with the resource.

In an exemplary embodiment of the present invention, a messaging channel user constructs a quote-reply message (a "further message") by selecting a first message, entering a reply message, and transmitting the reply message associated with the first message as a further message. The further message is transmitted from the user's client device to one or more receiving client devices (each a "receiving device") [typically via a cloud server]. In some embodiments, the transmitting device is also a receiving device. In some embodiments, the transmitting device is not a receiving device.

FIGS. 22A-22G are screenshots that illustrate an exemplary embodiment of the present invention. Maintaining message instance synchronicity in a messaging system that supports both quote-replies and message editing can be a challenge where messages reside in the cloud, on one or more local devices, or where the message storage is both cloud-based and local device based.

Quote-Replies, in a messaging system that also facilitates message editing, is an example of a use-case that can benefit from feature interoperability and first-message instance to second first-message instance synchronicity, i.e., a concurrent or near concurrent change in corresponding elements. In an exemplary messaging embodiment that permits both message editing and quoted replies, it could be advantageous to have the first message and the quoted portion of that first message automatically and simultaneously update, upon the editing of a, in this example, previously quoted, first message.

Figure 22A:
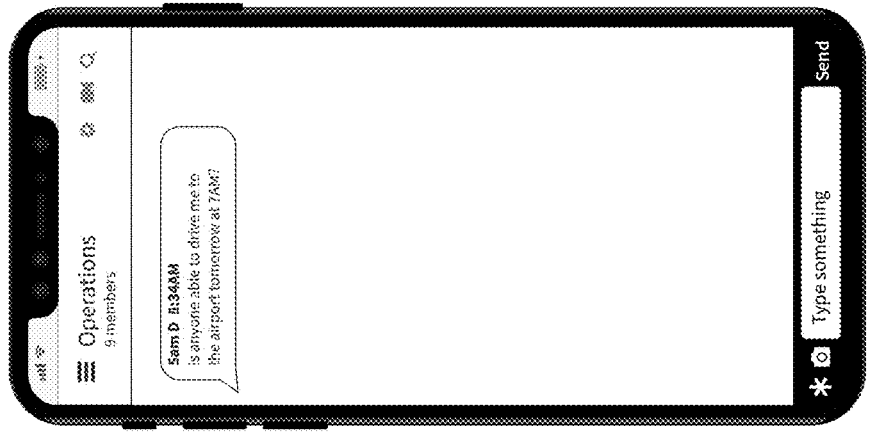

In FIG. 22A, Sam D has placed a first message in the message stream.

In FIG. 22B, a first message and a further message are illustrated. The further message includes a quote of the first message (via a digital connection). Thus, the first message is from Sam D and it has an 8:34 AM timestamp. The further message (with a timestamp of 8:41 AM) displays at least part of the first message, and includes the reply message "I'd be happy to!" The quote of the first message included in the further message is obtained via a digital connection.

Figure 22C:

In FIG. 22C, Sam D desires to edit the first message on his device (the "second" device). In FIG. 22C, the edit function is selected.

Figure 22D:
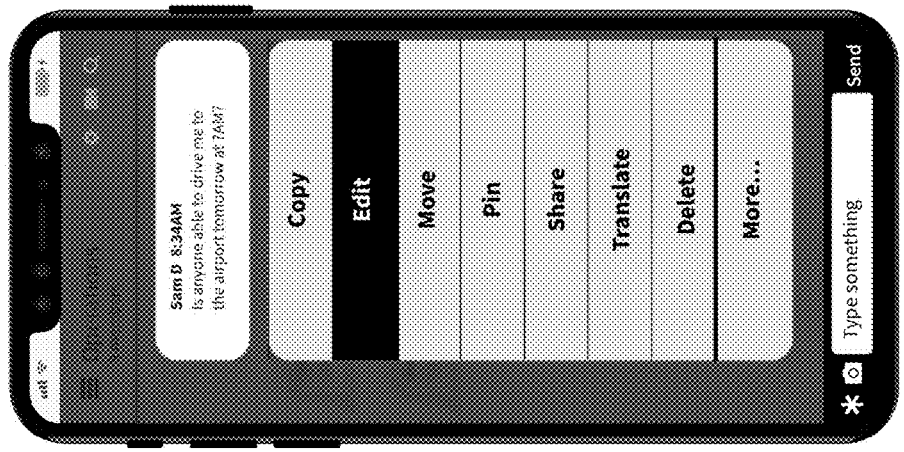

In FIG. 22D, Sam D edits the first message. Sam D is allowed to edit the first message. This edit will modify the redisplayed message to include the editing. Sam D's editing will be included in the redisplayed message based on the digital connection.

Figure 22F:
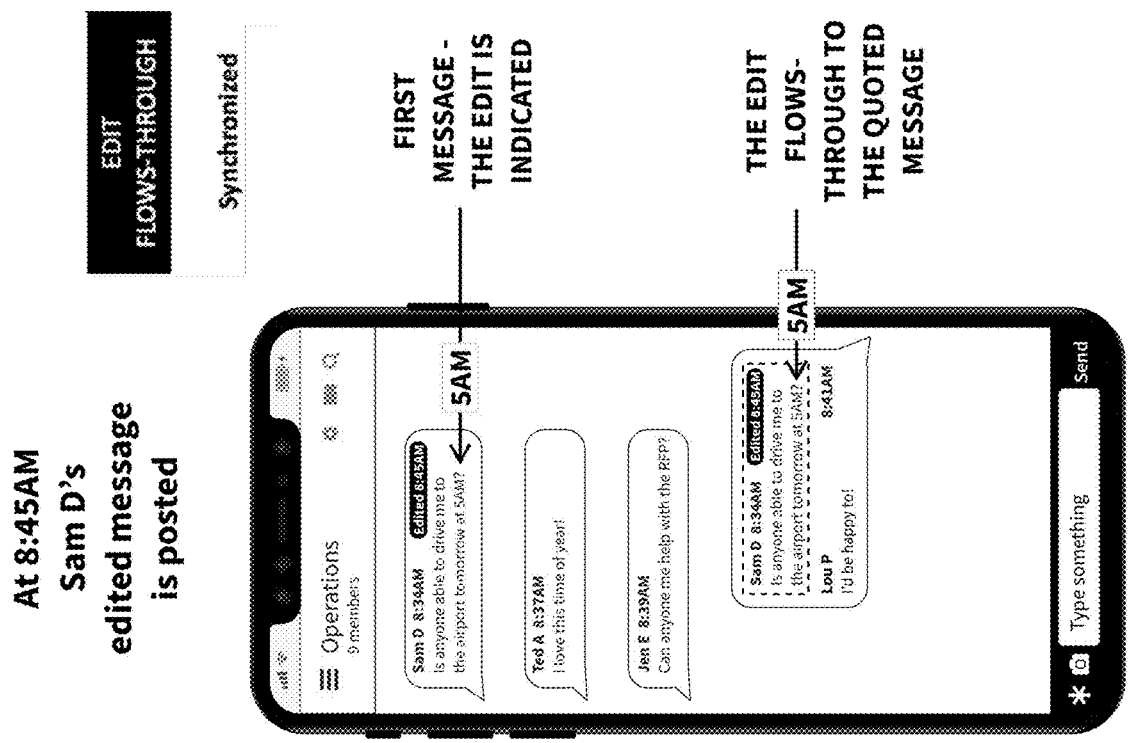
Figure 22E:
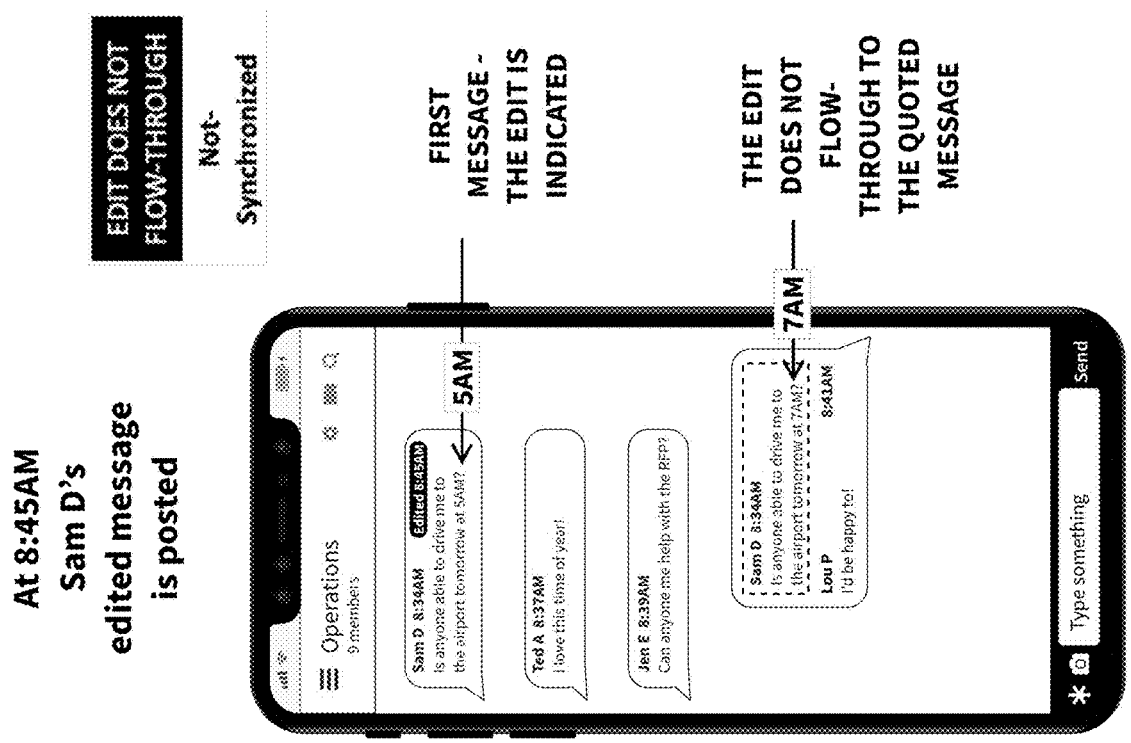
FIG. 22E is a screenshot of an exemplary messaging system.
Figure 22G:
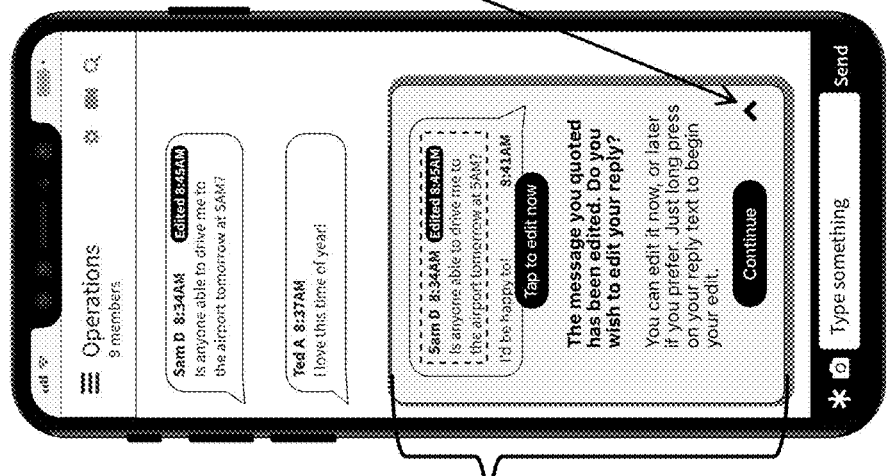

FIGS. 22E, 22F and 22G follow. FIG. 22E illustrates an example of messaging without synchronicity. FIGS. 22F and 22G illustrate an example of messaging with synchronicity.

FIG. 22E illustrates a situation in which the first message is edited after the further message was created (i.e., after the quote reply message was created). In the situation illustrated in FIG. 22E, the edit is not reflected in the further message. The versions of the first message and the quoted first message are different. They are not in sync because the quoted first message is static—it is a snapshot of the first message at the time it was created.

Thus, FIG. 22E illustrates a screenshot in which synchronicity between the first message and the quoted first message does not occur. In this figure, an original message sent by Sam D at 8:34 AM reads, "Is anyone able to drive me to the airport tomorrow at 7 AM?" was selected for quoting by, and replied to by Lou, at 8:41 AM, the displayed further message may add and display Lou's reply (e.g., "I'd be happy to!").

After sending his message, Sam D realized that he made a mistake in his original message (he meant to say 5 AM, not 7 AM). Upon realizing his mistake, Sam D edited his original message to read, "Is anyone able to drive me to the airport tomorrow at 5 AM?"

Again, FIG. 22E illustrates that the first message (and the quoted first message associated with the further message) are out of sync. The further message was not updated to reflect the edit to the first message and no indication associated with the further message is provided to indicate that the first message was edited. In many situations, the lack of synchronicity is undesirable. Sarafa—U.S. Patent Publication 2018/0159812—which is incorporated by reference for its teachings of digital messaging, lacks synchronization.

FIGS. 22F and 22G illustrate a first message and a further message in accordance with an exemplary embodiment of the present invention. The further message includes a quote of the first message. The first message has a timestamp of 8:34 AM. The further message displays (at least a portion of) the first message. The further message also includes a reply message having the time stamp 8:41 AM. The quote of the first message included in the further message is "digitally connected" to the first message. If the first message is edited after the further message was created (i.e., after the reply message was created), the edit is reflected in the further message. The versions of the first message and the quoted first message are the same. They are in sync.

Referring again to FIG. 22F, editing of the first message causes the redisplayed message to include the editing. Again, editing of the first message modifies the redisplayed message to include the editing based on a digital connection. The displaying of the redisplayed message as modified to include the editing is an indication (a first edit indication) that the editing has occurred. There may, however, be other indications that editing has occurred. Another indication that editing has occurred (a second edit indication) is to display the another indication so it appears associated with the redisplayed message. In FIG. 22F an indication of editing associated with the Sam D's 8:34 AM first message itself is displayed. FIG. 22F, also illustrates that, in addition, the indication "Edited 8:45 AM" appears so that it is visually associated with redisplayed message.

Referring again to FIG. 22F, after sending his message, Sam D realized that he made a mistake in his original (first) message (he meant to say 5 AM, not 7 AM). Upon realizing his mistake, Sam D edited his original message to read, "Is anyone able to drive me to the airport tomorrow at 5 AM?" FIG. 22F illustrates that the first message and the quoted first message associated with the further message are in sync. In this embodiment the first message was updated to reflect the edit and also includes an edit indication that says "Edited 8:45 AM" displayed in white text on a black background. The further message was also updated to reflect the edit to the first message and in addition to the indication provided by the change in the first message text to reflect the edit, a second indication associated with the further message is provided (i.e., the word "Edited" is highlighted and displayed).

In some embodiments one or more of the displayed edit indications associated with the edited first message and the one or more displayed edit indications associated with the redisplayed message associated with the further message are the same. In some embodiments one or more of the displayed edit indications associated with the edited first message and the one or more displayed edit indications associated with the redisplayed message associated with the further message are different.

In some embodiments the type and or number of indications associated with the first message and the redisplayed message associated with the further message are the same. In some embodiments the type and or number of indications associated with the first message and the redisplayed message associated with the further message are different.

In some embodiments one or more of the displayed edit indications associated with the edited first message and/or the one or more displayed edit indications associated with the redisplayed message associated with the further message are receptive to interaction in order to cause an action (e.g., review edit history, mark as seen, pin the message, add a reaction such as an emoji to an area associated with the edited message or the edit indication).

FIG. 22G illustrates a further exemplary embodiment of the present invention. In some exemplary embodiments, a notification or an alert such as a pop-up alert box is presented to the quote-replying user to inform the quote-replying user (i.e., the sender of an associated further message) that a message to which they replied has been edited, and advising the quote-replying user that they may edit their reply text/message that was associated with the edited first message. In some embodiments, an indication of an edit to the reply text/message is displayed. In some embodiments, if the quote replying user edits her reply message in response to the first message being edited, the author of the first message is notified that the reply text associated with their edited first message has been modified.

In some exemplary embodiments, a quote-replying user can edit and/or delete their reply text that was transmitted in connection with their reply to a quoted first message.

In some exemplary embodiments, one or more attributes of the reply text and/or the area associated with the reply text associated with a further message is modified (or deleted) automatically. For example, the color of the reply text changed, font italicized, or a line drawn [horizontally] through the reply text. This form of edit notification could be useful, for example, to alert channel members that a reply message may no longer be responsive to the displayed first message which was edited after the reply message (as part of the further message)—was transmitted).

In some exemplary embodiments, an indication clearly associated with the reply text included in the further message is displayed, to convey to users that the reply text occurred prior to the edit to the first message.

Utilizing a message identifier as the basis of correspondence between an original first message and the quoted portion of said first message associated with a further message can be another successful approach. This approach, in an embodiment where, for example, message storage is distributed (e.g., sever message data storage and respective local device message data storage), as opposed to being based on the use of a shared resource, has some benefits such as providing a messaging system with an enhanced approach to controlling/restricting first message propagation. It also, arguably, has some detractions such as complexity, immediacy, and concurrency.

Figure 22H:
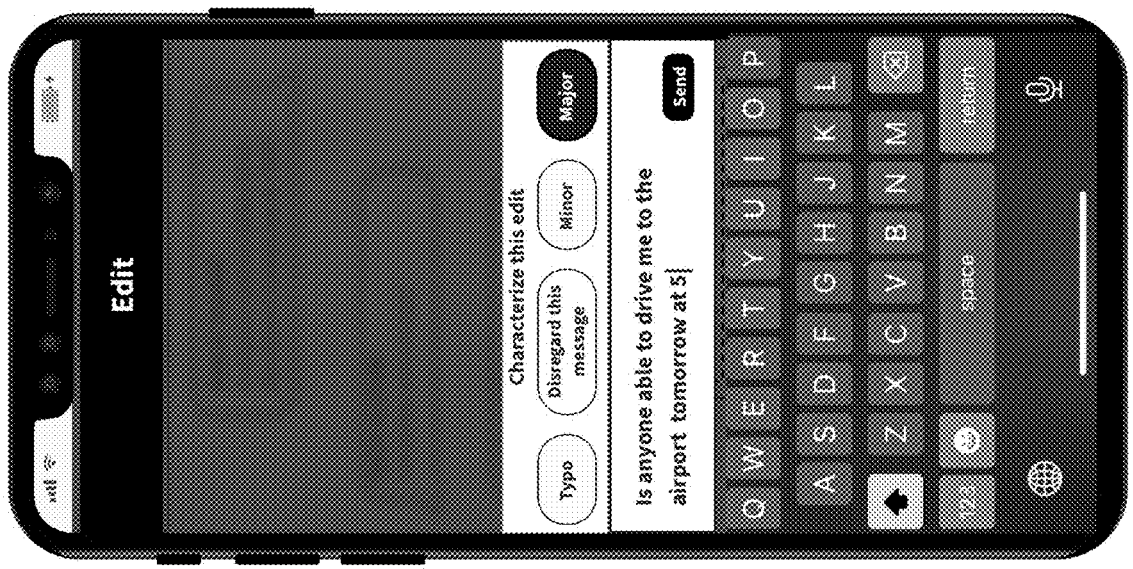
Figure 22L:
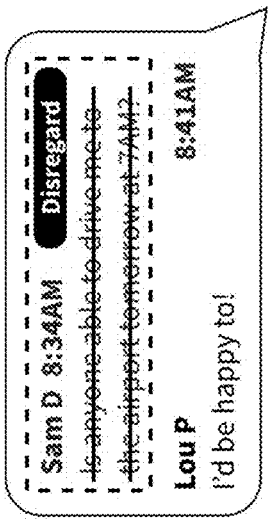
Figure 22K:
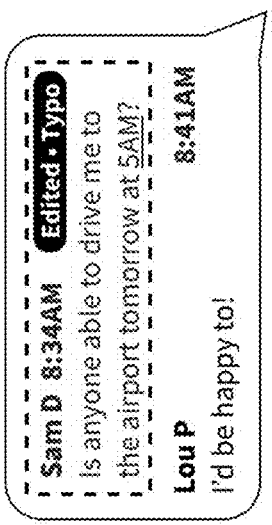
Figure 22M:
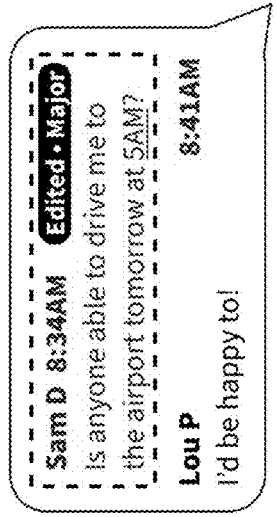

FIG. 22H illustrates a further exemplary embodiment of the present invention. In some exemplary embodiments, the editing user is provided with options to characterize their edit. By characterizing an edit, useful information can be imparted to channel members when they view the edited first message. In this example, the editing user is presented with the current content (e.g., text) of the first message displayed in a text entry field. In this example, the editing user is able to make changes to the text of the current (e.g., the original) first message. In this example, in addition to being able to modify the current first message, the user is able to select one or more "edit characterization." In this example, the editor may tap on the "Typo," "Disregard this message," "Minor," or "Major" selection options. In this example the editing user tapped on "Major." In this manner, edited messages can be displayed with one or more characterizations to help the reader understand the extent or intention of the editor's edit. FIGS. 22K, 22L and 22M are illustrations of exemplary displays of an edited further message, said exemplary displays including the characterization indication selected in FIG. 22H.

FIG. 22I illustrates a further exemplary embodiment of the present invention. In some exemplary embodiments, the editing user is provided with an indication that a message she has selected for editing (FIGS. 22B-22C) has been prior quoted and included in a further message.

In this embodiment the editing user is warned if the message she has selected for editing has been previously quoted (2200).

In this embodiment the editing user is given the opportunity to add a further reply to the reply to their original message (2215). In other words, the editing user may add a reply message in response to the reply message included in the further message. In some embodiments the editing user's reply, to the reply message included in the further message, is added to, and displayed together with the further message (see FIG. 22J). In some embodiments a reply-to-reply further message is posted as a new message in the message stream. In some embodiments the further message is updated to include the further reply "in place." In some embodiments the reply-to-reply message is posted both as a new message in the message stream and the further message is updated to include the further reply "in place."

In this embodiment the editing user may choose to Cancel the Edit or Strike the reply (for example, have the reply text appear with an indication of being stricken, such as having a line drawn through it) (2210).

In this embodiment, the message editor may request that the author of the reply message be notified that the message has been edited. Notification could be in the form of, for example, an application notification, a text message (e.g. SMS, RCS), an email or telephone call.

In this embodiment the editing user may swipe left or right on an area of the warning message to view and address additional instances of message quoting. Item 2220 is an exemplary visual indication that, in this example, indicates that there are three "further messages" that include the first message targeted for editing. The user in this example can swipe left and right to view successive or preceding effected further messages. In this example the editing user is permitted to address each further message individually. In some embodiments the user can address one or more further messages together, e.g., "strike all replies in all further messages that include this [edited] first message."

Additional and/or other options can be provided.

Figure 23B:
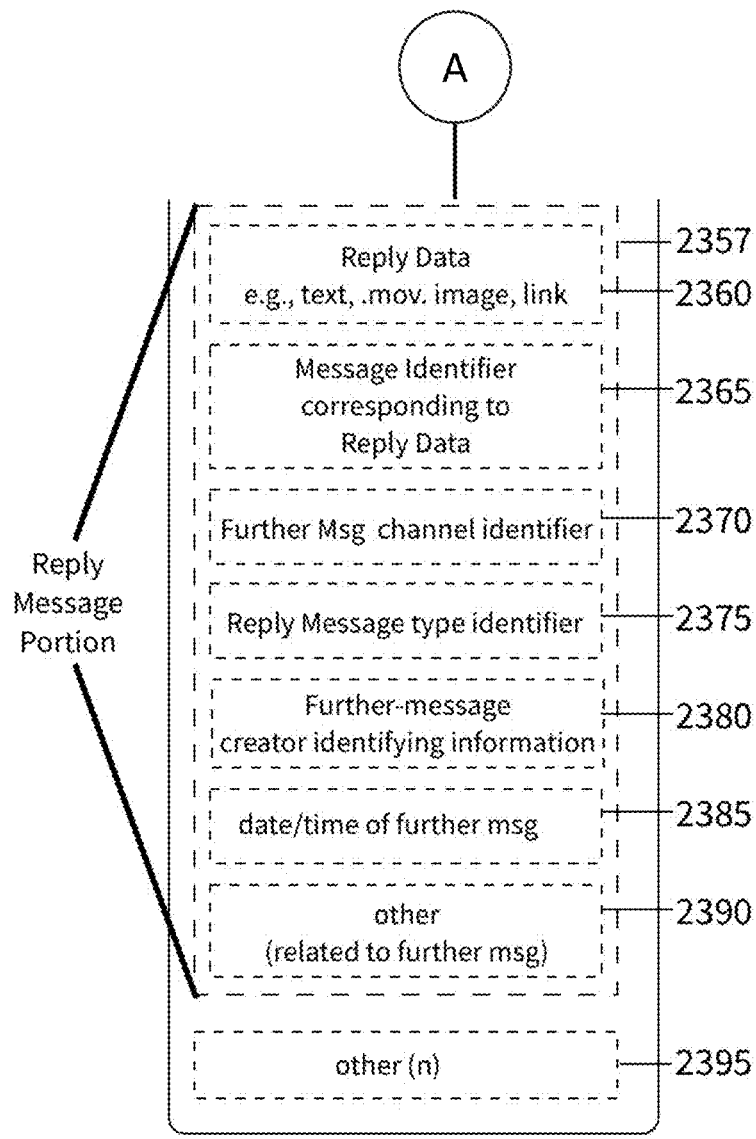

FIGS. 23A-23B illustrate components of a message packet in accordance with an exemplary embodiment of the present invention. In this exemplary embodiment, the message packet is transmitted from a cloud server to a receiving device in a messaging system. Some or all of the messages are stored in both a cloud server and the local store of a receiving device. Correspondence between messages stored on the cloud server and the receiving device is maintained by use of message identifiers.

In some exemplary embodiments, messages are transmitted as a message packet (2300), the message packet comprised of data elements such as a message packet identifier (used to identify the message packet) (2302), a Message Packet Type Identifier (2305), a Message Identifier(n) (i.e., a form of "digital connection") used to identify the first message (2310), and reply data such as text (2360).

In some exemplary embodiments, a message packet combines discrete elements into a single element. Other examples of information that may be included in the message packet are (these may be optional depending upon the application): message identifier associated with the reply message (2365), selected all or a portion of first message(n) (2315), channel identifier(n) associated with the first message (2320), metadata associated with the first message, metadata such as date and time(n) associated with the first message (2335), channel identifier associated with the reply message (2370), first message type(n) information (e.g., "E" for edited message or "T" for a task message) (2325), identifying information regarding email recipient(n) of the first message (2340), message ID associated with email recipient/s (2345). In some embodiments other data can be included and associated with one or more transmission packet portions. Some examples of message packet portions are: First Message(n) Portion (2355) and Reply Message(n) Portion (2390).

In some exemplary embodiments, a copy of all or a portion of the selected all or a portion of said first message is included in the message packet (2315). In some embodiments, sending a copy of the first message may be useful and/or necessary but doing so can have drawbacks such as increased transmission time, bandwidth requirements, and storage overhead.

In some embodiments, a message packet type identifier and/or a first message type(n) identifier, could be included to identify the type of message being transmitted, e.g., a type field that could store one or more characters such as a "R" to indicate that the message is a "Quote Reply" type message, an "E" to indicate that the message is an "Edited" message, an "EM" to indicate that the message includes email recipients, or an "IC" to indicate that a message is sent to a user of the same messaging platform who is employed by a different customer of the messaging platform (e.g., a shared channel, multi-tenant environment).

In some embodiments, message packet fields can contain information associated with one or more attributes, for example a message identifier field may consist of data "E4093562763017" that can be parsed by a receiving device to conclude that the initial "E" indicates an "Edited" message and the characters "4093562763017" following the "E" represent the message identifier of the edited message.

In some embodiments, the message identifier is used in lieu of other approaches such as a shared resource approach for storing (and redisplaying) the first message. In some embodiments, the message identifier is used when shared resources are available for storing (and redisplaying) the first message.

Figure 24A:
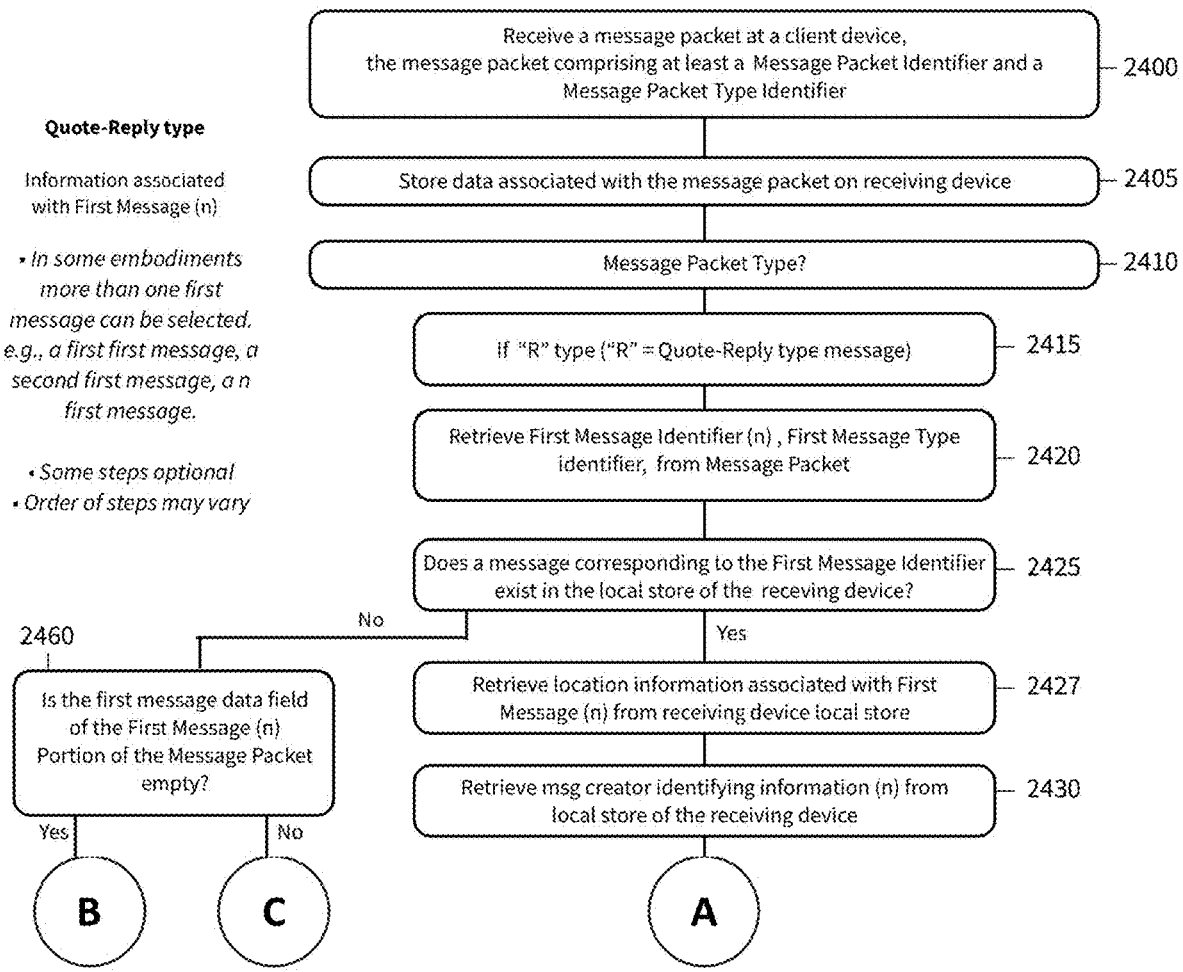
FIG. 24A-24B is a flowchart diagram that illustrates exemplary message flow in accordance with an exemplary embodiment of the present invention.
Figure 24B:
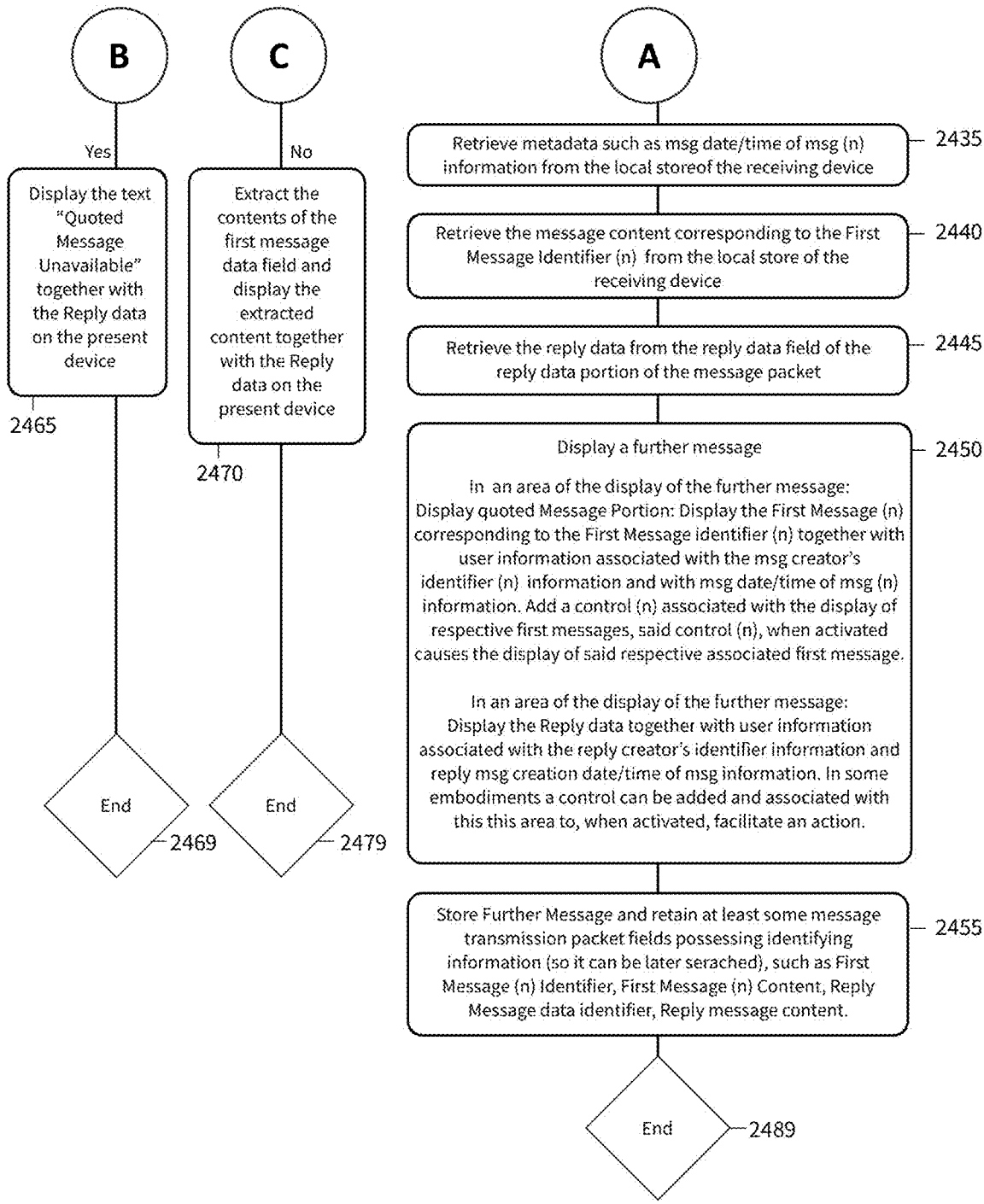

FIGS. 24A-24B is a flow chart diagram that illustrates the receiving of a message packet containing the components of a further message, by a receiving device. The message packet is transmitted from a cloud server to a receiving device in a messaging system. Some or all of the messages are stored in both a cloud server and the local store of a receiving device. Correspondence between messages stored on the cloud server and the receiving device is maintained by use of message identifiers.

In some exemplary embodiments, restrictions are put in place regarding who may have access to messages transmitted in a message channel.

In an exemplary embodiment of a messaging system that utilizes a message identifier as the basis of a correspondence between a first message and a display of the first message associated with a reply message, recent channel subscribers may not be permitted access to messages received in the channel prior to their subscribing to that channel. In some embodiments, at least some of the messages received on the receiving device may reside in the local store. The messages are comprised of at least the content of the received messages and respective message identifier. The message identifier corresponds to a matching message identifier associated with corresponding messages residing for example, on a cloud-based server. This embodiment can be an effective approach to, for example, denying access to quoted portions of messages that were originally transmitted before a user subscribed to a particular channel but was quoted after said user subscribed to the channel.

In an exemplary embodiment, one or more specified users can be prevented from receiving a further message containing all or a portion of specified previously received messages.

In an exemplary embodiment, specified channels and/or channel subscribers (associated with receiving devices) can be prevented from re-display of first messages associated with certain further messages, even if a corresponding first message resides in the local store of the receiving device. One way this can be achieved is by modifying or eliminating message identifiers associated with one or more messages (prior to transmission or upon (or after) receipt of messages by a receiving device). The modifying or eliminating of one or more channel identifiers and/or message identifiers can result in the receiving device being unable to locate a corresponding first message.

In some exemplary embodiments, a receiving device uses the message identifier (a "digital connection") (2420) to search for an instance of the first message residing in the local store of the receiving device (2425). If a corresponding message identifier is found in the local store, the receiving device ascertains the location and/or the content of the first message. Location can refer to, for example, a location in a local memory or a remote source of data storage. Location can also refer to where the first message is in a message stream so that it is possible to, for example, "jump" back to the first message within the message stream. In some embodiments, and in cases where the message identifier was "found" in the local store, a control can be added by the receiving device, for example, to an area or object associated with the display of the further message (e.g., an area associated with the redisplayed message), said control operable to cause, for example, a "jump" to, and display of, the corresponding first message where it resides chronologically in relation to messages received before and after said first message was [originally] received. If the receiving device does not locate a message corresponding to the message identifier in its local store (i.e., the content of the first message cannot be ascertained based on information stored on the local device), then the receiving device can opt to disregard (e.g., not display) the further message, or alternatively, for example, display the reply text proximate to a display of an icon indication or message text (e.g., "quoted message unavailable") in place of the intended quoted first message. In an alternative embodiment the receiving device can search for and obtain, if available, the first message from an available cloud-based source.

One reason for utilizing a message identifier as a basis of correspondence between a first message and a further display of the first message associated with a quote-reply message (i.e., a "further message") may be to ascertain whether a user associated with a receiving device, or the device itself, is entitled to access to said all or a portion of the selected first message. For example, in some use-cases, only channel members who had previously or initially received a particular transmitted first message may be permitted access to the content of the first message again in the future.

In another use-case example, a message identifier may be relied upon by a receiving device to search for an instance of a corresponding message identifier in the local store of the receiving device to ascertain the location or position of the first message in a channel message stream relative to other messages in the channel stream.

In some embodiments, "corresponding" message identifier means a message identifier that is received, matches exactly (i.e., is comprised of identical data such as a string of identical alpha numeric characters) with the message identifier associated with the first message and stored on a receiving device. In some embodiments, it may be desirable for the receiving device to alter and store a different message identifier than the received message identifier. In some embodiments, correspondence between the received message identifier and the stored message identifier can be maintained. In some embodiments, "corresponding" does not mean "matching exactly." In other words, in some embodiments, an algorithm, for example, can be applied to a received message identifier that converts the representation of the received message identifier to a different representation of the received message identifier. In this manner, in some embodiments, message identifiers stored on a receiving device can be different than a corresponding first message's message identifier as represented on a sending device (and/or server) but a correspondence between the respective message identifiers can be maintained (for example by storing the correspondence in an appropriate data structure or via a hash function). This may be useful in cases where an interaction with a further message on a receiving device is intended to cause a change in display (e.g., blinking/flashing of the corresponding first message) to highlight in some fashion the first message associated with the quoted portion of the first message associated with the further message. In some embodiments, a change in display as a result of an interaction with a further message, is a change in the focus of the display from the further message to the position of a corresponding instance of the message identifier. In other words, if a user taps on the further message, the focus of the message displayed "jumps back" (to the display of the first message in its original position in the message stream). Thus, a visual change occurs so that the first message is displayed where it chronologically occurs in the message stream. This can be useful functionality that aids the user in determining the context of the quoted first message.

FIGS. 24A and 24B is a flowchart diagram that illustrates exemplary message referencing in accordance with a further exemplary embodiment of the present invention. The flow chart diagram is merely exemplary as some steps are optional and names may be different. Some steps can be combined. Some steps can be broken-out. Some steps can occur before or after their current placement in the flow chart.

At step 2400, a message packet is received by a receiving device. The message packet is comprised of at least a Message Packet Identifier and a Message Packet Type Identifier.

At step 2405, data transmitted in the message packet is stored on the receiving device.

At step 2410, the receiving device extracts information from the message packet and determines the message packet type.

At 2415. If the message packet type is a "Quote-Reply Message" type then the application follows the application programming associated with "Quote Reply Message" types. If the message packet type is other than a "Quote-Reply Message" type the application will follow the programming steps associated with that respective message packet type.

At step 2420, the first message identifier (n) and the first message type (n) identifier is retrieved from the message packet. In some exemplary embodiments, more than one first message can be selected for quoting, for example a second first message (first message (2)), a third first message (first message (3)), etc.

At step 2425, the messaging application on the receiving device executes a search to locate instances in the local store of message identifiers that match the message identifier extracted from the message packet. In some embodiments "match" means corresponds with. In some embodiments, the "match" may not necessarily mean a literal exact match of the message ID extracted from the message packet. In some exemplary embodiments, an algorithm could be applied for example that, for example, altered message IDs for security reasons, that were algorithmically applied to determine a "match." In some exemplary embodiments, an identifier other than message ID could be used for the purpose of searching and locating matching first messages.

If no matches are found, it is interpreted as meaning that the first message does not exist in the local store on the receiving device, and processing branches to step 2460.

If matches are found, it is interpreted as meaning that the first message exists in the local store on the receiving device and processing continues to step 2430.

At step 2460 in some exemplary embodiments, the message transmission packet includes a copy of all or a portion of the selected first message, i.e., the message selected for quoting. In some exemplary embodiments, the transmission packet does not include all or a portion of the selected first message. At step 2460, the application checks the first message (n) field of message packet. If the field doesn't exist, or if the field exists and is "empty" then processing proceeds to step 2465. Otherwise, if there is data in the First Message (n) field, processing proceeds to step 2470.

At step 2465 (no data in the First message (n) field), the reply text extracted from the message packet is displayed along with text that reads, for example, "Quoted Message Unavailable." In some exemplary embodiments other messages, icons, or approaches to handling an empty "First Message (n)" field can be applied.

At step 2470 (data in the First Message (n) field), the application extracts the contents of the first message (n) field and displays the extracted content together with the reply data on the receiving device. In an exemplary embodiment, the feature of adding a control to the display of the First-Message+Reply-message message, to enable a jump back to the first message in its original location in the message stream, is not provided, due to the fact that the first message was not found in the local store.

At steps 2469 and 2479, processing terminates.

If a match between the message identifier retrieved from the message packet is located in the local store of messages on the receiving device at step 2425, then processing proceeds to optional step 2427.

At step 2427, location information associated with the located First Message (n) is retrieved.

At step 2430, quote-reply message creator (n) identifying information is retrieved from the local store of the receiving device.

At step 2435 meta-data (n) such as date/time that the quote reply message was transmitted from the local store of the receiving device is retrieved.

At step 2440 the message content corresponding to the First Message identifier from the local store of the receiving device is retrieved.

At step 2445 the reply message data from the reply data field of the message transmission packet is retrieved.

At step 2455 the further message is displayed. In an area of the display of the further message, displayed is the Quoted Message Portion comprised of the First Message(n) corresponding to the First Message identifier(n) together with user information associated with the msg creator's(n) identifier information and with msg date/time of msg(n) information. A control (n) associated with the display of respective first messages may be included, the control (n), for example, when activated causes the display of said respective associated first message.

In an area of the display of the further message:

Displayed is the Reply data together with user information associated with the reply creator's identifier information and reply msg creation date/time of msg(n) information. In some embodiments a control can be added and associated with this this area to, for example, when activated, facilitate an action.

At step 2455, information associated with the further message such as first message(n) content, first message identifier(n), reply data message content, and reply message data identifier are stored on the receiving device. It is useful to store this data in the local store so that functionality requiring searching for data elements in the local store on the receiving device, can be effectively facilitated.

FIGS. 25A-25B is a flow chart diagram that illustrates the receiving of a message packet containing the components of an edited message by a receiving device. The message packet is transmitted from a cloud server to a receiving device in a messaging system whereby some or all messages are stored in both a cloud server and the local store of a receiving device and whereby correspondence between messages stored on the cloud server and the receiving device is maintained by use of message identifiers.

In an exemplary (embodiment of a) messaging system that utilizes a message identifier as the basis of a correspondence between a first message and a further display of said first message associated with a quote-reply message (a "further message"), a message editing function can be supported. In particular, it is desirable to have edits to an original message "flow through" to the quoted portion of said first message in association with a further message wherein said edit and said flow through take place after the transmission of the further message. In such a system, synchronicity between an edited first message and the quoted message portion associated with reply messages that previously quoted the first message (i.e., "further message") can be achieved.

One approach to achieving synchronicity between the edited original message and the quoted portion of the original message in a message identifier-based implementation is to include in the transmission of the edited message, information associated with the edited message. Exemplary information may be, for example, one or more channel identifiers associated with the first message, one or more channel identifiers associated with the further message, a message identifier of the current further message, the message identifier of the one or more first messages, the date and time of the edit of the edited first message, information associated with the editing user's identification, the content of the edited message, and an indication that the current message is an edited message (for example via a type field included with the message transmission).

By transmitting certain components in a message packet, the receiving device can determine that the received message is an edited message. Based on the information available to the receiving device, the receiving device can replace or modify the original message (the "first message") in its local store (i.e., of the receiving device). In some exemplary embodiments, the original unedited version can be either retained or not retained. The knowledge that the message is an edited message also allows for an augmented or an additional "edited" indication (a second "edited" indication) to be displayed and associated with the edited message in its original location. An edited message indication of the message edit can be provided. The indication can be associated with the display of the all or a portion of the first message associated with the further message. For example, that indication may be in addition to the indication provided by the text itself which changed as a result of the edited text replacing the previous text.

After a receiving device has determined that a received message is an edited message, for example, the presence of an "E" in a type identifier field included in the message packet, the receiving device can search for and update the data in its local store corresponding to the first message, and the "further messages" associated with corresponding first-message message identifiers. In this manner displayed "further messages" (in addition to the edited first message) reflect the modification to the edited first message.

In an exemplary embodiment, the update of the information in the local store associated with all or a portion of the first message occurs automatically. However, in some exemplary embodiments, the update may be caused to occur by other means such as user request. In some exemplary embodiments, all instances of edits to a first message associated with corresponding further messages are reflected (e.g., updated) in the receiving device's local store, while in other cases fewer than all further messages are updated. In some embodiments, edited text associated with a first message is displayed, modified and/or replaced with other data.

FIGS. 25A-25B relate to an exemplary embodiment of a messaging system wherein both quoted messaging and message editing are permitted. In an exemplary embodiment of the present invention, message identifiers (which serve as digital connections) are used as the basis of correspondence between a first message and a quoted portion of the first message associated with a further message. In such a situation, it may be advantageous to facilitate the synchronization of the display of the quoted portion of the first message associated with the first message. Synchronization may occur at certain times, such as, upon receipt of an edited first message, upon request of a user, or automatically when, for example, the messaging application is launched), when there is a switch of the display of the channel being viewed from one channel to another channel, when a user scrolls their display of messages to reveal additional messages, or when a new message associated with a channel is received by a receiving device. At those exemplary times, the receiving device may request or the cloud-based server may transmit without request, that one or more messages stored on the receiving device and associated with one or more channels, be replaced with different data associated with corresponding current or modified data residing on [the] cloud server. In other words, one or more messages residing in the local store on the local device may be updated or replaced by new or different data residing elsewhere. The "elsewhere" could be on a cloud server, but the new or different data may come from another location as well. One example of another location may be another local device such as a phone or a memory device. In such a scenario data transfer is via generally known forms of data transmission such as NFC, Bluetooth, Wi-Fi, etc. In some embodiments, all messages and/or data associated with messages stored on the local device are replaced with corresponding data from the server (or other source of corresponding data). In some embodiments, select messages and/or data associated with messages stored on the local device are replaced with corresponding data from the server.

In an exemplary embodiment of a messaging system wherein both quoted messaging and message editing are permitted and wherein the embodiment utilizes message identifiers as the basis of correspondence between a first message and a quoted portion of said first message associated with a further message, it may be advantageous to facilitate the synchronization of the display of the quoted portion of the first message associated with the first message and the first message. In an exemplary embodiment, at certain times, such as, upon request of a user, or automatically when the messaging application is launched, or when a user switches the display of the channel being viewed from one channel to another channel, or when a user scrolls their display of messages to reveal additional messages, or when a new message associated with a channel is received by a receiving device, the receiving device identifies at least one existing quote reply message (a "further message") in one or more channels. Based on an identifiable attribute, sequence, data match, or message identifier associated with the quote reply type message or the quoted portion of said further message, the information stored in the local store of said local device is updated to reflect the corresponding data received from the cloud server based on said identifiable attribute/s. In an exemplary embodiment, a step involves identifying discrepancies between messages in the local store and the quoted portion of the quote reply messages in the local store, and updates the quoted portion of further messages to match the data of the corresponding edited first message. For example, if a discrepancy is identified, the further message is modified to reflect the change in the first message.

FIGS. 25A-25B is a flowchart diagram that illustrates exemplary message referencing in accordance with a further exemplary embodiment of the present invention. The flow chart diagram is merely exemplary as some steps are optional and names may be different. Some steps can be combined. Some steps can be broken-out. Some steps can occur before or after their current placement in the flow chart.

At step 2505, a message packet is received by a receiving device. The message packet is comprised of at least a Message Packet Identifier and a Message Packet Type Identifier.

At step 2510, data transmitted in the message packet is stored on the receiving device.

At step 2515, the receiving device extracts information from the transmission packet and determines the message packet type.

At 2520, If the message packet type is an "Edited Message" type then programming associated with "Edited Message" types is followed. If the message packet type is other than an "Edited Message" type the application, the programming steps associated with that respective message packet type are followed.

At step 2525, the First Message identifier is retrieved from the message packet.

At step 2530, the receiving device executes a search to locate an instance in the local store of the message identifier that matches the First Message identifier extracted from the message packet. In some exemplary embodiments, the search is limited to messages that are also of a specified type (e.g., "default" type). Limiting the search to the default type (for example) can result in (for example) only the original instance (i.e., the original First Message) being located and updated. This can be useful in scenarios where different indications are added by the application to instances of the edited first message as it Is displayed associated with different types of message displays. For example, the indication of an edited First message that is associated with a further message may display a different edited icon than an edited original first message (which has a different type association). In some embodiments "match" means corresponds with. The "match" does not necessarily mean a literal exact match of the message ID extracted from the message packet. In some embodiments an algorithm could be applied that, for example, alters message IDs for security reasons, that were algorithmically applied to determine a "match." In some exemplary embodiments, an identifier other than message ID could be used for the purpose of searching and locating matching first messages.

If no matches are found, it is interpreted as meaning that the first message does not exist in the local store on the receiving device and processing branches to step 2534 and the processing is terminated.

If a match is found, it is interpreted as meaning that the first message exists in the local store on the receiving device and processing continues to step 2535.

At step 2535, processing retrieves the message creator's (i.e., the message editor's) identifying information from the local store of the receiving device. In some exemplary embodiments, a message can be edited by one or more channel members. In some exemplary embodiments, a message can (for example) only be edited by the author of the initial message. In some embodiments only an authorized user can edit (e.g., channel leader, system admin).

At step 2540, processing retrieves meta-data from the message packet such as date/time that the quote reply message was transmitted.

At step 2545, the edited message is extracted from the First Message data field associated with the First Message Portion of the message packet. In this example, the text "EDITED:" is added to the beginning of the extracted message (together the "Edited Message"). The data associated with the First Message identifier is then replaced in the local store with the Edited Message.

At step 2550, the updated First Message corresponding to the First Message identifier is displayed.

At step 2555, the application searches for the next message corresponding to the First Message Identifier with a type identifier="Further Message."

Step 2560, processing adds, for example, text, such as, "QUOTED MSG EDITED:" to the beginning of the extracted message (together the "Edited Message") The application replaces the content of the First Message field corresponding with the found First Message portion of the Further message in the local store of the present device.

At step 2565, the edited First Message, and Further Message(s) including the edited portion of the Further Message corresponding to the edited First Message, is available to be displayed. In some embodiments edited First Messages and/or the portion of a further message that displays an edited first message, are highlighted or an indication is provided that a message has been edited. In some embodiments edited messages that are not currently displayed on the device but have been updated in the local store, may not be displayed until scrolled back to or otherwise been placed into focus, by a user.

At step 2569, processing terminates.

Figure 26:
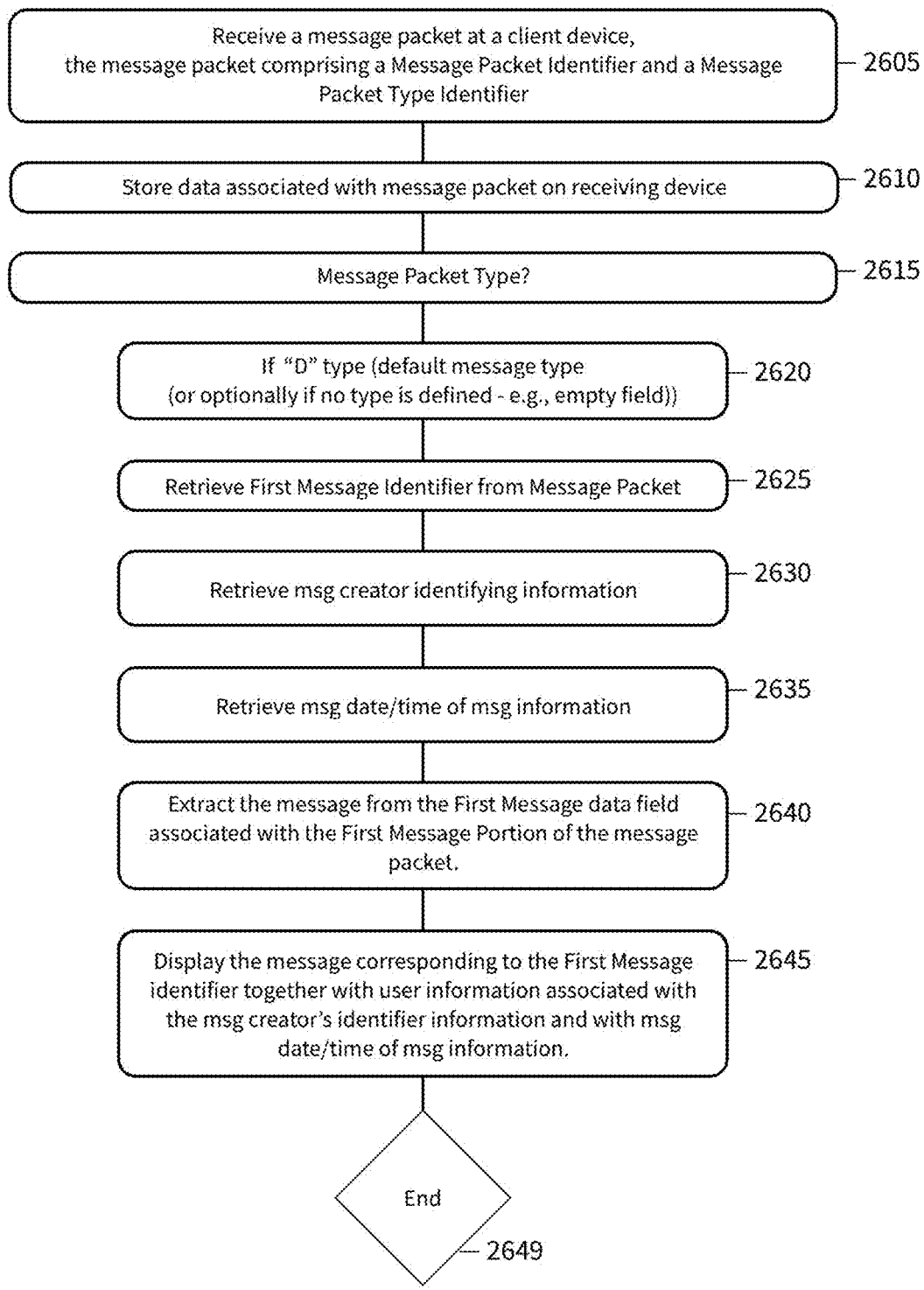
FIG. 26 is a flowchart diagram that illustrates exemplary message display in accordance with an exemplary embodiment of the present invention.

FIG. 26 Is a flow chart diagram in accordance with an exemplary embodiment of the present invention. What is illustrated is the receiving of a message packet containing the components of a basic message (i.e., default message), by a receiving device, said message packet transmitted from a cloud server to a receiving device in a messaging system whereby some or all messages are stored in both a cloud server and the local store of a receiving device and whereby correspondence between messages stored on the cloud server and the receiving device is maintained by use of message identifiers. The flow chart diagram is merely exemplary as some steps are optional and names may be different. Some steps can be combined. Some steps can be broken-out. Some steps can occur before or after their current placement in the flow chart.

At step 2605, a message packet is received by a receiving device. The message packet is comprised of at least a Message Packet Identifier and a Message Packet Type Identifier.

At step 2610, data transmitted in the message packet is stored on the receiving device.

At step 2615, the receiving device extracts information from the transmission packet and determines the message packet type.

At step 2620, if the message packet type is a "Default" type (or optionally, no type is specified) then processing follows the steps associated with "Default" message types. If the message packet type is other than a "Default" type, the application will follow the programming steps associated with that respective message packet type.

At step 2625, the First Message identifier is retrieved from the Message Identifier corresponding to First Message field of the First Message portion of the message packet.

At step 2630, processing retrieves the message creator's identifying information from the message creator identifying information field of the First Message portion of the message packet.

At step 2635, processing retrieves meta-data such as the date/time that the message was created from the date/time of message field associated with the First Message portion of the message packet.

At step 2640, processing retrieves the message Selected all or a portion of First Message field associated with the First Message portion of the message packet.

At step 2645, the receiving device displays the message corresponding to the First Message identifier together with user information associated with the message creator's identifying information and with metadata such as msg date/time of msg transmission information.

FIG. 27 is a block diagram that illustrates exemplary event triggers for refreshing/updating the quoted portion of a first message. Examples of event triggers, in some embodiments, that could cause the data stored locally on a receiving device and associated with the quoted portion of a first message associated with a further message to be replaced or modified are: After a period of time elapses (e.g., periodically), an event (e.g., application launch) or based on a manual command or automatic function, said receiving device polls at least one existing [displayed] quote reply(ies) and based on the local store updates the [displayed further messages] [all messages residing in the local store] [a specified number of messages] [messages associated with a specified channel][messages associated with a specified group] messages associated with a specified topic][messages associated with a specified user] messages associated with a specified thread] [messages associates with a specified message] messages associated with a specified time period] messages associated with a specified type] [messages associated with a specified location] [messages associated with a specified user level i.e., admin or user] [messages associated with subscription level e.g., paying customer or free user].

In some embodiments, a process identifies discrepancies between first messages in the local store and the quoted portion associated with said first message and associated with one or more further messages, and if a discrepancy is identified, the further one or more messages are modified to reflect the change in the first message.

While flowcharts have been referred to herein showing particular orders of performing steps, it is understood that the orders are exemplary and may vary as desirable in order to provide messaging and/or messaging features.

While exemplary embodiments of the present invention have been described herein, it is understood that aspects of one exemplary embodiment may be combined with aspects of another exemplary embodiment as desirable in order to provide messaging and/or messaging features.

In an exemplary embodiment of the present invention, a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a smart watch, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus. Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. An apparatus for use with a group-based communication system, said apparatus for creating a further message based on a first message and inserting said further message in a message stream, said apparatus comprising:
  a processor, and a memory associated with said processor having computer coded instructions therein, said computer coded instructions configured to, when executed by said processor, cause the apparatus to:
  receive said first message on a first device having a first display, wherein said first message originates on a second device remote from said first device, and displaying of said first message occurs in said message stream on said first device;
  receive selection, from said first display, of said first message by selecting an area or object that is displayed on said first display and is associated with said first message;

allow formation of said further message responsive to said selection; wherein said formation of said further message is initiated by a single step that is said selection itself, said further message comprising:
a digital connection link for maintaining correspondence between said further message and said first message; and
a reply message that is a reply to said first message,
wherein said reply message is added into said further message via a text entry box;
transmit said further message from said first device to said second device, wherein said first message is received on said first device, and said further message is transmitted from said first device, at respectively different times, and wherein transmitting of said further message from said first device causes displaying of said further message in said message stream chronologically later than where said first message that received said selection appears in the message stream, and wherein said displaying of said further message in said message stream includes displaying of at least a portion of said first message via said digital connection link as a redisplayed message;
after said displaying of said further message in said message stream, allow editing of said first message on said second device to cause said redisplayed message on said first device to include said editing, wherein said editing of said first message modifies the redisplayed message on said first device to include said editing based on said digital connection link;
after said displaying of said further message in said message stream, provide on said first device a first edit indication that said editing of said first message on said second device has occurred responsive to said editing, said first edit indication being displaying of the redisplayed message on said first device as modified to include said editing while said further message is being displayed on said first device;
wherein after said further message is transmitted and appears in said message stream, said further message displays:
said reply message, and
a display object that is a displayed further area or further object displayed on said first display and is associated with said further message,
wherein responsive to interaction with said display object on said first device, and based on said digital connection link, a visual change affecting display of said first message on said first device occurs.

2. An apparatus according to claim 1, wherein said text entry box is displayed prior to said selecting, and wherein said reply message is enterable into said text entry box prior to said selection.

3. An apparatus according to claim 1, wherein said editing of said first message, by itself, modifies the redisplayed message to include said editing based on said digital connection link.

4. An apparatus according to claim 1, wherein a second edit indication is provided on said first device, said second edit indication is other than said first edit indication, and said second edit indication that said redisplayed message has been edited is displayed so said second edit indication appears associated with said redisplayed message.

5. An apparatus according to claim 1, wherein said first message and said redisplayed message are both displayed from data in a shared data resource shared between the first message and the redisplayed message.

6. An apparatus according to claim 1, wherein said single step is not an interaction with a menu.

7. An apparatus according to claim 1, wherein text of the first message that was input by a user on said second device and displayed on said first device is not included when the further message is transmitted.

8. An apparatus according to claim 1, wherein said digital connection link maintains synchronicity between said first message and said redisplayed message.

9. An apparatus according to claim 1, wherein said editing of said first message on said second device is transmitted to said first device, said transmission including a message identifier that corresponds with said first message, said message identifier is said digital connection link, wherein said first device locates one or more instances of said first message that corresponds with said message identifier and that were locally stored in said first device prior to said editing, and said first device modifies said instances based on said editing of said first message.

10. An apparatus according to claim 1, wherein an edit permission notification is provided on said first device, said edit permission notification indicating that said first message has been edited, wherein responsive to providing said edit permission notification on said first device, editing of said reply message that was included in said further message is permitted on said first device.

11. An apparatus according to claim 1, wherein a warning notification that the further message has been transmitted in response to the first message is provided on said second device responsive to an attempt on said second device to edit said first message.

12. A method for creating a further message based on a first message and inserting said further message in a message stream, said method comprising the steps of:
receiving said first message on a first device having a first display, wherein said first message originates on a second device remote from said first device, and displaying of said first message occurs in said message stream on said first device;
receiving selection, from said first display, of said first message by selecting an area or object that is displayed on said first display and is associated with said first message;
allowing formation of said further message responsive to said selection; wherein said formation of said further message is initiated by a single step that is said selection itself, said further message comprising:
a digital connection link for maintaining correspondence between said further message and said first message; and
a reply message that is a reply to said first message,
wherein said reply message is added into said further message via a text entry box;
transmitting said further message from said first device to said second device, wherein said receiving of said first message on said first device and said transmitting of said further message from said first
device occur at respectively different times, said transmitting said further message from said first device causes displaying of the further message in the message stream chronologically later than where the first message that received said selection appeared in the message stream, and wherein said displaying of the further message in the message stream includes displaying of at least a portion of the first message via said digital connection link as a redisplayed message;

after said displaying of said further message in said message stream, allowing editing of said first message on said second device to cause said redisplayed message on said first device to include said editing, wherein said editing of the first message modifies the redisplayed message on said first device to include said editing based on said digital connection link;

after said displaying of said further message in said message stream, providing on said first device a first edit indication that said editing of said first message on said second device has occurred responsive to said editing, said first edit indication being displaying of the redisplayed message on said first device as modified to include said editing while said further message is being displayed on said first device;

wherein after said further message is transmitted and appears in said message stream, said further message displays:
    said reply message, and
    a display object that is a displayed further area or further object displayed on said first display and is associated with said further message,
wherein responsive to interaction with said display object on said first device, and based on said digital connection link, a visual change affecting display of said first message on said first device occurs.

13. A method according to claim 12, wherein said text entry box is displayed prior to said selection, and wherein said reply message is enterable into said text entry box prior to said selection.

14. A method according to claim 12, wherein said editing of said first message, by itself, modifies the redisplayed message to include said editing based on said digital connection link.

15. A method according to claim 12, wherein a second edit indication is provided on said first device, said second edit indication is other than said first edit indication, and said second edit indication that said redisplayed message has been edited is displayed so said second edit indication appears associated with said redisplayed message.

16. A method according to claim 12, wherein said first message and said redisplayed message are both displayed from data in a shared data resource shared between the first message and the redisplayed message.

17. A method according to claim 12, wherein text of the first message that was input by a user on said second device and displayed on said first device is not included when the further message is transmitted.

18. A non-transitory computer readable medium having stored thereon instructions for operating a messaging system, wherein a further message is created based on a first message and inserted into a message stream, the instructions, when executed by at least one processor, cause said at least one processor to implement the steps of:
    receiving said first message on a first device having a first display, wherein said first message originates on a second device remote from said first device, and displaying of said first message occurs in said message stream on said first device;
    receiving selection, from said first display, of said first message by selecting an area or object that is displayed on said first display and associated with said first message;
    allowing formation of said further message responsive to said selection; wherein said formation of said further message is initiated by a single step that is said selection itself, said further message comprising:
        a digital connection link for maintaining correspondence between said further message and said first message; and
        a reply message that is a reply to said first message,
    wherein said reply message is added into said further message via a text entry box;
    transmitting said further message from said first device to said second device, wherein said receiving of said first message on said first device and said transmitting of said further message from said first device occur at respectively different times, said transmitting said further message from said first device causes displaying of the further message in the message stream chronologically later than where the first message that received said selection appeared in the message stream, and wherein said displaying of the further message in the message stream includes displaying of at least a portion of the first message via said digital connection link as a redisplayed message;
    after said displaying of said further message in said message stream, allowing editing of said first message on said second device to cause said redisplayed message on said first device to include said editing, wherein said editing of the first message modifies the redisplayed message on said first device to include said editing based on said digital connection link;
    after said displaying of said further message in said message stream, providing on said first device a first edit indication that said editing of said first message on said second device has occurred responsive to said editing, said first edit indication being displaying of the redisplayed message on said first device as modified to include said editing while said further message is being displayed on said first device;
    wherein after said further message is transmitted and appears in said message stream, said further message displays:
        said reply message, and
        a display object that is a displayed further area or further object displayed on said first display and is associated with said further message,
    wherein responsive to interaction with said display object on said first device, and based on said digital connection link, a visual change affecting display of said first message on said first device to occur.

19. A non-transitory computer readable medium according to claim 18, wherein said editing of said first message, by itself, modifies the redisplayed message to include said editing based on said digital connection link.

20. A non-transitory computer readable medium according to claim 18, wherein said visual change affecting display of said first message on said first device is said display of said first message where said first message visually appears in the message stream.

21. A non-transitory computer readable medium according to claim 18, wherein said visual change affecting display of said first message on said first device is said display of said redisplayed message so that said redisplayed message is visually associated with the display object.

22. A non-transitory computer readable medium according to claim 18, wherein text of the first message that was input by a user on said second device and displayed on said first device is not included when the further message is transmitted.

23. A non-transitory computer readable medium according to claim 18, wherein said digital connection link maintains synchronicity between said first message and said redisplayed message.

24. A non-transitory computer readable medium according to claim 18, wherein said editing of said first message on said second device is transmitted to said first device, said transmission including a message identifier, that corresponds with said first message, said message identifier is said digital connection link, wherein said first device locates one or more instances of said first message that corresponds with said message identifier and that were locally stored in said first device prior to said editing, and said first device modifies said instances based on said editing of said first message.

25. An apparatus for use with a group-based communication system, said apparatus for creating a further message based on a first message and inserting said further message in a message stream, said apparatus comprising:
   a processor, and a memory associated with said processor having computer coded instructions therein, said computer coded instructions configured to, when executed by said processor, cause the apparatus to:
   receive said first message on a first device having a first display, wherein said first message originates on a second device remote from said first device, and displaying of said first message occurs in said message stream on said first device;
   receive selection, from said first display, of said first message by selecting an area or object that is displayed on said first display and is associated with said first message;
   allow formation of said further message responsive to said selection; wherein said formation of said further message is initiated by a single step that is said selection itself, said further message comprising:
      a digital connection link that points to said first message via an address of said first message; and
      a reply message that is a reply to said first message, wherein said reply message is added into said further message via a text entry box, and wherein said reply message is enterable into said text entry box prior to said selection;
   transmit said further message from said first device to said second device, wherein said first message is received on said first device, and said further message is transmitted from said first device, at respectively different times, and wherein transmitting of said further message from said first device causes displaying of said further message in said message stream chronologically later than where said first message that received said selection appears in said message stream, and wherein display of said further message in said message stream includes displaying of at least a portion of said first message as a redisplayed message;
   wherein source of display of said redisplayed message on said first device is a shared data resource accessed via said digital connection link;
   wherein after said further message is transmitted and appears in said message stream, said further message displays:
      said reply message, and
      a display object that is a displayed further area or further object displayed on said first display and is associated with said further message,
   wherein responsive to interaction with said display object on said first device, and based on said digital connection link, a visual change affecting display of said first message on said first device occurs;
   wherein said first message and said redisplayed message share said shared data resource via said digital connection link, both said first message and said redisplayed message are displayed from same data in said shared data resource shared by said first message and said redisplayed message; and
   wherein editing of said first message on said second device edits said same data in said shared data resource so that said editing of said first message on said second device appears in said redisplayed message on said first device.

26. An apparatus according to claim 25, wherein said digital connection link maintains synchronicity between said first message and said further message.

27. An apparatus according to claim 25, wherein source of display of said redisplayed message is not from text of the first message transmitted by said first device at the time said further message is transmitted by said first device.

28. An apparatus according to claim 25, wherein selection of one or more edit characterizations of said editing is allowed responsive to said editing of said first message on said second device and wherein said one or more edit characterizations that was selected is displayed associated with said redisplayed message.

29. An apparatus according to claim 25, wherein text of said reply message is entered into said text entry box prior to said selection of said first message, and after said text of said reply message is entered into said text entry box, said further message is formed responsive to said selection of said first message, wherein formation of said further message is initiated by
   said single step that is said selection itself, said selection causing a reference object to be inserted into said text entry box, said further message comprising:
   said digital connection link that points to said first message via said address of said first message; and
   said text of said reply message that was entered into said text entry box prior to said selection of said first message.

30. An apparatus according to claim 25, wherein text of the first message that was input by a user on said second device and displayed on said first device is not included when the further message is transmitted.

\* \* \* \* \*